(12) United States Patent
Liu et al.

(10) Patent No.: US 12,301,930 B2
(45) Date of Patent: May 13, 2025

(54) DIGITAL SPACE MANAGEMENT METHOD, APPARATUS, AND DEVICE

(71) Applicant: HUAWEI TECHNOLOGIES CO., LTD., Guangdong (CN)

(72) Inventors: Jianbin Liu, Hangzhou (CN); Er Li, Hangzhou (CN); Jun Cao, Shenzhen (CN); Zongwu Wu, Shenzhen (CN); Yangpo Xu, Shenzhen (CN); Tizheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 130 days.

(21) Appl. No.: 17/737,837

(22) Filed: May 5, 2022

(65) Prior Publication Data

US 2022/0264176 A1 Aug. 18, 2022

Related U.S. Application Data

(63) Continuation of application No. PCT/CN2020/127226, filed on Nov. 6, 2020.

(30) Foreign Application Priority Data

Nov. 8, 2019 (CN) .......................... 201911089971.7

(51) Int. Cl.
*H04N 21/44* (2011.01)
*G06F 3/04815* (2022.01)
(Continued)

(52) U.S. Cl.
CPC ......... *H04N 21/44* (2013.01); *G06F 3/04815* (2013.01); *G06F 3/04845* (2013.01);
(Continued)

(58) Field of Classification Search
CPC . G06F 3/04815; G06F 3/04845; G06T 19/20; G06T 19/006; G06T 2219/2021; H04N 21/47205; H04N 21/4882
See application file for complete search history.

(56) References Cited

U.S. PATENT DOCUMENTS 10,699,488 B1 * 6/2020 Terrano ................. G06N 20/00
11,194,439 B2 * 12/2021 Laaksonen ............. G06T 15/20
(Continued)

FOREIGN PATENT DOCUMENTS

CN 101136023 A 3/2008
CN 102150179 A 8/2011
(Continued)

OTHER PUBLICATIONS

ITU-T H.264 (Jun. 2019), Series H: Audiovisual and Multimedia Systems, Infrastructure of audiovisual services—Coding of moving video, Advanced video coding for generic audiovisual services, total 836 pages.

*Primary Examiner* — Ryan M Gray
(74) *Attorney, Agent, or Firm* — WOMBLE BOND DICKINSON (US) LLP

(57) ABSTRACT

Methods, devices, and systems for digital space management in virtual reality and augmented reality are described. A method can include a terminal that logs in to a preset application based on a first user identifier, presents a first interface, where the first interface includes a virtual space registration option. In response to an enabling operation of a user for the virtual space registration option, the terminal photographs a first scene to obtain a preview stream, obtains (Continued)

a target geometry, and sends the first user identifier, the preview stream, and the target geometry to a server. The preview stream and the target geometry are used to determine a target virtual space in which a user with the first user identifier has virtual content editing permission in a first virtual space. The first virtual space is a virtual space corresponding to a real world including the first scene. The target geometry is used to represent a form of the target virtual space.

15 Claims, 30 Drawing Sheets

(51) Int. Cl.
| | | |
|---|---|---|
| *G06F 3/04845* | (2022.01) | |
| *G06T 19/00* | (2011.01) | |
| *G06T 19/20* | (2011.01) | |
| *H04N 21/472* | (2011.01) | |
| *H04N 21/488* | (2011.01) | |

(52) U.S. Cl.
CPC ....... *G06T 19/20* (2013.01); *H04N 21/47205* (2013.01); *H04N 21/4882* (2013.01); *G06T 19/006* (2013.01); *G06T 2219/2021* (2013.01)

(56) References Cited

U.S. PATENT DOCUMENTS

| | | | | |
|---|---|---|---|---|
| 11,195,020 | B1* | 12/2021 | Yan | G06T 15/205 |
| 2005/0030309 | A1* | 2/2005 | Gettman | G06F 16/954 |
| | | | | 345/419 |
| 2011/0126272 | A1* | 5/2011 | Betzler | G06F 21/41 |
| | | | | 726/6 |
| 2014/0313225 | A1* | 10/2014 | Lee | G06Q 30/00 |
| | | | | 345/633 |
| 2015/0180914 | A1* | 6/2015 | Welinder | G06F 3/0482 |
| | | | | 715/758 |
| 2018/0323972 | A1* | 11/2018 | Reed | H04W 12/068 |
| 2019/0197785 | A1* | 6/2019 | Tate-Gans | G06T 19/006 |
| 2021/0217241 | A1* | 7/2021 | Shuster | G06T 17/00 |

FOREIGN PATENT DOCUMENTS

| | | | |
|---|---|---|---|
| CN | 103562957 A | | 2/2014 |
| CN | 103631768 A | | 3/2014 |
| CN | 104463634 A | | 3/2015 |
| CN | 104834520 A | | 8/2015 |
| CN | 106779816 A | | 5/2017 |
| CN | 107430739 A | | 12/2017 |
| CN | 107436945 A | | 12/2017 |
| CN | 109949422 A | | 6/2019 |
| JP | 11249991 A | * | 9/1999 |
| WO | 2019179224 A1 | | 9/2019 |

* cited by examiner

Zoom in and zoom out

Rotate

DIGITAL SPACE MANAGEMENT METHOD, APPARATUS, AND DEVICE

CROSS-REFERENCE TO RELATED APPLICATIONS

This application is a continuation of International Application No. PCT/CN2020/127226, filed on Nov. 6, 2020, which claims priority to Chinese Patent Application No. 201911089971.7, filed on Nov. 8, 2019. The disclosures of the aforementioned applications are hereby incorporated by reference in their entireties.

TECHNICAL FIELD

This application relates to the field of augmented reality (AR) or virtual reality (VR) technologies, and in particular, to synchronizing content in a plurality of authorized spaces based on a digital map.

BACKGROUND

Currently, digital maps are more widely used in daily life. The digital map includes a large quantity of virtual three-dimensional spaces. In addition to some spaces occupied by existing buildings and other objects, these three-dimensional spaces further include a large quantity of remaining three-dimensional spaces that are not occupied. How to better use these three-dimensional spaces to realize the value of these three-dimensional spaces is an urgent problem to be resolved in a current digital map operation process.

SUMMARY

This application provides a method for displaying an authorized space based on a digital map, a method for synchronizing media content and a method for sharing media content in a plurality of authorized spaces, as well as an apparatus and a storage medium, to implement visualization of an authorized space, and add media content to a visualized authorized space. The technical solutions are as follows:

According to a first aspect, a method for displaying an authorized space based on a digital map is provided. The method may be applied to a terminal, and the method includes: obtaining a preview stream of a target scene; obtaining a first user identifier; obtaining a pose of the terminal; obtaining n authorized spaces based on the first user identifier and the pose, where the n authorized spaces are n non-overlapping three-dimensional spaces corresponding to the first user identifier in a digital map corresponding to the target scene, the n authorized spaces are used to present media content, n is an integer greater than or equal to 1, and the digital map includes a panorama, a point cloud map, or a grid model; and rendering the n authorized spaces in the preview stream of the target scene.

According to the first aspect, in a possible embodiment, after the rendering the n authorized spaces in the preview stream of the target scene, the method further includes: obtaining target media content, where the target media content includes one or more of a text, a picture, audio, a video, and a model; and adding the target media content to a target authorized space, where the target authorized space is any one of the n authorized spaces.

According to the first aspect, in a possible embodiment, the adding the target media content to a target authorized space includes: when detecting a drag instruction for the target media content, adding the target media content at a drag end location indicated by the drag instruction, where a display manner of media content that is in the target media content and that is inside the target authorized space is different from that of media content that is in the target media content and that is outside the target authorized space, or media content that is in the target media content and that is inside the target authorized space is visible and media content that is in the target media content and that is outside the target authorized space is invisible.

According to the first aspect, in a possible embodiment, after the adding the target media content to a target authorized space, the method further includes: determining a target relative location relationship between the target media content and a target object, where the target object is a preset image or three-dimensional object included in the digital map corresponding to the target scene; and sending the first user identifier, the target media content, the target object, and the target relative location relationship to a server, so that the server updates content in another authorized space corresponding to the first user identifier in a preset digital map based on the target media content, the target object, and the target relative location relationship.

According to the first aspect, in a possible embodiment, a relative location relationship between the target media content and a first feature satisfies a first preset location relationship, and the first feature is a preset image or three-dimensional object included in the preview stream of the target scene.

According to the first aspect, in a possible embodiment, the obtaining n authorized spaces based on the first user identifier and the pose includes: sending the first user identifier and the pose to the server, so that the server obtains the n authorized spaces based on the first user identifier and the pose; and receiving the n authorized spaces sent by the server.

According to the first aspect, in a possible embodiment, the obtaining n authorized spaces based on the first user identifier and the pose includes: sending the first user identifier, the pose, and a space screening condition to the server, so that the server obtains m authorized spaces based on the first user identifier and the pose, and obtains the n authorized spaces satisfying the space screening condition from the m authorized spaces; and receiving the n authorized spaces sent by the server.

According to the first aspect, in a possible embodiment, the obtaining n authorized spaces based on the first user identifier and the pose includes: sending the first user identifier and the pose to the server, so that the server obtains m authorized spaces based on the first user identifier and the pose; receiving the m authorized spaces sent by the server; and obtaining the n authorized spaces satisfying a space screening condition from the m authorized spaces.

According to the first aspect, in a possible embodiment, the obtaining n authorized spaces based on the first user identifier and the pose includes: sending a space application request to the server, where the space application request is used to apply for an authorized space from the server, and the space application request carries the first user identifier, the pose, and an authorized space requirement, so that the server allocates the n corresponding authorized spaces to the first user identifier based on the pose and the authorized space requirement; and receiving an authorization response sent by the server, where the authorization response carries the n authorized spaces.

According to the first aspect, in a possible embodiment, the rendering the n authorized spaces in the preview stream of the target scene includes: rendering the n authorized spaces in the preview stream of the target scene in a preset display form based on the pose, where the preset display form includes one or more of a preset color, preset transparency, a cubic space, and a spherical space.

According to the first aspect, in a possible embodiment, after the rendering the n authorized spaces in the preview stream of the target scene, the method further includes: if poses of the n authorized spaces do not match poses in the preview stream of the target scene, adjusting the poses of the n authorized spaces in the digital map, so that the poses of the n authorized spaces match the poses in the preview stream of the target scene; and sending adjusted poses of the n authorized spaces to the server, so that the server updates the poses of the n authorized spaces in the digital map.

According to the first aspect, in a possible embodiment, a relative location relationship between each of the n authorized spaces rendered in the preview stream of the target scene and a second feature satisfies a second preset location relationship, and the second feature is a preset image or three-dimensional object included in the preview stream of the target scene.

According to a second aspect, a method for sharing media content based on a digital map is provided. The method is applied to a second terminal, and the method includes: obtaining a video of a target scene that is sent by a first terminal, where the video of the target scene carries a target pose existing when the first terminal shoots the video of the target scene; obtaining to-be-displayed target media content based on the target pose, where the target media content includes media content in a digital map corresponding to the target scene; and playing the video of the target scene, and rendering the target media content when playing the video of the target scene.

According to the second aspect, in a possible embodiment, the obtaining to-be-displayed target media content based on the target pose includes: sending the target pose to a server, so that the server obtains the target media content based on the target pose; and receiving the target media content sent by the server.

According to a third aspect, an apparatus for displaying an authorized space based on a digital map is provided. The apparatus is used in a terminal, and the apparatus includes: a first obtaining module, configured to obtain a preview stream of a target scene; a second obtaining module, configured to obtain a first user identifier and obtain a pose of the terminal; a third obtaining module, configured to obtain n authorized spaces based on the first user identifier and the pose, where the n authorized spaces are n non-overlapping three-dimensional spaces corresponding to the first user identifier in a digital map corresponding to the target scene, the n authorized spaces are used to present media content, n is an integer greater than or equal to 1, and the digital map includes a panorama, a point cloud map, or a grid map; and a rendering module, configured to render the n authorized spaces in the preview stream of the target scene.

According to the third aspect, in a possible embodiment, the apparatus further includes: a fourth obtaining module, configured to obtain target media content, where the target media content includes one or more of a text, a picture, audio, a video, and a model; and an addition module, configured to add the target media content to a target authorized space, where the target authorized space is any one of the n authorized spaces.

According to the third aspect, in a possible embodiment, the addition module is configured to: when a drag instruction for the target media content is detected, add the target media content at a drag end location indicated by the drag instruction, where a display manner of media content that is in the target media content and that is inside the target authorized space is different from that of media content that is in the target media content and that is outside the target authorized space, or media content that is in the target media content and that is inside the target authorized space is visible and media content that is in the target media content and that is outside the target authorized space is invisible.

According to the third aspect, in a possible embodiment, the apparatus further includes: a determining module, configured to determine a target relative location relationship between the target media content and a target object, where the target object is a preset image or three-dimensional object included in the digital map corresponding to the target scene; and a sending module, configured to send the first user identifier, the target media content, the target object, and the target relative location relationship to a server, so that the server updates content in another authorized space corresponding to the first user identifier in a preset digital map based on the target media content, the target object, and the target relative location relationship.

According to the third aspect, in a possible embodiment, a relative location relationship between the target media content and a first feature satisfies a first preset location relationship, and the first feature is a preset image or three-dimensional object included in the preview stream of the target scene.

According to the third aspect, in a possible embodiment, the third obtaining module is configured to: send the first user identifier and the pose to the server, so that the server obtains the n authorized spaces based on the first user identifier and the pose; and receive the n authorized spaces sent by the server.

According to the third aspect, in a possible embodiment, the third obtaining module is configured to: send the first user identifier, the pose, and a space screening condition to the server, so that the server obtains m authorized spaces based on the first user identifier and the pose, and obtains the n authorized spaces satisfying the space screening condition from the m authorized spaces; and receive the n authorized spaces sent by the server.

According to the third aspect, in a possible embodiment, the third obtaining module is configured to: send the first user identifier and the pose to the server, so that the server obtains m authorized spaces based on the first user identifier and the pose; receive the m authorized spaces sent by the server; and obtain the n authorized spaces satisfying a space screening condition from the m authorized spaces.

According to the third aspect, in a possible embodiment, the third obtaining module is configured to: send a space application request to the server, where the space application request is used to apply for an authorized space from the server, and the space application request carries the first user identifier, the pose, and an authorized space requirement, so that the server allocates the n corresponding authorized spaces to the first user identifier based on the pose and the authorized space requirement; and receive an authorization response sent by the server, where the authorization response carries the n authorized spaces.

According to the third aspect, in a possible embodiment, the rendering module is configured to render the n authorized spaces in the preview stream of the target scene in a preset display form based on the pose, where the preset display form includes one or more of a preset color, preset transparency, a cubic space, and a spherical space.

According to the third aspect, in a possible embodiment, the apparatus further includes: an adjustment module, configured to: if poses of the n authorized spaces do not match poses in the preview stream of the target scene, adjust the poses of the n authorized spaces in the digital map, so that the poses of the n authorized spaces match the poses in the preview stream of the target scene; and the sending module, configured to send adjusted poses of the n authorized spaces to the server, so that the server updates the poses of the n authorized spaces in the digital map.

According to the third aspect, in a possible embodiment, a relative location relationship between each of the n authorized spaces rendered in the preview stream of the target scene and a second feature satisfies a second preset location relationship, and the second feature is a preset image or three-dimensional object included in the digital map corresponding to the target scene.

According to a fourth aspect, an apparatus for sharing media content based on a digital map is provided. The apparatus is used in a second terminal, and the apparatus includes: a first obtaining module, configured to obtain a video of a target scene that is sent by a first terminal, where the video of the target scene carries a target pose existing when the first terminal shoots the video of the target scene; a second obtaining module, configured to obtain to-be-displayed target media content based on the target pose; and a display module, configured to play the video of the target scene, and rendering the target media content when playing the video of the target scene.

According to the fourth aspect, in a possible embodiment, the second obtaining module is configured to: send the target pose to a server, so that the server obtains the target media content based on the target pose; and receive the target media content sent by the server.

According to a fifth aspect, a method for displaying an authorized space based on a digital map is provided. The method is applied to a terminal, and the method includes: obtaining a preview stream of a target scene; obtaining a first user identifier; obtaining a pose of the terminal; obtaining n authorized spaces based on the first user identifier and the pose, where the n authorized spaces are n non-overlapping three-dimensional spaces corresponding to the first user identifier in a digital map corresponding to the target scene, the n authorized spaces are used to present media content, n is an integer greater than or equal to 1, and the digital map includes a panorama, a point cloud map, or a grid map; and rendering the n authorized spaces in the preview stream of the target scene.

In this embodiment of this application, the terminal may obtain, based on the first user identifier and the pose of the terminal, an authorized space of a current registered user in the digital map corresponding to the target scene, and then render the authorized space of the registered user in the preview stream of the target scene, so that the registered user can view, in real time, an authorized space corresponding to a current scene. This is more convenient.

Optionally, after the rendering the n authorized spaces in the preview stream of the target scene, the method further includes: obtaining target media content, where the target media content includes one or more of a text, a picture, audio, a video, and a model; and adding the target media content to a target authorized space, where the target authorized space is any one of the n authorized spaces.

Optionally, after the rendering the n authorized spaces in the preview stream of the target scene, the method further includes: displaying, in a target authorized space, media content included in the target authorized space, and editing the displayed media content in a first editing manner. The first editing manner includes one or more of an addition manner, a deletion manner, a replacement manner, and a movement manner based on preset relative displacement.

The addition manner means that when an authorized space already includes media content, additional media content is added based on the original media content in the authorized space. The deletion manner refers to deleting existing media content in an authorized space. In embodiments, all the media content may be deleted, or some elements in the media content may be deleted. The replacement manner refers to replacing existing media content in an authorized space with other media content, or replacing an element included in existing media content in an authorized space with other media content. The movement manner based on the preset relative displacement may refer to moving existing media content in an authorized space from a current location to another location based on the preset relative displacement.

In addition, it should be further noted that, after the media content is edited in the first editing manner, the terminal may send edited media content and the first editing manner to a server, and the server may edit, in the first editing manner, same media content in another authorized space corresponding to the first user identifier. In embodiments, editing in the first editing manner means that an editing operation that is the same as the first editing manner is performed on same media content in another authorized space, so that all authorized spaces that include the corresponding media content present a consistent effect after editing.

For example, the first editing manner is adding a first media object at a first location in a first authorized space. Synchronizing the first editing manner in a second authorized space may be adding the first media object at a second location in the second authorized space. If the first authorized space and the second authorized space are overlapped (including overlapping after scaling), the first location and the second location are overlapped, and display manners of the first media object in the two spaces are the same.

For example, the first editing manner is deleting a first media object at a first location in a first authorized space. Synchronizing the first editing manner in a second authorized space may be deleting the first media object at a second location in the second authorized space. If the first authorized space and the second authorized space are overlapped (including overlapping after scaling), the first location and the second location are overlapped, and remaining content in the first authorized space and remaining content in the second authorized space are consistently presented.

For example, the first editing manner is replacing a first media object at a first location with a second media object in a first authorized space. Synchronizing the first editing manner in a second authorized space may be replacing the first media object at a second location in the second authorized space with the second media object. If the first authorized space and the second authorized space are overlapped (including overlapping after scaling), the first location and the second location are overlapped, the second media objects in the two spaces are also overlapped, and display manners are consistent.

For example, the first editing manner is moving a first media object from a first location to a second location in a first authorized space. Synchronizing the first editing manner in a second authorized space may be moving the first media object in the second authorized space from a third location to a fourth location. If the first authorized space and the second authorized space are overlapped (including overlapping after scaling), the first location and the third location are overlapped, the second location and the fourth location are overlapped, and display manners of the first media object in the two spaces are consistent.

The foregoing is merely an example, and does not constitute a limitation. The first authorized space and the second authorized space may have a same size and shape, or may be in a specific proportion. In this case, object arrangements in the spaces are in the corresponding proportion.

The target media content may be media content stored in the terminal, or may be media content downloaded by the terminal from the Internet.

Because the authorized space corresponding to the first user identifier is clearly displayed in the preview stream of the target scene, a registered user can clearly learn of a boundary of an authorized space of the registered user. In this case, when the user adds media content to the authorized space, it can be effectively avoided that the added media content occupies an authorized space of another user. This implements accurate media content addition, and improves addition efficiency.

Optionally, an embodiment of an implementation process of adding the target media content to a target authorized space may include: when detecting a drag instruction for the target media content, adding the target media content at a drag end location indicated by the drag instruction, where a display manner of media content that is in the target media content and that is inside the target authorized space is different from that of media content that is in the target media content and that is outside the target authorized space, or media content that is in the target media content and that is inside the target authorized space is visible and media content that is in the target media content and that is outside the target authorized space is invisible.

Optionally, after the adding the target media content to a target authorized space, the method may further include: determining a target relative location relationship between the target media content and a target object, where the target object is a preset image or three-dimensional object included in the digital map corresponding to the target scene; and sending the first user identifier, the target media content, the target object, and the target relative location relationship to a server, so that the server updates content in another authorized space corresponding to the first user identifier in a preset digital map based on the target media content, the target object, and the target relative location relationship.

In other words, after the target media content is added to the target authorized space, the relative location relationship between the target media content and the target object may be sent to the terminal, so that the server may automatically add the target media content in another authorized space based on the relative location relationship and the target object. This improves media content addition efficiency.

Optionally, a relative location relationship between the target media content and a first feature satisfies a first preset location relationship, and the first feature is a preset image or three-dimensional object included in the preview stream of the target scene. In other words, in this embodiment of this application, the target media content placed in the target authorized space and the first feature in the preview stream satisfy the preset location relationship. In this way, it can be ensured that the target media content is adapted to the target scene.

Optionally, the n authorized spaces may be obtained based on the first user identifier and the pose in the following three embodiments:

sending the first user identifier and the pose to the server, so that the server obtains the n authorized spaces based on the first user identifier and the pose; and receiving the n authorized spaces sent by the server; or sending the first user identifier, the pose, and a space screening condition to the server, so that the server obtains m authorized spaces based on the first user identifier and the pose, and obtains the n authorized spaces satisfying the space screening condition from the m authorized spaces; and receiving the n authorized spaces sent by the server; or sending the first user identifier and the pose to the server, so that the server obtains m authorized spaces based on the first user identifier and the pose; receiving the m authorized spaces sent by the server; and obtaining the n authorized spaces satisfying the space screening condition from the m authorized spaces.

All the foregoing three embodiments are implementations of obtaining the authorized spaces corresponding to the first user identifier when the authorized spaces corresponding to the first user identifier already exist.

Optionally, if a user with the first user identifier has no corresponding authorized space, the terminal may apply for an authorized space in the following manner. For example, the terminal may send a space application request to the server, where the space application request is used to apply for an authorized space from the server, and the space application request carries the first user identifier, the pose, and an authorized space requirement, so that the server allocates the n corresponding authorized spaces to the first user identifier based on the pose and the authorized space requirement; and receive an authorization response sent by the server, where the authorization response carries the n authorized spaces.

Optionally, an embodiment of an implementation process of rendering the n authorized spaces in the preview stream of the target scene may include: rendering the n authorized spaces in the preview stream of the target scene in a preset display form based on the pose, where the preset display form includes but is not limited to one or more of a preset color, preset transparency, a cubic space, and a spherical space.

The preset display form alternatively includes displaying a boundary of the authorized space by using an obvious feature, for example, displaying the boundary of the authorized space by using a static solid line or dashed line, or displaying the boundary of the authorized space by using a scrolling or varying dashed line. This is not limited in embodiments of this application.

Optionally, after the rendering the n authorized spaces in the preview stream of the target scene, the method further includes: if poses of the n authorized spaces do not match poses in the preview stream of the target scene, adjusting the poses of the n authorized spaces in the digital map, so that the poses of the n authorized spaces match the poses in the preview stream of the target scene; and sending adjusted poses of the n authorized spaces to the server, so that the server updates the poses of the n authorized spaces in the digital map.

In other words, the target authorized space may be adjusted based on a pose deviation between the preview stream of the target scene and the target authorized space, so that a location in a three-dimensional map completely corresponds to that in the real world. In this way, accuracy of a location of media content added to the target authorized space can be ensured, and a problem that a location error occurs or even display fails when the media content is displayed again can be avoided.

Optionally, a relative location relationship between each of the n authorized spaces rendered in the preview stream of the target scene and a second feature satisfies a second preset location relationship, and the second feature is a preset image or three-dimensional object included in the digital map corresponding to the target scene.

According to a sixth aspect, a method for synchronizing content in a plurality of authorized spaces based on a digital map is provided. The method is applied to a terminal, and the method includes: obtaining a first user identifier; determining a first scene based on the first user identifier; obtaining a first digital map corresponding to the first scene, where the first digital map includes a first authorized space, the first authorized space is a three-dimensional space corresponding to the first user identifier in the digital map corresponding to the first scene, the digital map corresponding to the first scene includes a target object, the target object includes a preset image or three-dimensional object, and the first digital map includes a panorama, a point cloud map, or a grid map; displaying the first digital map and the first authorized space, where the first digital map includes the target object, and the target object includes the preset image or three-dimensional object; obtaining target media content; adding the target media content to the first authorized space; determining a target relative location relationship between the target media content and the target object; and sending the first user identifier, the target media content, the target object, and the target relative location relationship to a server, so that the server updates content in another authorized space corresponding to the first user identifier in a preset digital map based on the target media content, the target object, and the target relative location relationship, where the preset digital map includes the target object.

In this embodiment of this application, after the target media content is added to the first authorized space in the digital map corresponding to the first scene, the target media content, the target object, and the relative location relationship between the target media content and the target object may be sent to the server. The server may add, based on the relative location relationship, the target media content to another authorized space corresponding to the first user identifier in a digital map that is of another scene and that also includes the target object, so that media content in authorized spaces corresponding to the user identifier is automatically updated in a centralized manner, and update efficiency is high.

Optionally, an embodiment of an implementation process of obtaining the first digital map corresponding to the first scene based on the first user identifier may include: sending the first user identifier to the server, so that the server obtains, based on the first user identifier, digital maps corresponding to k scenes and a plurality of authorized spaces corresponding to the first user identifier in a digital map corresponding to each scene; receiving the digital maps corresponding to the k scenes and the plurality of authorized spaces corresponding to the first user identifier in the digital map corresponding to each scene that are sent by the server; and selecting the first scene from the k scenes according to a preset rule, and obtaining the first digital map corresponding to the first scene.

Optionally, the selecting the first scene from the k scenes according to a preset rule includes: selecting a scene closest to a location of the terminal from the k scenes as the first scene; or selecting a scene with a highest priority from the k scenes as the first scene; or selecting a default scene from the k scenes as the first scene.

Optionally, an embodiment of an implementation process of determining the first scene based on the first user identifier may include: sending the first user identifier and a scene requirement to the server, so that the server obtains, based on the first user identifier, k scenes corresponding to the first user identifier, and obtains, from the k scenes, the first scene satisfying the scene requirement; and receiving the first scene sent by the server.

Optionally, in a digital map, different user identifiers correspond to different authorized spaces.

According to a seventh aspect, a method for synchronizing content in a plurality of authorized spaces based on a digital map is provided. The method includes: obtaining a first user identifier; obtaining the first user identifier, a target object, target media content, and a target relative location relationship between the target media content and the target object that are sent by a terminal, where the target object includes a preset image or three-dimensional object; obtaining, based on the first user identifier, a second digital map corresponding to a second scene, where the second digital map includes a second authorized space, the second authorized space is a three-dimensional space corresponding to the first user identifier, the second digital map includes the target object, and the second authorized space is used to present media content; determining a location of the target object in the second digital map; and adding the target media content to the second authorized space based on the location of the target object and the target relative location relationship, so that when the terminal presents the second digital map and renders the second authorized space, a location relationship between the target media content in the second authorized space and the target object in the second digital map satisfies the target relative location relationship.

In this application, a server may obtain the target object, the target media content, and the relative location relationship between the target media content and the target object that are sent by the terminal, and then add the target media content to the second authorized space based on the target object and the target relative location relationship, so that media content in authorized spaces corresponding to the user identifier is automatically updated in a centralized manner, and update efficiency is high.

Optionally, after the target media content is added to the second authorized space based on the target object and the target relative location relationship, if the target media content does not match the second authorized space, the target media content is adjusted, so that adjusted target media content matches the second authorized space.

The target media content added to the second authorized space may not match the second authorized space. For example, the target media content may exceed a range of the second authorized space. In this case, the server may adjust a size, a shape, and the like of the target media content, so that the target media content matches the second authorized space.

Optionally, in a digital map, different user identifiers correspond to different authorized spaces.

According to an eighth aspect, a method for synchronizing content in a plurality of authorized spaces based on a digital map is provided. The method is applied to a terminal, and the method includes: obtaining a first user identifier; determining a first scene based on the first user identifier; obtaining a first digital map corresponding to the first scene, where the first digital map includes a first authorized space, the first authorized space is a three-dimensional space corresponding to the first user identifier, and the first authorized space is used to present media content; displaying the first digital map, the first authorized space, and first media content included in the first authorized space; editing the first media content in a first editing manner; and sending the first user identifier, the first media content, and the first editing manner to a server, so that the server edits, in the first editing manner, the first media content in another authorized space corresponding to the first user identifier in a preset digital map.

In this embodiment of this application, the terminal may simultaneously obtain digital maps corresponding to a plurality of scenes and an authorized space corresponding to the first user identifier in each digital map, then edit media content in an authorized space, and send the media content and an editing manner to the server. The server may search a digital map corresponding to another scene for an authorized space that corresponds to the first user identifier and that also includes the media content, and edit the media content in the corresponding authorized space in the received editing manner. In this way, the server can automatically complete editing same media content in a plurality of authorized spaces. This improves editing efficiency of the media content in the authorized space, and ensures effect consistency of media content in a plurality of authorized spaces.

Optionally, the obtaining a first digital map corresponding to the first scene based on the first user identifier includes: sending the first user identifier to the server, so that the server obtains, based on the first user identifier, digital maps corresponding to k scenes and a plurality of authorized spaces corresponding to the first user identifier in a digital map corresponding to each scene; receiving the digital maps corresponding to the k scenes and the plurality of authorized spaces corresponding to the first user identifier in the digital map corresponding to each scene that are sent by the server; and selecting the first scene from the k scenes according to a preset rule, and obtaining the first digital map corresponding to the first scene.

Optionally, the selecting the first scene from the k scenes according to a preset rule includes: selecting a scene closest to a location of the terminal from the k scenes as the first scene; or selecting a scene with a highest priority from the k scenes as the first scene; or selecting a default scene from the k scenes as the first scene.

Optionally, an embodiment of an implementation process of determining the first scene based on the first user identifier includes: sending the first user identifier and a scene requirement to the server, so that the server obtains, based on the first user identifier, k scenes corresponding to the first user identifier, and obtains, from the k scenes, the first scene satisfying the scene requirement; and receiving the first scene sent by the server.

Optionally, the first editing manner includes one or more of an addition manner, a deletion manner, a replacement manner, and a movement manner based on preset relative displacement.

Optionally, in a digital map, different user identifiers correspond to different authorized spaces.

According to a ninth aspect, a method for synchronizing content in a plurality of authorized spaces based on a digital map is provided. The method includes: obtaining a first user identifier, first media content, and a first editing manner that are sent by a terminal, where the first media content is media content included in a first authorized space, the first authorized space is a three-dimensional space corresponding to the first user identifier in a first digital map corresponding to a first scene, and the first digital map includes a panorama, a point cloud map, or a grid model; obtaining, based on the first user identifier, a second digital map corresponding to a second scene, where the second digital map includes a second authorized space, the second authorized space is a three-dimensional space corresponding to the first user identifier in the digital map corresponding to the second scene, and the second authorized space includes the first media content; and editing, in the first editing manner, the first media content included in the second authorized space.

In this embodiment of this application, after receiving the first media content and the first editing manner, a server may search for the first media content in an authorized space corresponding to the first user identifier in a digital map corresponding to another scene, and edit the found first media content in the first editing manner, to implement synchronous editing of same media content in a plurality of authorized spaces. In this way, the server can automatically complete editing the media content in the plurality of authorized spaces. This improves editing efficiency, and ensures effect consistency of the media content in the plurality of authorized spaces.

Optionally, after the editing, in the first editing manner, the first media content included in the second authorized space, the method further includes:
if edited media content does not match the second authorized space, adjusting the edited media content, so that adjusted media content matches the second authorized space.

Optionally, the first editing manner includes one or more of an addition manner, a deletion manner, a replacement manner, and a movement manner based on preset relative displacement.

Optionally, in a digital map, different user identifiers correspond to different authorized spaces.

According to a tenth aspect, a method for sharing media content based on a digital map is provided. The method is applied to a second terminal, and the method includes: obtaining a video of a target scene that is sent by a first terminal, where the video of the target scene carries a target pose existing when the first terminal shoots the video of the target scene; obtaining to-be-displayed target media content based on the target pose; and playing the video of the target scene, and rendering the target media content when playing the video of the target scene.

In this embodiment of this application, the second terminal may receive the video of the target scene that is shared by the first terminal, obtain, from a server based on the target pose included in the video, media content added at a corresponding location, and display the media content. In this way, terminals can share, by using a video sharing method, media content added to a digital map. This facilitates media content propagation.

Optionally, an embodiment of an implementation process of obtaining the to-be-displayed target media content based on the target pose may include: sending the target pose to a server, so that the server obtains the target media content based on the target pose; and receiving the target media content sent by the server.

According to an eleventh aspect, an apparatus for displaying an authorized space based on a digital map is provided. The apparatus for displaying an authorized space based on a digital map has a function of implementing behavior in the method for displaying an authorized space based on a digital map in the foregoing first aspect. The apparatus for displaying an authorized space based on a digital map includes at least one module, and the at least one module is configured to implement the method for displaying an authorized space based on a digital map that is provided in the first aspect.

According to a twelfth aspect, an apparatus for synchronizing content in a plurality of authorized spaces based on a digital map is provided. The apparatus for synchronizing content in a plurality of authorized spaces based on a digital map has a function of implementing behavior in the method for synchronizing content in a plurality of authorized spaces based on a digital map in the second aspect or the fourth aspect. The apparatus for synchronizing content in a plurality of authorized spaces based on a digital map includes at least one module, and the at least one module is configured to implement the method for synchronizing content in a plurality of authorized spaces based on a digital map that is provided in the second aspect.

According to a thirteenth aspect, an apparatus for synchronizing content in a plurality of authorized spaces based on a digital map is provided. The apparatus for synchronizing content in a plurality of authorized spaces based on a digital map has a function of implementing behavior in the method for synchronizing content in a plurality of authorized spaces based on a digital map in the third aspect or the fifth aspect. The apparatus for synchronizing content in a plurality of authorized spaces based on a digital map includes at least one module, and the at least one module is configured to implement the method for synchronizing content in a plurality of authorized spaces based on a digital map that is provided in the third aspect.

According to a fourteenth aspect, an apparatus for sharing media content based on a digital map is provided. The apparatus for sharing media content based on a digital map has a function of implementing behavior in the method for sharing media content based on a digital map in the sixth aspect. The apparatus for sharing media content based on a digital map includes at least one module, and the at least one module is configured to implement the method for sharing media content based on a digital map that is provided in the fourth aspect.

According to a fifteenth aspect, an apparatus for displaying an authorized space based on a digital map is provided. A structure of the apparatus for displaying an authorized space based on a digital map includes a processor, a memory, a camera, a transceiver, and a communications bus. The processor, the memory, the camera, and the transceiver are all connected through the communications bus. The memory is configured to store a program that supports the apparatus for displaying an authorized space based on a digital map to perform the method for displaying an authorized space based on a digital map in the first aspect, and store data for implementing the method for displaying an authorized space based on a digital map in the first aspect. The camera is configured to collect a video stream. The transceiver is configured to receive or send data. The processor executes the program stored in the memory to control the camera and the transceiver to implement the method for synchronizing content in a plurality of authorized spaces based on a digital map in the first aspect.

According to a sixteenth aspect, an apparatus for synchronizing content in a plurality of authorized spaces based on a digital map is provided. A structure of the apparatus for synchronizing content in a plurality of authorized spaces based on a digital map includes a processor, a memory, a camera, a transceiver, and a communications bus. The processor, the memory, the camera, and the transceiver are all connected through the communications bus. The memory is configured to store a program that supports the apparatus for synchronizing content in a plurality of authorized spaces based on a digital map to perform the method for synchronizing content in a plurality of authorized spaces based on a digital map in the second aspect or the fourth aspect, and store data for implementing the method for synchronizing content in a plurality of authorized spaces based on a digital map in the second aspect or the fourth aspect. The camera is configured to collect a video stream. The transceiver is configured to receive or send data. The processor executes the program stored in the memory to control the camera and the transceiver to implement the method for synchronizing content in a plurality of authorized spaces based on a digital map in the second aspect or the fourth aspect.

According to a seventeenth aspect, an apparatus for synchronizing content in a plurality of authorized spaces based on a digital map is provided. A structure of the apparatus for synchronizing content in a plurality of authorized spaces based on a digital map includes a processor, a memory, a transceiver, and a communications bus. The processor, the memory, and the transceiver are all connected through the communications bus. The memory is configured to store a program that supports the apparatus for synchronizing content in a plurality of authorized spaces based on a digital map to perform the method for synchronizing content in a plurality of authorized spaces based on a digital map in the third aspect or the fifth aspect, and store data for implementing the method for synchronizing content in a plurality of authorized spaces based on a digital map in the third aspect or the fifth aspect. The transceiver is configured to receive or send data. The processor executes the program stored in the memory to control the transceiver to implement the method for synchronizing content in a plurality of authorized spaces based on a digital map in the third aspect or the fifth aspect.

According to an eighteenth aspect, an apparatus for sharing media content based on a digital map is provided. A structure of the apparatus for sharing media content based on a digital map includes a processor, a memory, a camera, a transceiver, and a communications bus. The processor, the memory, the camera, and the transceiver are all connected through the communications bus. The memory is configured to store a program that supports the apparatus for sharing media content based on a digital map to perform the method for sharing media content based on a digital map in the sixth aspect, and store data for implementing the method for sharing media content based on a digital map in the sixth aspect. The camera is configured to collect a video stream. The transceiver is configured to receive or send data. The processor executes the program stored in the memory to control the camera and the transceiver to implement the method for sharing media content based on a digital map in the sixth aspect.

According to a nineteenth aspect, a virtual space registration method is provided. The method includes: A terminal logs in to a preset application based on a first user identifier, where the preset application is used to register, for the first user identifier on a server based on a scene photographed by the terminal, a virtual space with virtual object editing permission; presents a first interface, where the first interface includes a virtual space registration option; in response to an enabling operation of a user for the virtual space registration option, photographs a first scene to obtain a preview stream; obtains a target geometry; and sends the first user identifier, the preview stream, and the target geometry to the server, where the preview stream and the target geometry are used to determine a target virtual space in which a user with the first user identifier has virtual content editing permission in a first virtual space, the first virtual space is a virtual space corresponding to a real world including the first scene, and the target geometry is used to represent a form of the target virtual space.

According to a twentieth aspect, a virtual space registration apparatus is provided. The apparatus includes: a login module, configured to log in to a preset application based on a first user identifier, where the preset application is used to register, for the first user identifier on a server based on a scene photographed by a terminal, a virtual space with virtual object editing permission; a display module, configured to present a first interface, where the first interface includes a virtual space registration option; a response module, configured to: in response to an enabling operation of a user for the virtual space registration option, photograph a first scene to obtain a preview stream; an obtaining module, configured to obtain a target geometry; and a sending module, configured to send the first user identifier, the preview stream, and the target geometry to the server, where the preview stream and the target geometry are used to determine a target virtual space in which a user with the first user identifier has virtual content editing permission in a first virtual space, the first virtual space is a virtual space corresponding to a real world including the first scene, and the target geometry is used to represent a form of the target virtual space.

According to the nineteenth aspect or the twentieth aspect, in a possible embodiment, after the target geometry is obtained, the target geometry is rendered or displayed in the preview stream. This operation may be performed by the display module.

According to the nineteenth aspect or the twentieth aspect, in a possible embodiment, the obtaining a target geometry includes: obtaining a default geometry in the preset application, and using the default geometry as the target geometry; or obtaining a user-defined geometry as the target geometry; or obtaining, according to a selection instruction of the user in a geometry material library, a geometry selected by the user as the target geometry; or obtaining the target geometry that is adapted to the first scene and that is sent by the server. This operation may be performed by the obtaining module.

According to the nineteenth aspect or the twentieth aspect, in a possible embodiment, after the sending the first user identifier, the preview stream, and the target geometry to the server, the method further includes: receiving a feedback instruction sent by the server, where the feedback instruction indicates that the terminal successfully registers the target virtual space based on the target geometry, or cannot successfully register the target virtual space based on the target geometry. This operation may be performed by a receiving module (which is an optional module) in the apparatus.

According to the nineteenth aspect or the twentieth aspect, in a possible embodiment, when the feedback instruction indicates that the terminal cannot successfully register the target virtual space based on the target geometry, the method further includes: prompting, in a current display interface, the user that a shape of the target geometry needs to be updated; or prompting, in a current display interface, the user with a valid area or a parameter range in which a virtual space can be successfully registered; or prompting, in a current display interface, the user to re-apply for a virtual space. This operation may be performed by the display module.

According to the nineteenth aspect or the twentieth aspect, in a possible embodiment, when the feedback instruction indicates that the terminal successfully registers the target virtual space based on the target geometry, the method further includes: prompting the user with a validity period of the target virtual space for the first user identifier, where the validity period indicates that a user with the first user identifier has the virtual content editing permission in the target virtual space within the validity period. This operation may be performed by the display module.

According to the nineteenth aspect or the twentieth aspect, in a possible embodiment, after the feedback instruction indicates that the terminal successfully registers the target virtual space based on the target geometry, the method further includes: displaying or rendering the target virtual space in the preview stream of the first scene, where a relative location relationship between the target virtual space and the first scene remains unchanged in the preview stream. This operation may be performed by the display module.

According to the nineteenth aspect or the twentieth aspect, in a possible embodiment, the method further includes: setting target virtual content in the target virtual space, where the target virtual content does not exceed a boundary of the target virtual space. The setting of the target virtual content may be performed by a setting module. Further, the method includes: sending the target virtual content and a pose of the terminal to the server, where the target virtual content and the pose of the terminal are used to render the first scene. This operation may be performed by the sending module.

According to a twenty-first aspect, a virtual space registration method is provided. The method includes: receiving a first user identifier, a preview stream of a first scene, and a target geometry that are sent by a terminal, where the preview stream of the first scene is obtained by the terminal by photographing the first scene; and determining a target virtual space corresponding to the first user identifier based on the preview stream of the first scene and the target geometry, where the target geometry is used to determine a form of the target virtual space, the target virtual space indicates a space range for a user with the first user identifier to place virtual content in a first virtual space, the first virtual space is a virtual space corresponding to a real world including the first scene, and the virtual content is used to render the first scene.

According to a twenty-second aspect, a virtual space registration apparatus is provided. The apparatus includes: a receiving module, configured to receive a first user identifier, a preview stream of a first scene, and a target geometry that are sent by a terminal, where the preview stream of the first scene is obtained by the terminal by photographing the first scene; and a determining module, configured to determine a target virtual space corresponding to the first user identifier based on the preview stream of the first scene and the target geometry, where the target geometry is used to determine a form of the target virtual space, the target virtual space indicates a space range for a user with the first user identifier to place virtual content in a first virtual space, the first virtual space is a virtual space corresponding to a real world including the first scene, and the virtual content is used to render the first scene.

According to the twenty-first aspect or the twenty-second aspect, in a possible embodiment, the determining a target virtual space corresponding to the first user identifier based on the preview stream of the first scene and the target geometry includes: obtaining first pose information of the terminal in the first virtual space based on the preview stream of the first scene and the first virtual space; obtaining second pose information of the target geometry in the first virtual space based on the target geometry and the first virtual space; and determining the target virtual space based on the first pose information, the second pose information, and the target geometry. This operation may be performed by the determining module. In a possible embodiment, the first virtual space is locally stored in the terminal or stored in a server. The first pose information is obtained by the server through calculation, or is obtained by the terminal through calculation. The second pose information is obtained by the server through calculation, or is obtained by the terminal through calculation.

According to the twenty-first aspect or the twenty-second aspect, in a possible embodiment, when the target virtual space satisfies a preset management rule, the method further includes: The server sends a feedback instruction to the terminal, where the feedback instruction indicates that the terminal successfully registers the target virtual space based on the target geometry, and the preset management rule includes: space ranges for users with different user identifiers to place virtual content in the first virtual space do not overlap within a same time period. This operation may be performed by an optional sending module of the apparatus.

According to the twenty-first aspect or the twenty-second aspect, in a possible embodiment, when the target virtual space cannot satisfy a preset management rule, the method further includes: The server sends a feedback instruction to the terminal, where the feedback instruction indicates that the terminal cannot successfully register the target virtual space based on the target geometry, and the preset management rule includes: space ranges for users with different user identifiers to place virtual content in the first virtual space do not overlap within a same time period. This operation may be performed by an optional sending module of the apparatus.

According to the twenty-first aspect or the twenty-second aspect, in a possible embodiment, when the target virtual space cannot satisfy a preset management rule in a server, the server sends prompt information to the terminal, where the prompt information prompts a user that a shape of the target geometry needs to be updated, prompts a user with a valid area or a parameter range in which a virtual space can be successfully registered, or prompts a user to re-apply for a virtual space. This operation may be performed by an optional sending module of the apparatus.

According to the twenty-first aspect or the twenty-second aspect, in a possible embodiment, the method further includes: obtaining target virtual content; obtaining a pose of the target virtual content; and setting the target virtual content in the target virtual space based on the pose of the target virtual content, where the target virtual content does not exceed a boundary of the target virtual space. This operation may be performed by an optional setting module of the apparatus. The target virtual content or the pose of the target virtual content is determined by the terminal or the server.

According to a twenty-third aspect, a digital space management method is provided, including: A terminal receives a first operation of a user; collecting a preview stream of a target scene in response to the first operation; obtains a first user identifier; sends the first user identifier, the preview stream of the target scene, and an authorized space request to a server; receives n authorized spaces sent by the server, where the n authorized spaces are determined by the server based on the first user identifier, the preview stream of the target scene, and the authorized space request, the n authorized spaces are n non-overlapping three-dimensional spaces that correspond to the first user identifier in a first virtual scene and that can be used for rendering, the first virtual scene is a model space corresponding to the target scene in a target digital map, a real scene corresponding to the target digital map includes the target scene, and n is an integer greater than or equal to 1; and presents the preview stream of the target scene, and renders the n authorized spaces in the preview stream of the target scene, where the n authorized spaces are used to indicate a space range in which media content editing is currently allowed in the first virtual scene, and authorized spaces corresponding to different user identifiers in the target digital map do not overlap within a same time period.

According to the twenty-third aspect, in a possible embodiment, after the rendering the n authorized spaces in the preview stream of the target scene, the method further includes: obtaining target media content, where the target media content includes one or more of a text, a picture, audio, a video, and a model; receiving a second operation, and adding the target media content to a rendered target authorized space in response to the second operation, where the target authorized space is any one of the n authorized spaces; and rendering the target media content in the preview stream of the target scene.

According to the twenty-third aspect, in a possible embodiment, the second operation includes dragging, and the responding to a second operation, and adding the target media content to a target authorized space includes: selecting the target media content, and placing the target media content at a drag end location indicated by the drag instruction, where the end location corresponds to a three-dimensional coordinate point in the target authorized space; and adjusting the target media content at the placement location based on a first posture, where the first posture corresponds to three-degree-of-freedom rotation in the target authorized space, and a display manner of a part that is of the target media content and that is inside the target authorized space is different from that of a part that is of the target media content and that is outside the target authorized space, or a part that is of the target media content and that is inside the target authorized space is visible and a part that is of the target media content and that is outside the target authorized space is invisible.

According to the twenty-third aspect, in a possible embodiment, the method further includes: determining a target pose of the target media content in the target digital map; and sending a first update instruction, the target media content, and the target pose to the server, where the first update instruction, the target media content, and the target pose are used to update the target authorized space that is in the target digital map and that is stored in the server.

According to the twenty-third aspect, in a possible embodiment, the determining a target pose of the target media content in the target digital map further includes: obtaining a first pose of the terminal in the target digital map; obtaining a first relative pose between the target media content and the first pose; and obtaining the target pose based on the first pose and the first relative pose.

According to the twenty-third aspect, in a possible embodiment, the method further includes: sending a space screening condition to the server, where that the n authorized spaces are determined by the server based on the first user identifier and the preview stream of the target scene includes: the n authorized spaces are determined by the server based on the first user identifier, the preview stream of the target scene, and the space screening condition.

According to the twenty-third aspect, in a possible embodiment, the receiving n authorized spaces sent by the server includes: sending a space registration request to the server, where the space registration request is used to apply to the server for an authorized space in the first virtual scene, and the space registration request carries a requirement parameter for applying for an authorized space in the digital map; and receiving the n authorized spaces sent by the server, where the n authorized spaces are allocated by the server to the first user identifier in the first virtual scene based on a requirement for the authorized space.

According to the twenty-third aspect, in a possible embodiment, the rendering the n authorized spaces in the preview stream of the target scene includes: rendering the n authorized spaces in the preview stream of the target scene in a preset display form, where the preset display form includes one or more of a preset color, preset transparency, a cubic space, and a spherical space.

According to the twenty-third aspect, in a possible embodiment, after the rendering the n authorized spaces in the preview stream of the target scene, the method further includes: if poses of the n authorized spaces do not match poses in the preview stream of the target scene, receiving a third operation, and adjusting the poses of the n authorized spaces in the target digital map in response to the third operation, so that the poses of the n authorized spaces match the poses in the preview stream of the target scene; and sending adjusted poses of the n authorized spaces to the server, where the adjusted poses of the n authorized spaces are used to update the poses stored in the server that are of the n authorized spaces in the target digital map.

According to the twenty-third aspect, in a possible embodiment, the method further includes: marking an attribute of the target media content as renderable; and sending the attribute of the target media content to the server.

According to the twenty-third aspect, in a possible embodiment, after the rendering the n authorized spaces in the preview stream of the target scene, the method further includes: determining target media content in rendered media content in a target authorized space, where the target authorized space is any one of the n authorized spaces; receiving a second operation, and deleting the target media content from the rendered target authorized space in response to the second operation; and sending the target media content and an instruction for deleting the target media content to the server, where the target media content and the instruction for deleting the target media content are used to update the target authorized space that is in the target digital map and that is stored in the server.

According to a twenty-fourth aspect, a method for managing an authorized space based on a digital map is provided. The method includes: receiving a first user identifier, a preview stream of a target scene, and an authorized space request that are sent by a terminal; obtaining a first pose in a target digital map based on the preview stream of the target scene, where a real world corresponding to the target digital map includes the target scene; determining a first virtual scene in the target digital map based on the first pose, where the first virtual scene is a model space corresponding to the target scene in the target digital map; determining, in the first virtual space based on the first user identifier, n authorized spaces corresponding to the first user identifier, where the n authorized spaces are non-overlapping three-dimensional spaces that can be used for rendering, the n authorized spaces are used to indicate a space range in which media content editing is allowed in the first virtual scene, and authorized spaces corresponding to different user identifiers in the target digital map do not overlap; and sending the n authorized spaces to the terminal in response to the authorized space request, where the n authorized spaces are used to render the preview stream of the target scene.

According to the twenty-fourth aspect, in a possible embodiment, the method further includes: obtaining a target pose in the target digital map; obtaining target media content; receiving a first update instruction sent by the terminal; and adding the target media content to the target digital map based on the target pose in response to the first update instruction.

According to the twenty-fourth aspect, in a possible embodiment, the method further includes: obtaining a target object, where the target object is a preset image or three-dimensional object, and the target digital map includes the target object; obtaining a second relative pose relationship between the target media content and the target object in the target digital map; receiving a second update instruction sent by the terminal; and updating, based on the target object and the second relative pose relationship in response to the second update instruction, content in another authorized space that corresponds to the first user identifier in the target digital map and that is stored in the server, where the another authorized space corresponding to the first user identifier includes the target object in a preset-range scene of the target digital map.

According to the twenty-fourth aspect, in a possible embodiment, the determining, in the first virtual space based on the first user identifier, n authorized spaces corresponding to the first user identifier includes: receiving a space screening condition sent by the terminal; finding m authorized spaces in the first virtual space based on the first user identifier and the preview stream of the target scene; and determining the n authorized spaces satisfying the condition from the m authorized spaces based on the space screening condition.

According to the twenty-fourth aspect, in a possible embodiment, the determining, in the first virtual space based on the first user identifier, n authorized spaces corresponding to the first user identifier includes: receiving a space registration request sent by the terminal, where the space registration request is used to apply to the server for registering an authorized space in the first virtual scene, and the space registration request carries a requirement parameter for registering an authorized space in the digital map; and allocating the n authorized spaces in the first virtual scene based on the requirement parameter for applying for the authorized space and the first user identifier in response to the space registration request.

According to the twenty-fourth aspect, in a possible embodiment, the method further includes: obtaining target media content, where the target media content is one piece of rendered media content in the target digital map; obtaining a target pose of the target media content in the target digital map; receiving an instruction sent by the terminal for deleting the target media content; and deleting the target media content at the target pose in the target digital map in response to the instruction for deleting the target media content.

According to a twenty-fifth aspect, a method for sharing media content based on a digital map is provided. The method is applied to a second terminal, and the method includes: receiving an image that is of a target scene and that is sent by a first terminal, where the image of the target scene carries a target pose, the target pose is a pose corresponding to the first terminal in a target digital map when the first terminal shoots the image of the target scene, and a real world corresponding to the target digital map includes the target scene; receiving a first operation of a user, and sending the target pose and a content request to a server in response to the first operation; receiving target media content sent by the server, where the target media content is obtained by the server based on the target pose and the content request, the target content includes renderable media content in a model space corresponding to the target scene in the target digital map, and the target media content includes one or more of a text, a picture, audio, a video, and a model; and presenting the image of the target scene, and rendering the target media content in the image of the target scene.

According to a twenty-sixth aspect, a method for synchronizing content in a plurality of authorized spaces based on a digital map is provided. The method is applied to a terminal, and the method includes: obtaining a first user identifier; receiving a first operation of a user, and determining a first virtual scene in a target digital map based on the first user identifier in response to the first operation, where a real scene corresponding to the target digital map includes a real scene corresponding to the first virtual scene; displaying the first virtual scene, where the first virtual scene includes a first authorized space corresponding to the first user identifier, and the first authorized space indicates a space range in which media content editing is currently allowed; determining a target object, where the target object is a preset image or three-dimensional object, and the first virtual scene includes the target object; receiving a second operation of the user, and performing a first editing operation at a first location in response to the second operation, where the first editing operation includes content addition, content replacement, or content deletion; obtaining a first pose corresponding to the first location in the target digital map; obtaining a second pose corresponding to the target object in the target digital map; determining a target relative pose between the first pose and the second pose; and sending a target update instruction, the first user identifier, the first editing operation, the target object, and the target relative pose to a server, where the target update instruction, the first user identifier, the first editing operation, the target object, and the target relative pose are used to update a second virtual scene that corresponds to the first user identifier in the target digital map and that is stored in the server, and the second virtual scene includes the target object.

According to the twenty-sixth aspect, in a possible embodiment, when the first editing operation is content addition, the method further includes: obtaining to-be-added media content; and sending the to-be-added media content to the server, where the to-be-added media content is used to update the second virtual scene that corresponds to the first user identifier in the target digital map and that is stored in the server; or when the first editing operation is content deletion, the method further includes: obtaining to-be-deleted media content; and sending the to-be-deleted media content to the server, where the to-be-deleted media content is used to update the second virtual scene that corresponds to the first user identifier in the target digital map and that is stored in the server; or when the first editing operation is content replacement, the method further includes: obtaining to-be-deleted media content; obtaining to-be-added media content; and sending the to-be-added media content and the to-be-deleted media content to the server, where the to-be-added media content and the to-be-deleted media content are used to update the second virtual scene that corresponds to the first user identifier in the target digital map and that is stored in the server.

According to a twenty-seventh aspect, a method for synchronizing content in a plurality of authorized spaces based on a digital map is provided. The method includes: obtaining a first user identifier, a first editing operation, a target object, a target relative pose, and a target update instruction that are sent by a terminal, where the first editing operation includes content addition, content replacement, or content deletion, and the target object is a preset non-editable image or three-dimensional object; determining a second virtual scene in a target digital map based on the first user identifier, where the second virtual scene includes the target object, and the target digital map is pre-stored in a server; determining a third pose of the target object in the second virtual scene in the target digital map; determining a fourth pose in the target digital map based on the third pose and the target relative pose; and performing the first editing operation at the fourth pose in the target digital map in response to the target update instruction, to update the second virtual scene.

According to the twenty-seventh aspect, in a possible embodiment, when the first editing operation is content addition, the method further includes: obtaining to-be-added media content sent by the terminal; and the performing the first editing operation at the fourth pose in the target digital map includes: adding the to-be-added media content at the fourth pose in the target digital map; or when the first editing operation is content deletion, the method further includes: obtaining to-be-deleted media content; and the performing the first editing operation at the fourth pose in the target digital map includes: deleting the to-be-deleted media content at the fourth pose in the target digital map; or when the first editing operation is content replacement, the method further includes: obtaining to-be-deleted media content; and obtaining to-be-added media content; and the performing the first editing operation at the fourth pose in the target digital map includes: deleting the to-be-deleted media content at the fourth pose in the target digital map; and adding the to-be-added media content at the fourth pose in the target digital map.

According to a twenty-eighth aspect, a computer-readable storage medium is provided. The computer-readable storage medium stores instructions, and when the instructions are run on a computer, the computer is enabled to perform the method in any one of the foregoing possible embodiments.

According to a twenty-ninth aspect, a computer program product including instructions is provided. When the computer program product runs on a computer, the computer is enabled to perform the method in any one of the foregoing possible embodiments.

Beneficial effects brought by the technical solutions provided in this application include at least the following:

A developer may apply for a virtual space in a "what you see is what you get" manner, especially a "legal" and "authorizable" virtual space, and edit virtual content in a virtual space with editing permission, so that a server performs synchronization based on a design of the developer on a terminal. In this way, a content effect expected by the developer can be achieved when a consumer terminal augments or renders a scanned real scene.

The terminal may simultaneously obtain digital maps corresponding to a plurality of scenes and an authorized space corresponding to the first user identifier in each digital map, then add the target media content to an authorized space, determine a relative location relationship between the target media content and the target object, and send the relative location relationship, the target object, and the target media content to the server. The server may search for a feature matching the target object in a digital map corresponding to another scene, and synchronize, based on the relative location relationship, the target media content to another authorized space corresponding to the first user identifier. In this way, the server can automatically complete adding media content in a plurality of authorized spaces. This improves addition efficiency, ensures effect consistency of the media content in the plurality of authorized spaces, and can ensure addition accuracy.

DESCRIPTION OF EMBODIMENTS

Figure 1:
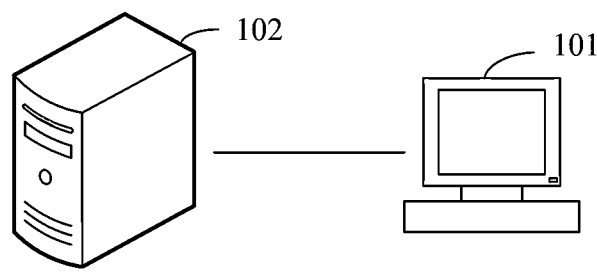
FIG. 1 is a diagram of a system architecture according to an embodiment of this application.

To make the objectives, technical solutions, and advantages of this application clearer, the following further describes the embodiments and implementations of this application in detail with reference to the accompanying drawings.

It should be understood that ordinal numerals such as "first" and "second" or similar modifiers such as "target" in embodiments of this application are used to distinguish between a plurality of objects, but are not used to limit a size, content, a sequence, a time sequence, a priority, importance, or the like of an object.

Before embodiments of this application are described in detail, an application scenario in embodiments of this application is first described.

Based on geographic information of the real world, a digital map (which may also be understood as a digital space or a virtual space) constructed by using a technology such as AR or VR relatively intuitively describes the real world, and can provide great convenience for traveling of people. The digital map may include a panorama, a point cloud map, a grid model, or the like. In embodiments of this application, the grid model may also be referred to as a grid map. Buildings, lands, and the like in the real world may be presented in a corresponding virtual space in a digital map in a three-dimensional manner. In this case, a user may need to display media content in a space corresponding to the buildings, the lands, or the like presented in the virtual space in the digital map. For example, it is assumed that there are one or more stores of a commercial brand in the real world. When there is a to-be-advertised product or service in the stores, a user may apply for authorized spaces (that is, virtual spaces with virtual content editing permission) in digital maps corresponding to these stores, and then add corresponding media content such as a video, an animation, or a picture for information recommendation to the authorized spaces. For another example, for a building in the real world, if a user wants to identify the building presented in a digital map, the user may add media content such as a picture or a text at a location of the building in the digital map. Based on this, an embodiment of this application provides a method for displaying an authorized space based on a digital map, so that a registered user views an authorized space of the registered user in real time, and adds media content to the authorized space. In addition, an embodiment of this application further provides a method for synchronizing content in a plurality of authorized spaces based on a digital map, so that a registered user adds media content to a plurality of authorized spaces in batches. In addition, an embodiment of this application further provides a method for sharing media content based on a digital map, so that a consumer obtains and views media content in a corresponding authorized space by using a video shared by another consumer.

The following two possible scenarios are provided in embodiments of this application.

In a first scenario, it is assumed that a mobile phone brand has 100 stores in a city A, a new mobile phone is currently on the market and needs to be advertised, and a user wants to present AR content such as a picture, a text, a video, an animation, or a three dimensional (3D) model near logos of the stores. In this case, the user may automatically synchronize the to-be-added AR content to the 100 stores by using the content synchronization method provided in embodiments of this application without a manual operation of the user. This improves addition efficiency.

In a second scenario, it is assumed that a user of a boutique wants to edit and see, in real time, an advertisement effect of AR content added by the user. In this case, the user may hold a terminal in an environment in which the boutique of the user is located, the terminal may display an authorized space in real time by using the authorized space display method provided in embodiments of this application, and the user may add media content to the authorized space in real time by interacting with the terminal, and view an effect of the media content added by the user.

A system architecture used in the embodiments of this application is described below.

FIG. 1 is a diagram of a system architecture related to a media content addition method according to an embodiment of this application. As shown in FIG. 1, the system includes a terminal 101 and a server 102. The terminal 101 and the server 102 may communicate with each other by using a wired network or a wireless network.

It should be noted that the terminal 101 may collect an image of the real world, and display the collected real world image in real time. In addition, the terminal 101 may further obtain space information of an authorized space of a current user in a digital map from the server 102 based on a user identifier of the current user, then display the authorized space in a user interface, and add media content to the authorized space according to the media content addition method provided in embodiments of this application. If there is added media content in the authorized space, the terminal 101 may further obtain the added media content from the server, and display the media content in the authorized space by using an AR or VR or mixed reality (MR) technology. If the current user has no authorized space in the digital map, the terminal 101 may further apply for an authorized space in the digital map according to a user operation in a related implementation provided in embodiments of this application.

The server 102 stores space information of an authorized space owned by each user in the digital map. When receiving a user identifier sent by the terminal 101, the server 102 may obtain, based on the user identifier, space information of an authorized space owned by a user identified by the user identifier. In addition, the server 102 further stores information such as media content that has been added to each authorized space and a location and a posture of the media content. In this way, when the server 102 receives positioning information sent by the terminal 101, if an authorized space of the user of the terminal 101 exists at a location indicated by the positioning information, and there is added media content in the authorized space, the server 102 may send, to the terminal 101, information such as the authorized space at the location indicated by the positioning information and the added media content in the space, so that the terminal 101 displays the authorized space and the corresponding media content in a user interface by using the AR or VR technology.

The terminal 101 may be a terminal device such as a mobile phone, a tablet computer, or a near-eye display device, and the server 102 may be a separate server, or may be a server cluster. When the server 102 is a server cluster, the server cluster may include a plurality of service nodes, and each service node may be configured to implement a different function. For example, the server cluster may include a media content service node, a digital map service node, and an edge service node. The edge service node may be configured to receive a request of the terminal 101 and feed back corresponding information to the terminal 101. The media content service node may be configured to store related information of media content that has been added to the digital map. The digital map service node may be configured to store related information of the digital map, for example, space information of each authorized space in the digital map, and map data of the digital map.

Figure 2:
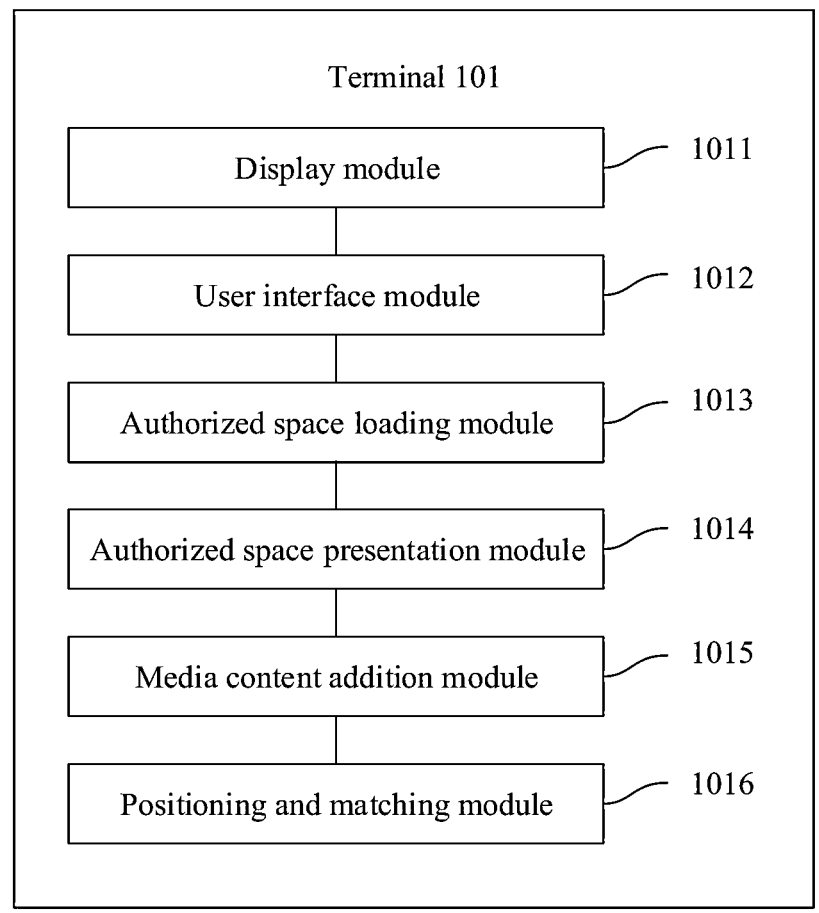
FIG. 2 is a block diagram of a software module of a terminal according to an embodiment of this application.

For example, referring to FIG. 2, the terminal 101 may include a display module 1011, a user interface module 1012, an authorized space loading module 1013, an authorized space presentation module 1014, a media content addition module 1015, and a positioning and matching module 1016.

The display module 1011 may be configured to display a real image collected in real time by the terminal 101, and display added media content in the digital map by using the AR or VR technology. The user interface module 1012 is configured to present a user interface, and interact with the user through the user interface. The authorized space loading module 1013 is configured to load obtained space information of an authorized space in the digital map. The authorized space presentation module 1014 is configured to perform visual presentation of the authorized space based on the space information of the authorized space. The media content addition module 1015 is configured to add media content to the digital map. The positioning and matching module 1016 is configured to obtain current positioning information and posture information of the terminal 101. In addition, the positioning and matching module 1016 is further configured to perform matching on the displayed real image and the digital map.

Figure 3:
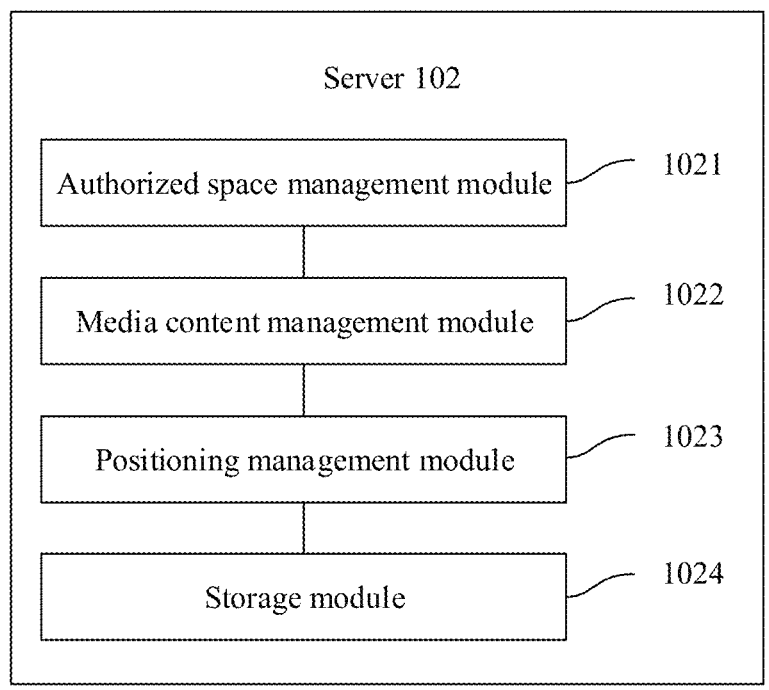
FIG. 3 is a block diagram of a software module of a server according to an embodiment of this application.

For example, referring to FIG. 3, the server 102 may include an authorized space management module 1021, a media content management module 1022, a positioning management module 1023, and a storage module 1024.

The authorized space management module 1021 is configured to process an authorized space application request sent by the terminal 101, and manage an authorized space owned by each user. The media content management module 1022 is configured to manage media content added to the digital map. The positioning management module 1023 is configured to respond to a positioning request of the terminal. The storage module 1024 is configured to store information such as data required by the foregoing modules.

Figure 4:
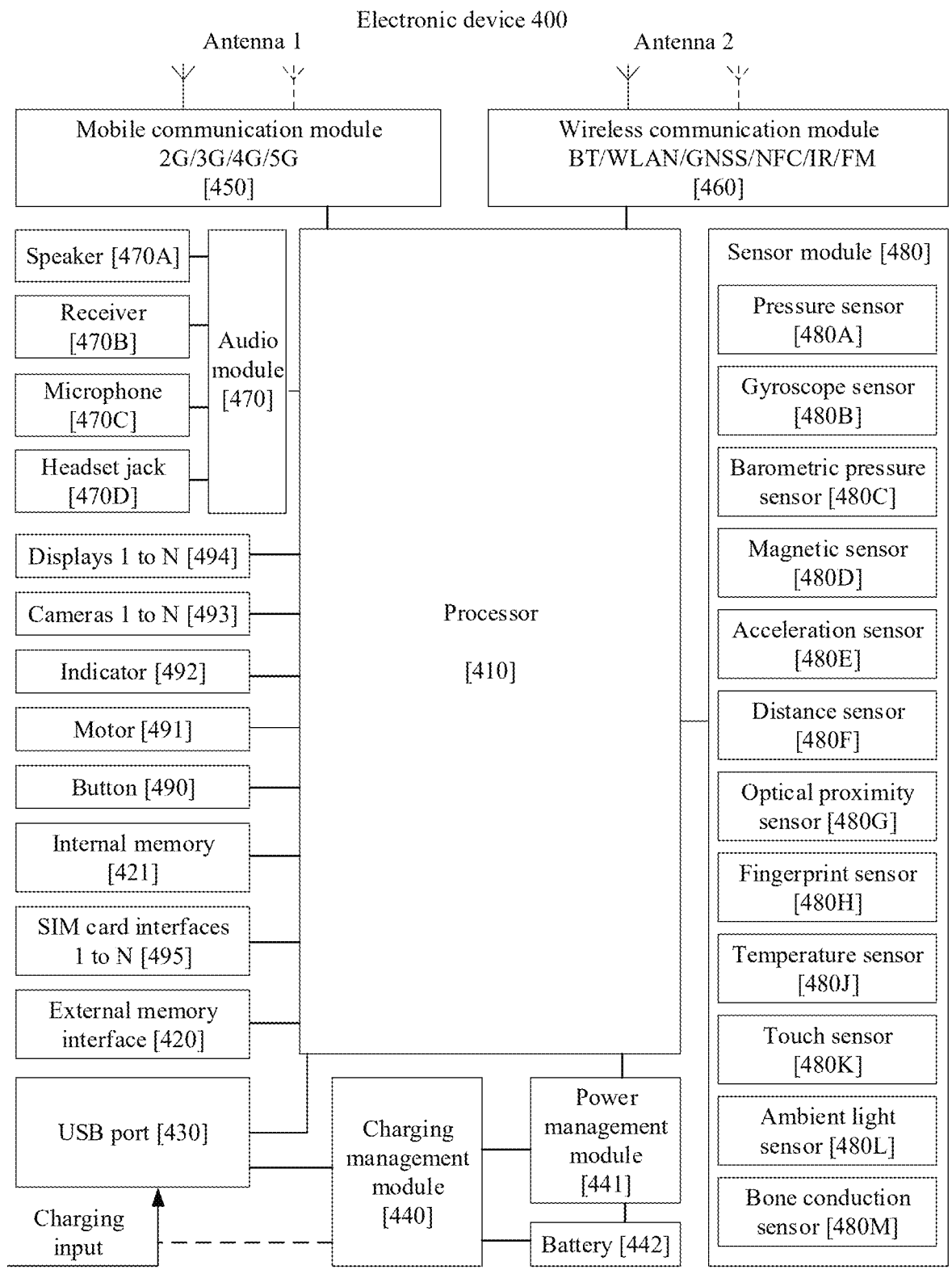
FIG. 4 is a schematic structural diagram of an electronic device according to an embodiment of this application.

FIG. 4 is a schematic diagram of a structure of an electronic device 400. Functions of a terminal in embodiments of this application may be implemented through the electronic device. However, this is not limited.

The electronic device 400 may include a processor 410, an external memory interface 420, an internal memory 421, a universal serial bus (USB) interface 430, a charging management module 440, a power management module 441, a battery 442, an antenna 1, an antenna 2, a mobile communication module 450, a wireless communication module 460, an audio module 470, a speaker 470A, a receiver 470B, a microphone 470C, a headset jack 470D, a sensor module 480, a button 490, a motor 491, an indicator 492, a camera 493, a display 494, a subscriber identification module (SIM) card interface 495, and the like. The sensor module 480 may include a pressure sensor 480A, a gyroscope sensor 480B, a barometric pressure sensor 480C, a magnetic sensor 480D, an acceleration sensor 480E, a distance sensor 480F, an optical proximity sensor 480G, a fingerprint sensor 480H, a temperature sensor 480J, a touch sensor 480K, an ambient light sensor 480L, a bone conduction sensor 480M, and the like.

It can be understood that a structure shown in this embodiment of the present disclosure does not constitute a specific limitation on the electronic device 400. In some other embodiments of this application, the electronic device 400 may include more or fewer components than those shown in the figure, or some components may be combined, or some components may be split, or components are arranged in different manners. The illustrated components may be implemented by hardware, software, or a combination of software and hardware.

The processor 410 may include one or more processing units. For example, the processor 410 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

The controller may generate an operation control signal based on an instruction operation code and a time sequence signal, to control instruction reading and instruction execution.

A memory may be disposed in the processor 410, and is configured to store an instruction and data. In some embodiments, the memory in the processor 410 is a cache memory. The memory may store an instruction or data that has just been used or is cyclically used by the processor 410. If the processor 410 needs to use the instruction or data again, the processor 410 may invoke the instruction or data directly from the memory. Therefore, repeated access is avoided, a waiting time of the processor 410 is reduced, and system efficiency is improved.

In some embodiments, the processor 410 may include one or more interfaces. The interface may be an integrated circuit (I2C) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a two-way synchronization serial bus, and includes one serial data line (SDA) and one serial clock line (SCL). In some embodiments, the processor 410 may include a plurality of groups of I2C buses. The processor 410 may be separately coupled to the touch sensor 480K, a charger, a flash, the camera 493, and the like by using different I2C bus interfaces. For example, the processor 410 may be coupled to the touch sensor 480K by using an I2C interface, so that the processor 410 communicates with the touch sensor 480K by using the I2C bus interface, to implement a touch function of the electronic device 400.

The I2S interface may be configured to perform audio communication. In some embodiments, the processor 410 may include a plurality of groups of I2S buses. The processor 410 may be coupled to the audio module 470 by using an I2S bus, to implement communication between the processor 410 and the audio module 470. In some embodiments, the audio module 470 may transmit an audio signal to the wireless communication module 460 over an I2S interface, to implement a function of answering a call over a Bluetooth headset.

The PCM interface may be also configured to perform audio communication, to perform sampling, quantization, and encoding on an analog signal. In some embodiments, the audio module 470 may be coupled to the wireless communication module 460 by using a PCM bus interface. In some embodiments, the audio module 470 may also transmit an audio signal to the wireless communication module 460 over a PCM interface, to implement a function of answering a call over a Bluetooth headset. Both the I2S interface and the PCM interface may be configured to perform audio communication.

The UART interface is a universal serial data line, and is configured to perform asynchronous communication. The bus may be a two-way communications bus. The bus converts to-be-transmitted data between serial communication and parallel communication. In some embodiments, the UART interface is usually configured to connect the processor 410 to the wireless communication module 460. For example, the processor 410 communicates with a Bluetooth module in the wireless communication module 460 by using the UART interface, to implement a Bluetooth function. In some embodiments, the audio module 470 may transmit an audio signal to the wireless communication module 460 over the UART interface, to implement a function of playing music over a Bluetooth headset.

The MIPI interface may be configured to connect the processor 410 to a peripheral component such as the display 494 or the camera 493. The MIPI interface includes a camera serial interface (CSI), a display serial interface (DSI), and the like. In some embodiments, the processor 410 communicates with the camera 493 by using the CSI interface, to implement a photographing function of the electronic device 400. The processor 410 communicates with the display 494 by using the DSI interface, to implement a display function of the electronic device 400.

The GPIO interface may be configured by using software. The GPIO interface may be configured as a control signal, or may be configured as a data signal. In some embodiments, the GPIO interface may be configured to connect the processor 410 to the camera 493, the display 494, the wireless communication module 460, the audio module 470, the sensor module 480, and the like. The GPIO interface may be further configured as an I2C interface, an I2S interface, a UART interface, an MIPI interface, or the like.

The USB interface 430 is an interface that meets a USB standard specification, and may be a Mini USB interface, a Micro USB interface, a USB Type C interface, or the like. The USB interface 430 may be configured to connect to the charger to charge the electronic device 400, or may be configured to transmit data between the electronic device 400 and a peripheral device, or may be configured to connect to a headset, to play audio by using the headset. Alternatively, the port may be configured to connect to another electronic device, for example, an AR device.

It may be understood that an interface connection relationship between the modules that is shown in this embodiment of the present disclosure is merely an example for description, and does not constitute a limitation on the structure of the electronic device 400. In some other embodiments of this application, the electronic device 400 may alternatively use an interface connection manner different from that in the foregoing embodiment, or use a combination of a plurality of interface connection manners.

The charging management module 440 is configured to receive a charging input from a charger. The charger may be a wireless charger, or may be a wired charger. In some embodiments of wired charging, the charging management module 440 may receive a charging input from the wired charger through the USB port 430. In some embodiments of wireless charging, the charging management module 440 may receive a wireless charging input through a wireless charging coil of the electronic device 400. When charging the battery 442, the charging management module 440 may further supply power to the electronic device by using the power management module 441.

The power management module 441 is configured to connect the battery 442, the charging management module 440, and the processor 410. The power management module 441 receives an input from the battery 442 and/or the charging management module 440, and supplies power to the processor 410, the internal memory 421, the display 494, the camera 493, the wireless communication module 460, and the like. The power management module 441 may be further configured to monitor parameters such as a battery capacity, a battery cycle count, and a battery health status (electric leakage or impedance). In some other embodiments, the power management module 441 may alternatively be disposed in the processor 410. In some other embodiments, the power management module 441 and the charging management module 440 may alternatively be disposed in a same component.

A wireless communication function of the electronic device 400 may be implemented through the antenna 1, the antenna 2, the mobile communication module 450, the wireless communication module 460, the modem processor, the baseband processor, and the like.

The antenna 1 and the antenna 2 are configured to transmit and receive an electromagnetic wave signal. Each antenna of the electronic device 400 may be configured to cover one or more communication frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communication module 450 may provide a wireless communication solution that includes 2G/3G/4G/5G or the like and that is applied to the electronic device 400. The mobile communication module 450 may include at least one filter, a switch, a power amplifier, a low noise amplifier (LNA), and the like. The mobile communication module 450 may receive an electromagnetic wave through the antenna 1, perform processing such as filtering and amplification on the received electromagnetic wave, and transmit a processed electromagnetic wave to the modem processor for demodulation. The mobile communication module 450 may further amplify a signal obtained after modulation by the modem processor, and convert the signal into an electromagnetic wave through the antenna 1 for radiation. In some embodiments, at least some functional modules of the mobile communication module 450 may be disposed in the processor 410. In some embodiments, at least some functional modules of the mobile communication module 450 and at least some modules of the processor 410 may be disposed in a same device.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 470A, the receiver 470B, or the like), or displays an image or a video on the display 494. In some embodiments, the modem processor may be an independent component. In some other embodiments, the modem processor may be independent of the processor 410, and is disposed in a same component with the mobile communication module 450 or another functional module.

The wireless communication module 460 may provide a solution to wireless communication applied to the electronic device 400, for example, a wireless local area network (WLAN) (for example, a wireless fidelity (Wi-Fi) network), Bluetooth (BT), a global navigation satellite system (GNSS), frequency modulation (FM), near field communication (NFC) technology, and an infrared (IR) technology. The wireless communication module 460 may be one or more components into which at least one communication processing module is integrated. The wireless communication module 460 receives an electromagnetic wave over the antenna 2, performs frequency modulation and filtering processing on an electromagnetic wave signal, and sends a processed signal to the processor 410. The wireless communication module 460 may further receive a to-be-sent signal from the processor 410, perform frequency modulation and amplification on the signal, and convert the signal into an electromagnetic wave for radiation over the antenna 2.

In some embodiments, the antenna 1 of the electronic device 400 is coupled to the mobile communication module 450, and the antenna 2 is coupled to the wireless communication module 460, so that the electronic device 400 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (long term evolution, LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The electronic device 400 implements a display function by using the GPU, the display 494, the application processor, and the like. The GPU is a microprocessor for image processing, and is connected to the display 494 and the application processor. The GPU is configured to perform mathematical and geometrical calculation, and is configured to perform graphics rendering. The processor 410 may include one or more GPUs that execute program instructions to generate or change display information.

The display 494 is configured to display an image, a video, and the like. The display 494 includes a display panel. The display panel may be a liquid crystal display (LCD), an organic light-emitting diode (OLED), an active-matrix organic light emitting diode or an active matrix organic light emitting diode (AMOLED), a flex light-emitting diode (FLED), a Miniled, a MicroLed, a Micro-oLed, a quantum dot light emitting diode LED (QLED), or the like. In some embodiments, the electronic device 400 may include one or N displays 494, where N is a positive integer greater than 1. The display may display an interface and prompt information in the present disclosure.

The electronic device 400 can implement a photographing function by using the ISP, the camera 493, the video codec, the GPU, the display 494, the application processor, and the like.

The ISP is configured to process data fed back by the camera 493. For example, during photo taking, a shutter is pressed, a ray of light is transmitted to a light-sensitive element of the camera lens through a lens, an optical signal is converted into an electrical signal, and the light-sensitive element of the camera lens transmits the electrical signal to the ISP for processing, and converts the electrical signal into an image that can be seen. The ISP may further perform algorithm optimization on noise, luminance, and complexion of the image. The ISP may further optimize parameters such as exposure and a color temperature of a photographing scenario. In some embodiments, the ISP may be disposed in the camera 493.

The camera 493 is configured to capture a still image or a video. An optical image of a body is generated through the lens, and the image is projected to the light-sensitive element. The light-sensitive element may be a charge coupled device (CCD) or a complementary metal-oxide-semiconductor (CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 400 may include one or N cameras 493, where N is a positive integer greater than 1. In the present disclosure, the camera may be invoked in a specific app.

The digital signal processor is configured to process a digital signal, and may further process another digital signal in addition to a digital image signal. For example, when the electronic device 400 performs frequency selection, the digital signal processor is configured to perform Fourier transform and the like on frequency energy.

The video codec is configured to compress or decompress a digital video. The electronic device 400 may support one or more video codecs. In this way, the electronic device 400 may play or record videos in a plurality of encoding formats, for example, moving picture experts group (MPEG) 1, MPEG 2, MPEG 3, and MPEG 4.

The NPU is a neural-network (NN) computing processor that processes input information rapidly by referring to a structure of a biological neural network, for example, by referring to a transmission mode between human brain neurons, and can further perform self-learning continuously. The NPU may be used to implement an application such as intelligent cognition of the electronic device 400, for example, image recognition, facial recognition, voice recognition, and text understanding.

The external memory interface 420 may be configured to connect to an external memory card, for example, a micro SD card, to extend a storage capability of the electronic device 400. The external storage card communicates with the processor 410 through the external memory interface 420, to implement a data storage function. For example, files such as music and a video are stored in the external memory card.

The internal memory 421 may be configured to store computer-executable program code, where the computer-executable program code includes instructions. The internal memory 421 may include a program storage area and a data storage area. The program storage area may store an operating system, an application program (for example, a sound playback function or an image playback function) required by at least one function, and the like. The data storage region may store data (for example, audio data and an address book) and the like created when the electronic device 400 is used. In addition, the internal memory 421 may include a high-speed random access memory, or may include a non-volatile memory such as at least one magnetic disk memory, a flash memory, or a universal flash storage (UFS). The processor 410 performs various function applications and data processing of the electronic device 400 by running the instructions stored in the internal memory 421 and/or the instructions stored in the memory disposed in the processor.

The electronic device 400 may implement audio functions by using the audio module 470, the speaker 470A, the receiver 470B, the microphone 470C, the headset jack 470D, the application processor, and the like.

The audio module 470 is configured to convert digital audio information into an analog audio signal for output, and is also configured to convert an analog audio input into a digital audio signal. The audio module 470 may further be configured to encode and decode an audio signal. In some embodiments, the audio module 470 may be disposed in the processor 410, or some functional modules of the audio module 470 may be disposed in the processor 410.

The speaker 470A, also referred to as a "loudspeaker", is configured to convert an audio electrical signal into a sound signal. The electronic device 400 may listen to music or answer a call in a hands-free mode over the speaker 470A.

The receiver 470B, also referred to as an "earpiece", is configured to convert an audio electrical signal into a sound signal. When a call is answered or audio information is listened to by using the electronic device 400, the receiver 470B may be put close to a human ear to listen to a voice.

The microphone 470C, also referred to as a "mike" or a "mic", is configured to convert a sound signal into an electrical signal. When making a call or sending a voice message, the user may make a sound near the microphone 470C through the mouth, to enter a sound signal to the microphone 470C. At least one microphone 470C may be disposed in the electronic device 400. In some other embodiments, two microphones 470C may be disposed in the electronic device 400, to collect a sound signal and implement a noise reduction function. In some other embodiments, three, four, or more microphones 470C may be alternatively disposed in the electronic device 400, to collect a sound signal, implement noise reduction, recognize a sound source, implement a directional recording function, and the like.

The headset jack 470D is configured to connect to a wired headset. The headset jack 470D may be the USB interface 430, or may be a 3.5 mm open mobile terminal platform (OMTP) standard interface or a cellular telecommunications industry association of the USA (CTIA) standard interface.

The pressure sensor 480A is configured to sense a pressure signal, and can convert the pressure signal into an electrical signal. In some embodiments, the pressure sensor 480A may be disposed on the display 494. There are a plurality of types of pressure sensors 480A, such as a resistive pressure sensor, an inductive pressure sensor, and a capacitive pressure sensor. The capacitive pressure sensor may include at least two parallel plates made of conductive materials. When force is exerted on the pressure sensor 480A, capacitance between electrodes changes. The electronic device 400 determines pressure strength based on the change of the capacitance. When a touch operation is performed on the display 494, the electronic device 400 detects intensity of the touch operation by using the pressure sensor 480A. The electronic device 400 may calculate a touch position based on a detection signal of the pressure sensor 480A. In some embodiments, touch operations that are performed at a same touch location but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to the first pressure threshold is performed on the Messages icon, an instruction for creating an SMS message is executed.

The gyroscope sensor 480B may be configured to determine a motion posture of the electronic device 400. In some embodiments, the gyroscope sensor 480B may be used to determine angular velocities of the electronic device 400 around three axes (namely, axes x, y, and z). The gyro sensor 480B may be used for image stabilization during photographing. For example, when a shutter is pressed, the gyroscope sensor 480B detects a jittering angle of the electronic device 400, calculates, based on the angle, a distance for which a lens module needs to compensate, and enables the lens to offset jittering of the electronic device 400 through reverse motion, so as to implement image stabilization. The gyroscope sensor 480B may be further used in a navigation scenario and a motion-controlled gaming scenario.

The barometric pressure sensor 480C is configured to measure barometric pressure. In some embodiments, the electronic device 400 calculates an altitude based on a barometric pressure value measured by the barometric pressure sensor 480C, to assist in positioning and navigation.

The magnetic sensor 480D includes a Hall sensor. The electronic device 400 may detect opening and closing of a flip cover by using the magnetic sensor 480D. In some embodiments, when the electronic device 400 is a flip phone, the electronic device 400 may detect opening and closing of a flip cover by using the magnetic sensor 480D. Further, a feature such as automatic unlocking upon opening of the flip cover is set based on a detected opening or closing state of the flip cover.

The acceleration sensor 480E may detect values of acceleration of the electronic device 400 in all directions (usually on three axes). When the electronic device 400 is static, the acceleration sensor 480E may detect magnitude and a direction of gravity. The acceleration sensor 480E may be further configured to recognize a posture of the electronic device, and is applied to an application such as switching between landscape orientation and vertical orientation and a pedometer.

The distance sensor 480F is configured to measure a distance. The electronic device 400 may measure a distance through infrared light or a laser. In some embodiments, in a photographing scenario, the electronic device 400 may measure a distance by using the distance sensor 480F, to implement quick focusing.

The optical proximity sensor 480G may include, for example, a light-emitting diode (LED) and a light detector such as a photodiode. The light-emitting diode may be an infrared light-emitting diode. The electronic device 400 emits infrared light by using the light-emitting diode. The electronic device 400 detects infrared reflected light from a nearby body by using the photodiode. When detecting sufficient reflected light, the electronic device 400 may determine that there is a body near the electronic device 400. When insufficient reflected light is detected, the electronic device 400 may determine that there is no object near the electronic device 400. The electronic device 400 may detect, by using the optical proximity sensor 480G, that a user holds the electronic device 400 close to the ear for a call, to automatically turn off a screen to save power. The optical proximity sensor 480G may also be used in a smart cover mode or a pocket mode to automatically perform screen unlocking or locking.

The ambient light sensor 480L is configured to sense ambient light brightness. The electronic device 400 may adaptively adjust brightness of the display 494 based on the sensed ambient light brightness. The ambient light sensor 480L may also be configured to automatically adjust a white balance during photographing. The ambient light sensor 480L may further cooperate with the optical proximity sensor 480G to detect whether the electronic device 400 is in a pocket, to prevent an accidental touch.

The fingerprint sensor 480H is configured to capture a fingerprint. The electronic device 400 may implement fingerprint unlock, application access lock, fingerprint photographing, fingerprint-based call answering, and the like by using a feature of the collected fingerprint.

The temperature sensor 480J is configured to detect a temperature. In some embodiments, the electronic device 400 executes a temperature processing policy based on the temperature detected by the temperature sensor 480J. For example, when the temperature reported by the temperature sensor 480J exceeds a threshold, the electronic device 400 reduces performance of a processor near the temperature sensor 480J, to reduce power consumption and implement thermal protection. In some other embodiments, when the temperature is lower than another threshold, the electronic device 400 heats the battery 442 to avoid abnormal shutdown of the electronic device 400 that is caused due to the low temperature. In some other embodiments, when the temperature is lower than still another threshold, the electronic device 400 boosts an output voltage of the battery 442, to avoid an abnormal shutdown caused by a low temperature.

The touch sensor 480K is also referred to as a "touch device". The touch sensor 480K may be disposed on the display 494. The touch sensor 480K and the display 494 form a touchscreen, which is also referred to as a "touch screen". The touch sensor 480K is configured to detect a touch operation performed on or near the touch sensor. The touch sensor may transfer the detected touch operation to the application processor, to determine a type of a touch event. A visual output related to the touch operation may be provided on the display 494. In some other embodiments, the touch sensor 480K may alternatively be disposed on a surface of the electronic device 400 at a position different from a position of the display 494. In the present disclosure, the touch sensor may receive and respond to a related instruction entered by the user.

The bone conduction sensor 480M may obtain a vibration signal. In some embodiments, the bone conduction sensor 480M may obtain a vibration signal of a vibration bone of a human vocal part. The bone conduction sensor 480M may also be in contact with a human pulse, and receive a blood pressure beating signal. In some embodiments, the bone conduction sensor 480M may also be disposed in the headset, to obtain a bone conduction headset. The audio module 470 may obtain a voice signal through parsing based on the vibration signal, of the vibration bone of the vocal-cord part, that is obtained by the bone conduction sensor 480M, to implement a voice function. The application processor may parse heart rate information based on the blood pressure beating signal obtained by the bone conduction sensor 480M, to implement a heart rate detection function.

The button 490 includes a power-on button, a volume button, and the like. The button 490 may be a mechanical button, or may be a touch-sensitive button. The electronic device 400 may receive a button input, and generate a button signal input related to user setting and function control of the electronic device 400.

The motor 491 may generate a vibration prompt. The motor 491 may be used for an incoming call vibration prompt, or may be used for touch vibration feedback. For example, touch operations performed on different applications (for example, photo taking and audio playing) may be corresponding to different vibration feedback effects. The motor 491 may also correspond to different vibration feedback effects for touch operations performed on different areas of the display 494. Different application scenarios (for example, a time prompt, information receiving, an alarm clock, and a game) may also be corresponding to different vibration feedback effects. A touch vibration feedback effect may be further customized.

The indicator 492 may be an indicator light, and may be used to indicate a charging status or a power change, or may be used to indicate a message, a missed call, a notification, or the like.

The SIM card interface 495 is configured to connect a SIM card. The SIM card may be inserted into the SIM card interface 495 or pulled out of the SIM card interface 495, so that the SIM card is in contact with or separated from the electronic device 400. The electronic device 400 may support one or N SIM card interfaces, and N is a positive integer greater than 1. The SIM card interface 495 can support a nano-SIM card, a micro-SIM card, a SIM card, and the like. A plurality of cards may be simultaneously inserted into a same SIM card interface 495. The plurality of cards may be of a same type or different types. The SIM card interface 495 is applicable to different types of SIM cards. The SIM card interface 495 may also be compatible with the external storage card. The electronic device 400 interacts with a network by using a SIM card, to implement functions such as conversation and data communication. In some embodiments, the electronic device 400 uses an eSIM, namely, an embedded SIM card. The eSIM card may be embedded in the electronic device 400, and cannot be separated from the electronic device 400.

A software system of the electronic device 400 may use a layered architecture, an event-driven architecture, a microkernel architecture, a micro service architecture, or a cloud architecture. In this embodiment of the present disclosure, an Android system of a layered architecture is used as an example to illustrate the software structure of the electronic device 400.

Figure 5:
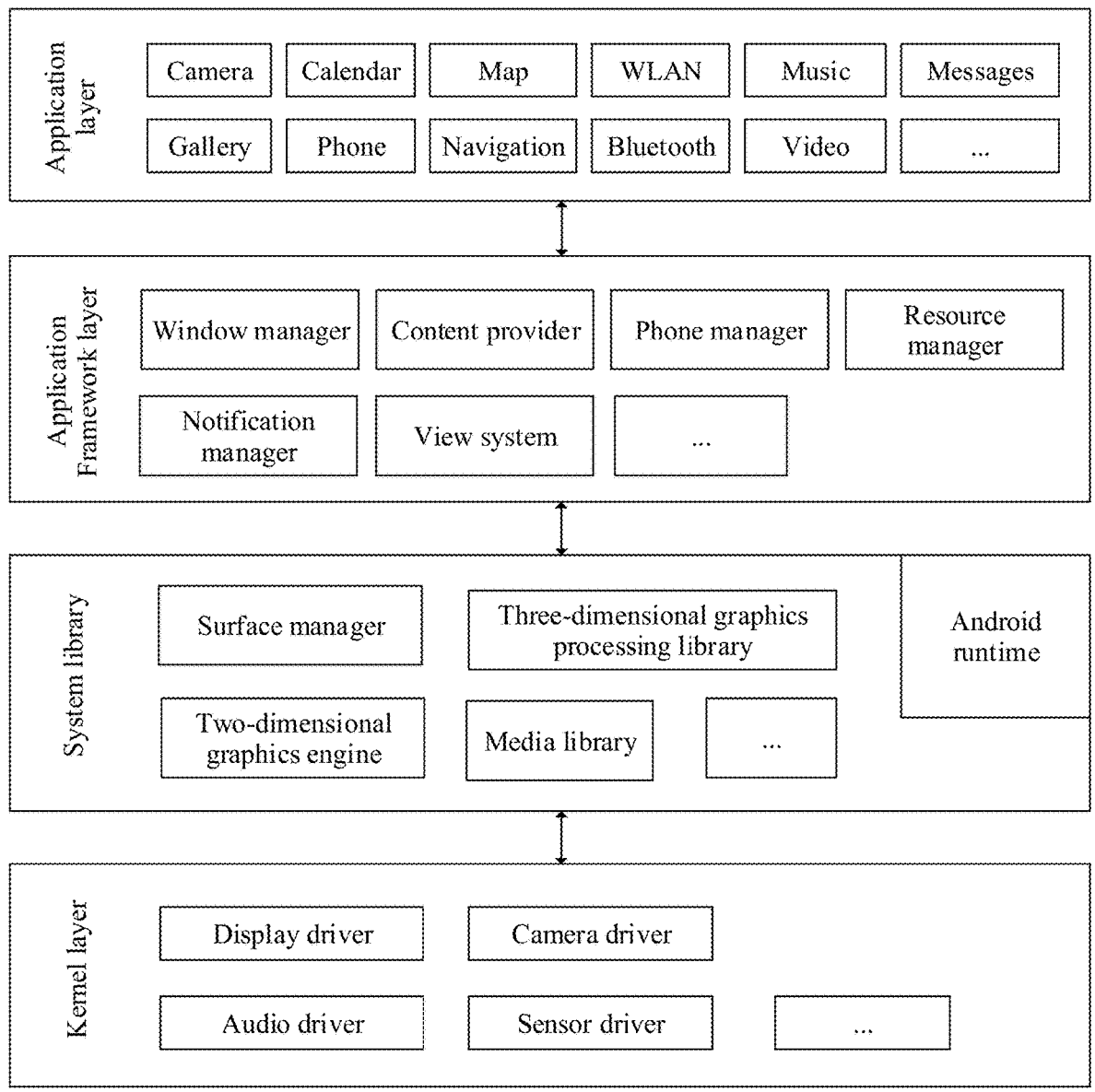
FIG. 5 is a block diagram of a software structure of an electronic device according to an embodiment of this application.

FIG. 5 is a block diagram of a software structure of the electronic device 400 according to an embodiment of the present disclosure.

In the layered architecture, software is divided into several layers, and each layer has a clear role and task. Layers communicate with each other over a software interface. In some embodiments, the Android system is divided into four layers: an application layer, an application framework layer, an Android runtime and system library, and a kernel layer from top to bottom.

The application layer may include a series of application packages.

As shown in FIG. 5, the application packages may include applications such as Camera, Gallery, Calendar, Calls, Maps, Navigation, WLAN, Bluetooth, Music, Videos, and Messages.

The application framework layer provides an application programming interface (API) and a programming framework for an application at the application layer. The application framework layer includes some predefined functions.

As shown in FIG. 5, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes a visual control such as a control for text display or a control for picture display. The view system may be configured to construct an application. A display interface may include one or more views. For example, a display interface including a message notification icon may include a text display view and an image display view.

The phone manager is configured to provide a communication function of the electronic device 400, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification type message, where the displayed notification information may automatically disappear after a short pause and require no user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 400 with reference to a photographing scenario.

When the touch sensor 480K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, so that the camera application is started. Then, the camera driver is started by invoking the kernel layer, and a static image or a video is captured by using the camera 493.

Figure 6:
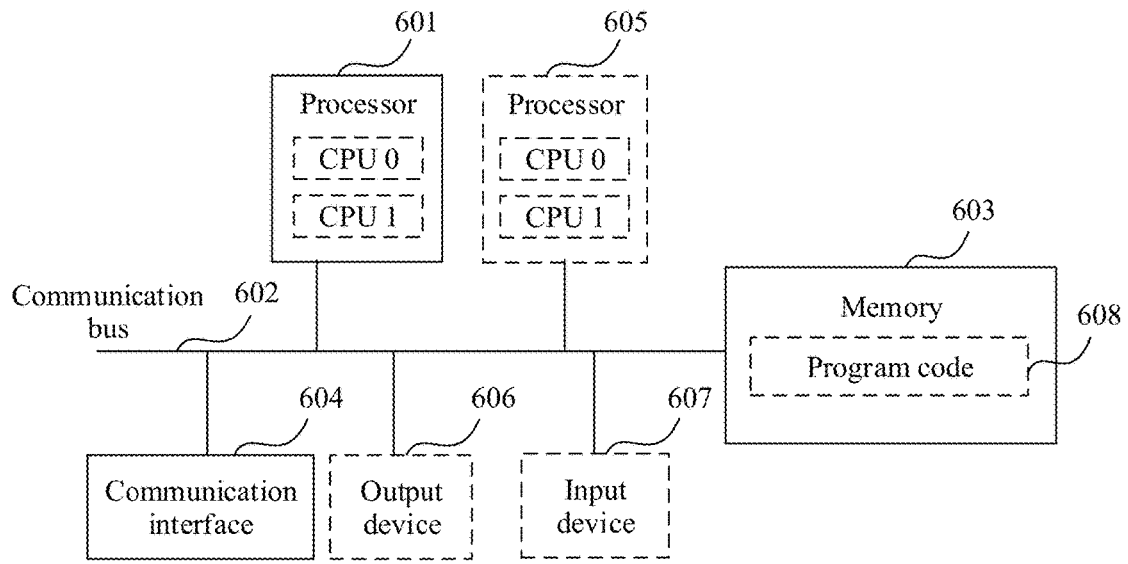
FIG. 6 is a schematic diagram depicting a structure of a server according to an embodiment of this application.

FIG. 6 is a schematic diagram of a structure of a server 600 according to an embodiment of this application. The server in the system architecture shown in FIG. 1 may be implemented by using the server 600 shown in FIG. 6. Referring to FIG. 6, the server 600 includes at least one processor 601, a communications bus 602, a memory 603, and at least one communications interface 604.

The processor 601 may be a general-purpose central processing unit (CPU), a microprocessor, an application-specific integrated circuit (ASIC), or one or more integrated circuits for controlling program execution in the solution of this application.

The communications bus 602 may include a path transmitting information between the foregoing components.

The memory 603 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or data structures and capable of being accessed by a computer. This is not limited. The memory 603 may exist independently, and is connected to the processor 601 through the communications bus 602. The memory 603 may alternatively be integrated with the processor 601.

The communications interface 604 is a type of apparatus using any transceiver, and is configured to communicate with another device or a communications network, for example, an Ethernet, a radio access network (RAN), or a wireless local area network (WLAN). The interface or a transceiver-like interface may be configured to implement communication between devices in the present disclosure.

In an embodiment of an implementation, in an embodiment, the processor 601 may include one or more CPUs, for example, a CPU 0 and a CPU 1 shown in FIG. 4.

In an embodiment of an implementation, in an embodiment, the server may include a plurality of processors, for example, the processor 601 and a processor 605 shown in FIG. 6. Each of these processors may be a single-core (single-CPU) processor, or may be a multi-core (multi-CPU) processor. The processor herein may be one or more devices, circuits, and/or processing cores used to process data (such as a computer program instruction).

In an embodiment of an implementation, in an embodiment, the server may further include an output device 606 and an input device 607. The output device 606 communicates with the processor 601, and may display information in a plurality of manners. For example, the output device 606 may be a liquid crystal display (LCD), a light emitting diode (LED) display device, a cathode ray tube (CRT) display device, or a projector. The input device 607 communicates with the processor 601, and may receive an input of a user in a plurality of manners. For example, the input device 607 may be a mouse, a keyboard, a touchscreen device, a sensing device, or the like.

The memory 603 is configured to store program code for performing the solution in this application, and the processor 601 controls execution. The processor 601 is configured to execute the program code 608 stored in the memory 603. The server shown in FIG. 6 may interact with a terminal by using the processor 601 and the program code 608 in the memory 603, to implement loading of an authorized space and addition and display of media content.

AR&VR content management has always been the blue sea in the AR&VR field. Developers use AR&VR devices or software to render the real world, to augment the reality. Currently, there is not much AR&VR software relatively. Therefore, only a few players and developers purposefully develop some corresponding virtual spaces for some locations or objects (for example, shops, stores, streets, exhibition halls, and specific objects), and arrange virtual content in the virtual spaces, so that when a consumer terminal scans the foregoing locations or objects, related virtual content can be rendered in the consumer terminal. In this way, a consumer can fully experience interesting play methods in application fields such as photographing, navigation, and exhibition by using the consumer terminal. With popularization of AR&VR technologies, how to manage a virtual space of a location or a physical object becomes a prospective problem in the AR&VR field.

An optimal method for AR content registration is "what you see is what you get". To be specific, during content registration, a space available for placement can be seen in real time. Based on this, this application provides a method for presenting an authorized virtual space, to help a user perform AR content registration in a manageable area. Based on this, an embodiment of this application further provides an interaction procedure for performing content registration in real time. A user views an authorized space, drags AR content, and performs saving and uploading in real time in a real scenario, to implement AR content registration in real time in the real scenario.

Figure 7:
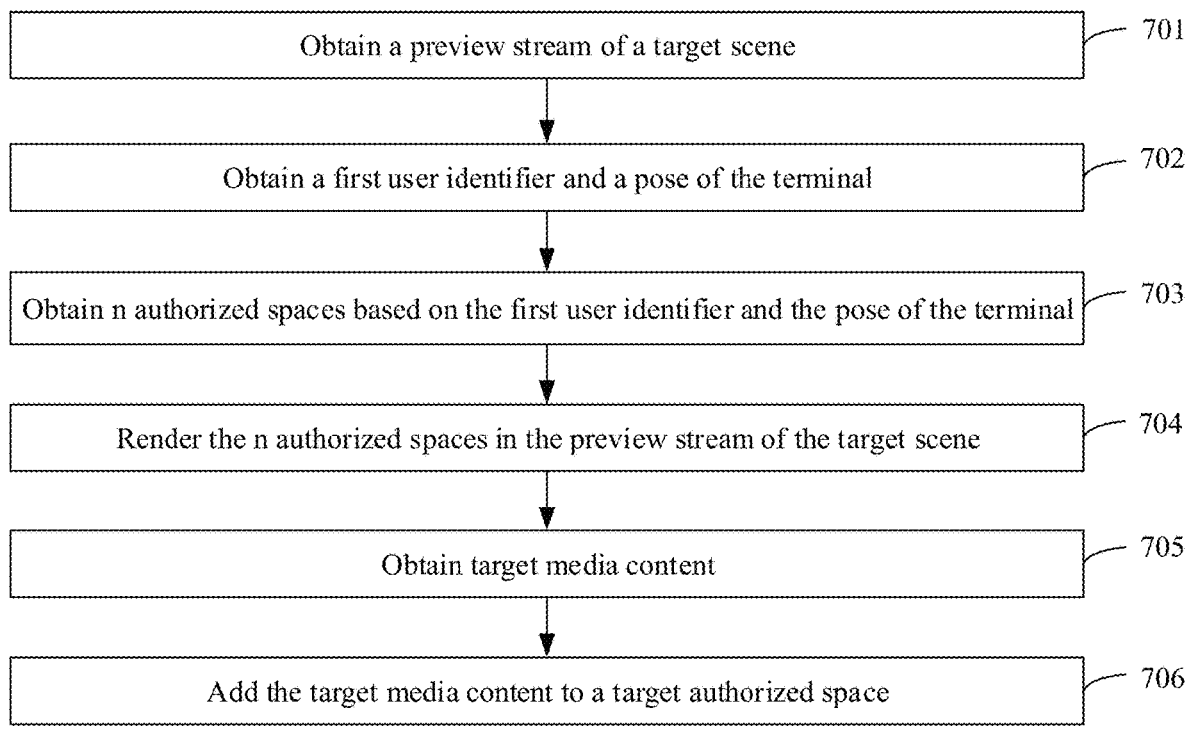
FIG. 7 is a flowchart of a method for displaying an authorized space based on a digital map according to an embodiment of this application.

FIG. 7 is a flowchart of a method for displaying an authorized space based on a digital map according to an embodiment of this application. The method may be applied to a terminal. Referring to FIG. 7, the method includes the following operations.

Operation 701: Obtain a preview stream of a target scene.

In this embodiment of this application, each user may register a user account of the user on a server. To be specific, the user first needs to register with and log in to a system, and a unique user account is used to manage digital space assets (that is, an authorized space) of the user. After performing login by using the user account, the user may obtain the preview stream of the target scene. For ease of description, a user having an authorized space in a digital map or a user who wants to apply for an authorized space in a digital map may be referred to as a registered user. A scene in which the terminal is currently located may include all content within a field-of-view range of the terminal in an environment in which the terminal is currently located, for example, a room or a field. A specific range and size may be defined according to the environment or freely defined based on a specific requirement. This is not limited in the present disclosure. In embodiments, the target scene may be a part or all of the scene in which the terminal is currently located. For example, the target scene may be a store in the environment in which the terminal is currently located. Optionally, the target scene may alternatively include an object of interest of the user in the scene in which the terminal is currently located (for example, the following target object such as a store logo). For example, the target scene may be a store logo or another representative object in the scene in which the terminal is currently located.

In embodiments, the terminal may collect the preview stream of the target scene by using a camera configured on the terminal, or may receive the preview stream that is of the target scene and that is collected in real time and sent by another device. The terminal may invoke the camera by using a system to collect the preview stream of the target scene, or may invoke the camera by using an installed application to collect the preview stream of the target scene.

In addition, in this embodiment of this application, the preview stream of the target scene may also be referred to as a preview stream corresponding to the target scene.

Operation 702: Obtain a first user identifier and a pose of the terminal.

In this embodiment of this application, the terminal may obtain a user account that is currently logged in, and use the user account as the first user identifier. In addition, the user account currently logged in to the terminal is not used to limit a user of the terminal. In other words, the user account currently logged in to the terminal may or may not be a user account of a user of the terminal. This is not limited in this application. It should be further noted that the first user identifier may be obtained by the system of the terminal, or may be obtained by a third-party application installed on the terminal. This is not limited in this embodiment of this application.

In addition, the terminal may obtain the current pose of the terminal. The pose of the terminal may include a location and a posture of the terminal in the real world. The location in the real world may include location coordinates in a world coordinate system, a longitude and a latitude in the real world, or the like. The posture of the terminal may include a rotation angle, a pitch angle, and a roll angle.

In an embodiment of a possible implementation, the terminal may detect the current pose of the terminal by using a sensor configured on the terminal. For example, the terminal may detect the current pose by using a sensor such as an acceleration sensor, a gyroscope, or a positioning component.

Optionally, in another embodiment of a possible implementation, the terminal may send a plurality of images in the obtained preview stream of the target scene to the server. The server may perform matching based on the plurality of received images and feature information included in a digital map, to determine a location of the terminal at which the terminal collects the plurality of images. Then, the server may determine, based on a feature image that matches the plurality of images and the plurality of images, a posture of the terminal at which the terminal collects the plurality of images, and send the posture to the terminal.

Optionally, in some possible scenarios, the terminal may combine the foregoing two possible implementation embodiments to obtain the pose of the terminal. For example, the terminal may obtain information such as a current latitude, longitude, and altitude of the terminal by using the sensor, and send the information and the plurality of collected images in the preview stream to the server. The server may determine the posture of the terminal based on the information and the plurality of images, and send the posture to the terminal.

Operation 703: Obtain n authorized spaces based on the first user identifier and the pose of the terminal.

After obtaining the first user identifier and the pose, the terminal may obtain the n authorized spaces from the server based on the first user identifier and the pose. The n obtained authorized spaces are n non-overlapping three-dimensional spaces corresponding to the first user identifier in a digital map corresponding to the target scene. Herein, n is an integer equal to 1 or greater than 1.

In a first manner, the terminal may send the first user identifier and the pose to the server, and the server may obtain the n authorized spaces based on the first user identifier and the pose, and send the n authorized spaces to the terminal.

In this implementation, in embodiments, after receiving the first user identifier and the pose of the terminal, the server may first obtain, based on the pose of the terminal, the digital map corresponding to the target scene. Then, the server may obtain all authorized spaces included in the digital map corresponding to the target scene, and search all the authorized spaces included in the digital map corresponding to the target scene to determine whether there is an authorized space corresponding to the first user identifier. If there is the authorized space corresponding to the first user identifier, the server may send the found authorized space to the terminal. In embodiments, in this embodiment of this application, the authorized space sent by the server to the terminal may refer to space information that can represent the corresponding authorized space.

It should be noted that the server may store space information of an authorized space owned by each user in the digital map. For example, the server may store a mapping relationship between a user identifier of each user in digital maps of different areas and space information of an authorized space owned by the corresponding user. Different user identifiers correspond to different authorized spaces. In other words, a same authorized space does not correspond to a plurality of different user identifiers at the same time, that is, different users own different authorized spaces. In addition, any two authorized spaces may not overlap each other, that is, no overlapping part exists in any two authorized spaces. Alternatively, in some cases, any two authorized spaces may overlap. In these cases, the two spaces that overlap may respectively correspond to display times of the two spaces, and the display times of the two spaces are different. When the server sends authorized spaces to the terminal, for overlapping authorized spaces, the server may deliver display times of the authorized spaces, so that when displaying the overlapping authorized spaces, the terminal may perform time division display based on the different display times.

In embodiments, after obtaining, based on the pose of the terminal, the digital map corresponding to the target scene, the server may determine, from the foregoing mapping relationship based on a range of the digital map corresponding to the target scene, a mapping relationship corresponding to all the authorized spaces included in the digital map corresponding to the target scene, that is, obtain a mapping relationship between space information of these authorized spaces and corresponding user identifiers. Then, the server may obtain space information of the authorized space corresponding to the first user identifier, and send the space information of the authorized space corresponding to the first user identifier to the terminal. The space information of the authorized space may include a pose of the authorized space in the digital map. A posture of the authorized space in the digital map is a posture of the authorized space in a reference coordinate system of the digital map.

Optionally, if the server does not find an authorized space corresponding to the first user identifier in all the authorized spaces included in the digital map corresponding to the target scene, it indicates that there is no authorized space corresponding to the first user identifier in the digital map corresponding to the target scene. In this case, the server may return a notification message of an authorized space loading failure to the terminal, to notify the terminal that the authorized space corresponding to the first user identifier is not obtained. In this case, the terminal may interact with the user by using the method described in the subsequent embodiments, so that the user applies for an authorized space.

It should be noted that a registered user may have one or more authorized spaces in the digital map corresponding to the target scene. If there is only one authorized space corresponding to the first user identifier in the digital map corresponding to the target scene, the server may directly send space information of this authorized space to the terminal. If the digital map corresponding to the target scene includes a plurality of authorized spaces corresponding to the first user identifier, the server may directly send space information of all the plurality of authorized spaces to the terminal. Alternatively, the server may select some authorized spaces from the plurality of authorized spaces, and send the authorized spaces to the terminal. For example, the server may send space information of an authorized space closest to a location of the terminal in the plurality of authorized spaces to the terminal. Alternatively, each authorized space may correspond to a priority, and the server may send space information of an authorized space with a highest priority in the plurality of authorized spaces to the terminal. Alternatively, the server may send space information of a default authorized space in the plurality of authorized spaces to the terminal. The default authorized space may be one of the plurality of authorized spaces that is set by the server in the background, or may be an authorized space that is first applied for in an application time sequence.

In a second manner, the terminal sends the first user identifier, the pose, and a space screening condition to the server, and the server may obtain m authorized spaces based on the first user identifier and the pose, obtain the n authorized spaces satisfying the space screening condition from the m authorized spaces, and send the n obtained authorized spaces to the terminal.

In this implementation, in embodiments, in addition to sending the first user identifier and the pose to the server, the terminal may further send the space screening condition to the server. The space screening condition may include a condition that needs to be satisfied by an authorized space to be obtained by the terminal, and the space screening condition may be entered by a registered user identified by the first user identifier. For example, the space screening condition may include one or more of a geographical location condition, a priority condition, and the like. The geographical location condition may include that a distance between a location of the authorized space and the location of the terminal satisfies a preset distance, and the priority condition may include that a priority of the authorized space is not lower than a preset priority.

In embodiments, after receiving the first user identifier, the pose, and the space screening condition, the server may first obtain, with reference to the first implementation, all authorized spaces corresponding to the first user identifier in the target scene, and then the server may obtain, through screening from the authorized spaces corresponding to the first user identifier, authorized spaces that satisfy the foregoing space screening condition, and send these authorized spaces to the terminal.

In a third manner, the terminal sends the first user identifier and the pose to the server, the server obtains m authorized spaces based on the first user identifier and the pose, and sends the m authorized spaces to the terminal, and the terminal may obtain the n authorized spaces satisfying a space screening condition from the m authorized spaces.

For the space screening condition, refer to the introduction in the embodiments of the second implementation. A difference between embodiments of this implementation and the second implementation lies in that the server does not perform screening on the authorized spaces corresponding to the first user identifier, but sends all authorized spaces corresponding to the first user identifier to the terminal, and the terminal selects the n authorized spaces that satisfy the space screening condition.

It should be noted that in the foregoing implementations, in embodiments, the authorized space sent by the server to the terminal includes space information of the corresponding authorized space, that is, obtaining the authorized space by the terminal refers to obtaining the space information of the authorized space. The space information includes a pose of the authorized space in the digital map.

Operation 704: Render the n authorized spaces in the preview stream of the target scene.

After obtaining the n authorized spaces corresponding to the first user identifier in the target scene, the terminal may present one or more authorized areas superimposed in the real world, to clearly indicate a location, a size, and a shape of the authorized space in the real world in a form including but not limited to a line, a plane, or the like. In embodiments, the terminal may render the n authorized spaces in the preview stream of the target scene in a preset display form based on the pose of the terminal and space information of the n authorized spaces. The preset display form includes one or more of a preset color, preset transparency, a cubic space, and a spherical space.

Because the space information includes a pose of the authorized space, the terminal may determine, based on the pose of the terminal and the pose of the authorized space, a specific pose for rendering the n authorized spaces in the preview stream of the target scene, that is, determine a display pose of the n authorized spaces. Then, the terminal may render the n authorized spaces in the preview stream of the target scene in the preset display form based on the determined display pose. A relative location relationship between each of then authorized spaces rendered in the preview stream of the target scene and a second feature in the preview stream of the target scene satisfies a second preset location relationship. To be specific, it is ensured that the n authorized spaces can be displayed at an appropriate location in the target scene, so that the n authorized spaces are adapted to the target scene. For example, if the target scene is a store, a distance between one of the n authorized spaces and a logo of the store is a first preset distance, a distance between another authorized space and the logo of the store is a second preset distance, and a distance between the two authorized spaces is a third preset distance, after the two authorized spaces are rendered by using the pose of the terminal and space information of the two authorized spaces, a location relationship among the two authorized spaces displayed in the preview stream of the target scene and the logo satisfies the foregoing relationship. Similarly, postures also satisfy a relative posture relationship among the two authorized spaces and the logo.

In addition, that the terminal displays the n authorized spaces in the preset display form may be rendering the n authorized spaces by using a preset color, that is, the preset color may be attached to surfaces of the n authorized spaces. In addition, during display, the n authorized spaces may be rendered by using preset transparency. In addition, the n rendered authorized spaces may be cubic spaces, or may be spherical spaces, or may have other shapes, that is, a shape of the authorized space includes but is not limited to the foregoing shapes. A specific shape depends on an authorized space shape setting allowed by a digital map operator. A boundary of the authorized space may be displayed by using a line of a specified type, for example, a static solid line, or a scrolling or varying dashed line. It should also be noted that a display form of the boundary of the authorized space also includes but is not limited to the foregoing listed possibilities.

Figure 8:
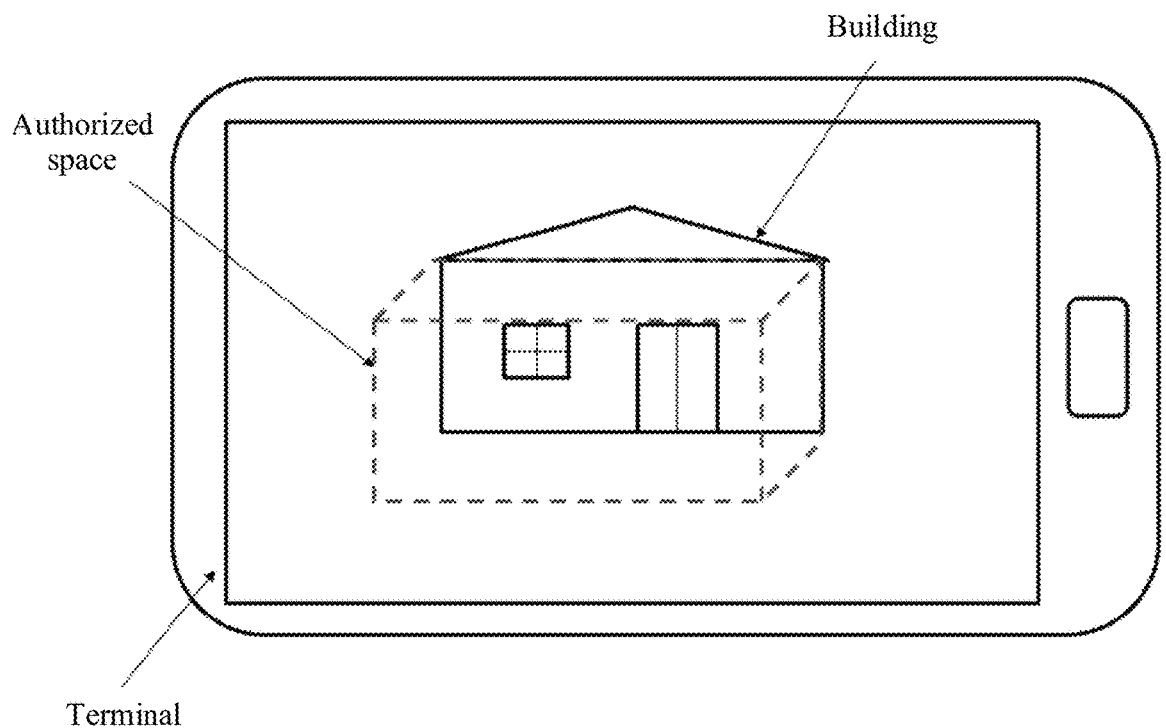
FIG. 8 is a schematic diagram of display of a preview stream of a target scene and a target authorized space according to an embodiment of this application.

FIG. 8 is a schematic diagram of an authorized space displayed in a preview stream of a target scene according to an embodiment of this application. As shown in FIG. 8, the preview stream of the target scene includes a building, and a space in front of the building in the digital map is an authorized space of the user. Based on this, as shown in FIG. 8, the authorized space may be displayed in front of the building in the preview stream, and a boundary of the authorized space is represented by a dashed line.

After the terminal renders the n authorized spaces in the preview stream of the target scene, if poses of the n authorized spaces do not match poses in the preview stream of the target scene, the terminal may adjust the poses of the n authorized spaces in the digital map, so that the poses of the n authorized spaces match the poses in the preview stream of the target scene. Then, the terminal may send adjusted poses of the n authorized spaces to the server, so that the server updates the poses of the n authorized spaces in the digital map.

It should be noted that, in some cases, the obtained pose of the terminal may be inaccurate. In this case, the n authorized spaces rendered in the preview stream of the target scene based on the pose of the terminal do not match the target scene. In this case, if media content is directly added to the displayed authorized space subsequently, when subsequent positioning is accurate, and the media content is displayed again based on a pose of the added media content, a deviation or even a failure occurs in display of the media content. Based on this, to accurately perform content registration, this application further provides an accurate location matching method, so that registered content can match a 3D map. In embodiments, when determining that there is a pose deviation between the authorized space and the preview stream of the target scene, the terminal may adjust the pose of the authorized space, so that the authorized space matches the preview stream of the target scene. In this way, a location in the digital map is completely corresponding to a location in the real world. The terminal may automatically adjust the poses of the n authorized spaces, or the user may manually adjust the poses of the n authorized spaces.

When the terminal automatically adjusts the n authorized spaces, the terminal may identify, from the preview stream of the target scene, a feature that can match a feature included in the digital map corresponding to the target scene.

Then, the terminal may determine a pose deviation between the preview stream of the target scene and the n authorized spaces based on the matched feature, and further adjust the poses of the n authorized spaces based on the pose deviation. For example, if the preview stream of the target scene includes a store at a current location of the terminal, a pose deviation between a store logo in the preview stream and a store logo in the digital map corresponding to the target scene may be determined, and then the poses of the n authorized spaces are adjusted based on the pose deviation.

Optionally, if the user performs adjustment manually, when the user finds that there is a specific pose deviation between the authorized space and the preview stream of the target scene, the user may drag the authorized space to move or rotate, so that the pose in the authorized space matches the preview stream of the target scene. Correspondingly, after detecting a user operation, the terminal may move or rotate the authorized space in real time based on the user operation, and record a pose of the authorized space. After the user stops operation, the terminal may send the last recorded pose of the authorized space to the server. The server may replace the pose included in the space information of the authorized space with an adjusted pose of the authorized space.

Figure 9:
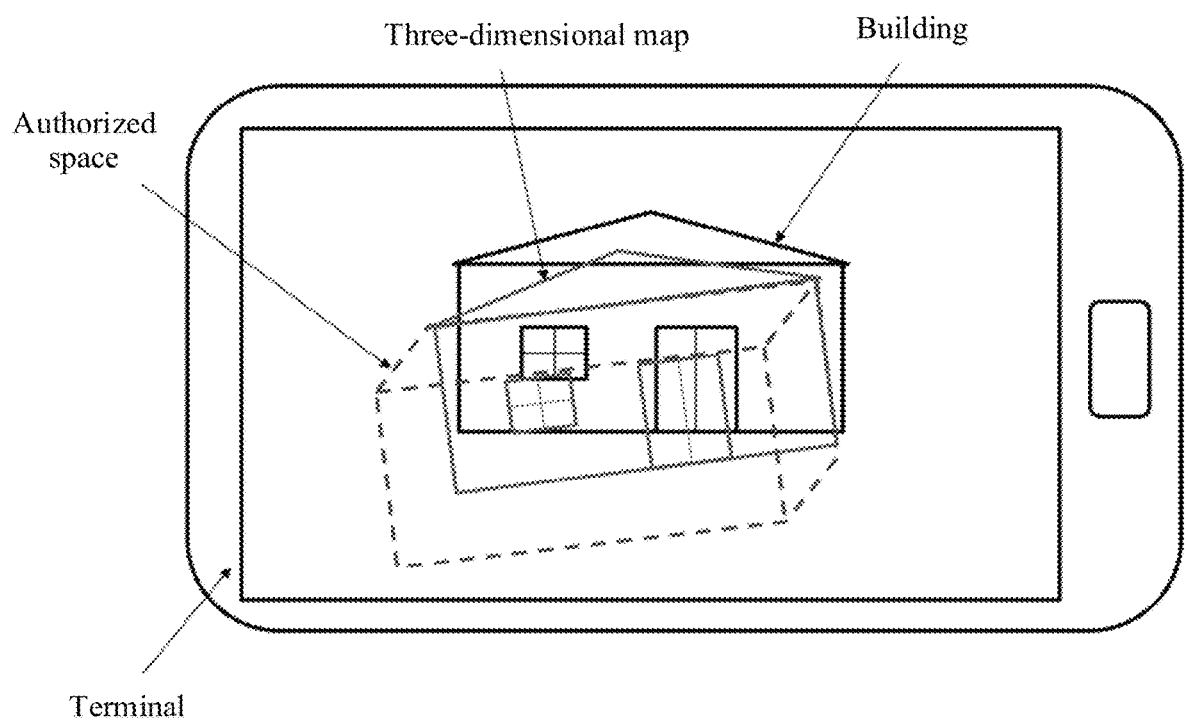
FIG. 9 is a schematic diagram in which there is a pose deviation between an authorized space and a preview stream of a target scene according to an embodiment of this application.

FIG. 9 is a schematic diagram in which there is a pose deviation between an authorized space and a preview stream of a target scene. As shown in FIG. 9, there is a specific pose deviation between the authorized space and the preview stream of the target scene. In this case, the location of the authorized space may be adjusted automatically or adjusted manually by the user by using the foregoing method, so that a finally presented authorized space and a real image are shown in FIG. 8.

The foregoing is an embodiment of an implementation of visualizing the authorized space in the video stream of the target scene in embodiments of this application. Optionally, after n authorized spaces are rendered in the video stream corresponding to the target scene, media content may be further added and synchronized in the authorized space by using the following operations 705 and 706.

Operation 705: Obtain target media content.

After the terminal renders the n authorized spaces corresponding to the first user identifier in the preview stream of the target scene, the terminal may display a media content addition option in a current interface, and the registered user may trigger a media content addition instruction by performing a selection operation on the media content addition option. After detecting the media content addition instruction, the terminal may obtain the to-be-added target media content.

After the terminal detects the media content addition instruction triggered by the user, the terminal may display a media content menu in the current interface, and the media content menu may include a plurality of content type options. When a selection instruction for a target content type option is detected, the target media content whose content type is consistent with a target content type is obtained based on the target content type option, where the target content type option is any one of the plurality of content type options.

It should be noted that the plurality of content type options may include text, picture, video, audio, model, and the like. The user may select, as the target content type option, a type option of media content that the user wants to add, and trigger the selection instruction for the target content type option by performing a selection operation on the target content type option. When receiving the selection instruction for the target content type option, the terminal may obtain the target media content by using different methods based on different target content type options.

For example, if the target content type option is text, when receiving the selection instruction for the target content type option, the terminal may display a text input box in the user interface, and the user may enter a text in the text input box, and set a color, a size, a font, and the like of the entered text by using a text format setting option displayed in the user interface. Then, the terminal may use text content entered by the user as the target media content.

If the target content type option is picture, when receiving the selection instruction for the target content type option, the terminal may display a plurality of locally stored pictures, the user may select one or more pictures from the plurality of pictures, and the terminal may obtain the one or more pictures selected by the user as the target media content. Certainly, in an embodiment of a possible implementation, when receiving the selection instruction for the target content type option, the terminal may first display a collection option and a local obtaining option. If the terminal detects that the collection option is triggered, the terminal may collect an image by using the camera, and use the collected image as the target media content. If the terminal detects that the local obtaining option is triggered, the terminal may obtain the target media content from the plurality of locally stored pictures in the foregoing manner. Alternatively, in some other possible implementation embodiments, the terminal may obtain a picture from another device as the target media content.

If the target content type option is video or audio, when receiving the selection instruction for the target content type option, the terminal may display a file identifier list of a plurality of locally stored videos or audio. The user may select a file identifier from the file identifier list, and the terminal may obtain, as the target media content, a video or audio identified by the file identifier selected by the user. Similarly, in some possible implementation embodiments, with reference to the foregoing method for obtaining the picture-type target media content, the terminal may collect a video or audio based on a user selection, or obtain a video or audio from another device. Details are not described in this embodiment of this application.

If the target content type option is model, when receiving the selection instruction for the target content type option, the terminal may display an identifier list of locally stored models. The user may select an identifier from the identifier list. The terminal may obtain a model corresponding to the identifier selected by the user, and use the model as the target media content. Alternatively, the terminal may directly obtain a model from another device. The model is a pre-created three-dimensional model.

Optionally, in a possible case, the user may select the foregoing plurality of types of media content for free combination, and the terminal may use combined media content as the target media content, or the terminal may pre-obtain combined target media content of various types. This is not limited in this embodiment of this application.

Figure 10:
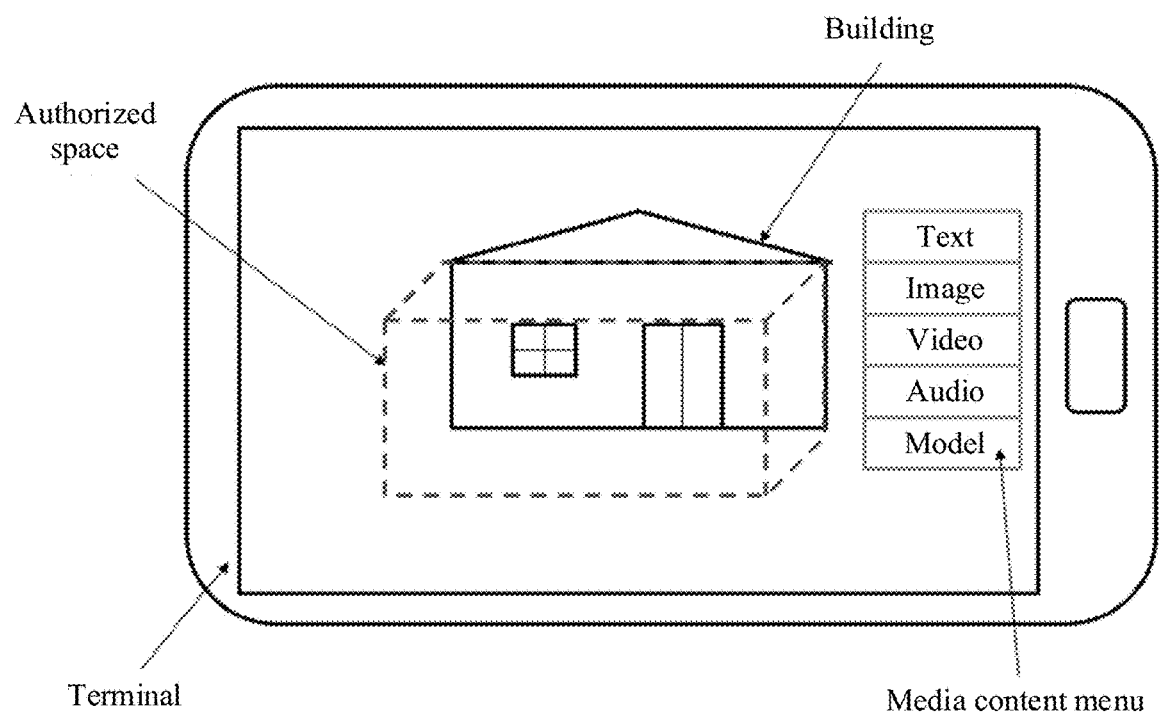
FIG. 10 is a schematic diagram of displaying a media content type option according to an embodiment of this application.

FIG. 10 is a schematic diagram of displaying a media content type option in a current interface according to an embodiment of this application. As shown in FIG. 10, the interface displays five content type options: text, picture, video, audio, and model. The user may select any one of the options, and the terminal may obtain media content of a corresponding type according to the foregoing method based on the type option selected by the user.

Operation 706: Add the target media content to a target authorized space.

After AR content is prepared, the user may "place" the AR content into a visible authorized space, and further adjust information such as a posture, a size, a location, and a color of the AR content. The AR content can be placed in only an authorized space range. Presentation of a part that is of the AR content and that is outside the authorized space is obviously inconsistent with a part inside the authorized space (for example, the part outside the authorized space is invisible, is rendered by using another color, or is semi-transparent), to clearly indicate that an AR content placement area is abnormal.

In embodiments, one or more authorized spaces corresponding to the first user identifier may be displayed in the preview stream of the target scene. When one authorized space is displayed, the authorized space is the target authorized space. When a plurality of authorized spaces are displayed, the target authorized space may be any one of the plurality of authorized spaces. In this case, a space in which the user chooses to add the target media content is the target authorized space.

The terminal may add the target media content by interacting with the user. For example, the user may perform a drag operation on the target media content to trigger a drag instruction. When detecting the drag instruction for the target media content, the terminal adds the target media content at a drag end location indicated by the drag instruction.

The drag end location indicated by the drag instruction may be a location at which the target media content is located when the drag operation ends. In other words, the user may place the target media content in a desired authorized space, that is, the target authorized space, by performing the drag operation on the target media content.

In addition, after the target media content is placed at the drag end location indicated by the drag instruction, the user may further adjust a size of the target media content by dragging a boundary of the target media content, and adjust a posture of the target media content by rotating the target media content.

After the target media content is set, considering that some content may not be in the authorized space when the user places the target media content, to avoid occupying an authorized space of another user, the terminal may display only a part of content that is in the target media content and that is inside the target authorized space, and content that is outside the target authorized space may not be displayed, or may be displayed in another manner differentially from the content that is inside the target authorized space. For example, the content that is outside the target authorized space may be differentially display in a manner such as a semi-transparent manner or rendering by using a different color.

Figure 11:
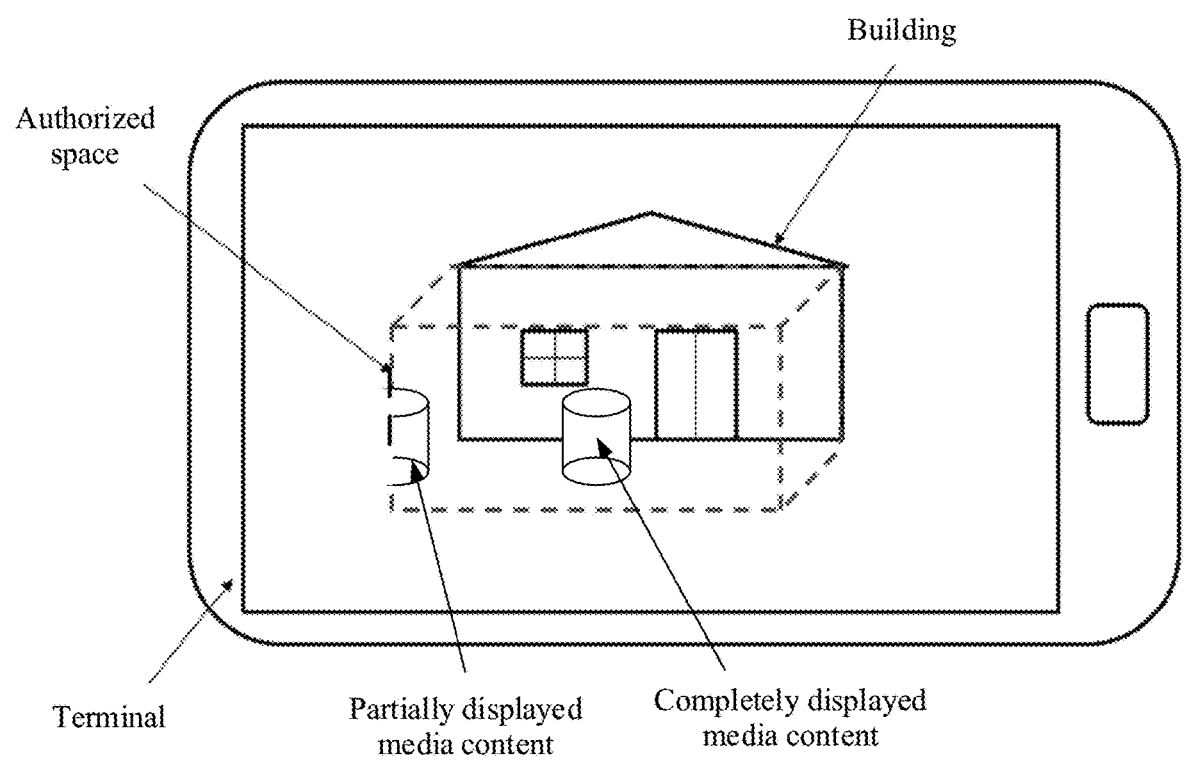
FIG. 11 is a schematic diagram of displaying target media content according to an embodiment of this application.

FIG. 11 is a schematic diagram of displaying target media content according to an embodiment of this application. As shown in FIG. 11, for the target media content, if the target media content is completely located in the authorized space, as shown in FIG. 11, the target media content may be completely displayed. If a part of the target media content falls outside the authorized space, as shown in FIG. 11, for the target media content, only content in the authorized space can be displayed, and the remaining part is not displayed.

After the target media content is displayed, the terminal may detect whether an acknowledgment instruction is received. If the acknowledgment instruction is received, the terminal may send the currently displayed media content inside the target authorized space and a pose of the media content in the digital map to the server, and the server may correspondingly store the received target media content, the received pose of the target media content, and space information of the target authorized space, to add the target media content. In other words, the server may store all information such as the AR content and a location and a posture of the AR content in the real world, and may completely restore the information during loading next time.

Optionally, in an embodiment of a possible implementation, the terminal may further determine a target relative location relationship between the target media content added to the target authorized space and a target object, and send the target media content, the target object, and the target relative location relationship to the server. In this way, the server may update content in another authorized space corresponding to the first user identifier in a preset digital map based on the target media content, the target object, and the target relative location relationship. The target object is a preset image or three-dimensional object included in the digital map corresponding to the target scene. For example, the target object may be a store logo or another feature in the target scene.

In other words, the terminal may determine a target object from the digital map corresponding to the target scene, and determine a relative location relationship between the target media content and the target object. Then, the target media content, the target object, and the relative location relationship are sent to the server. The server may search the preset digital map for a feature the same as the target object, where the preset digital map may be a digital map corresponding to another scene. If the feature the same as the target object is found, the server may detect whether an authorized space corresponding to the first user identifier exists in the preset digital map. If the authorized space corresponding to the first user identifier exists in the preset digital map, the terminal may add the target media content to the authorized space corresponding to the first user identifier in the preset digital map based on the target relative location relationship, so that a location relationship between the target media content and the target object in the preset digital map satisfies the target relative location relationship.

It can be learned that in this embodiment of this application, the relative location relationship between the target media content and the target object is sent to the server, and the server may update media content in another authorized space corresponding to the first user identifier in the preset digital map based on the relative location relationship and the target object. This improves media content update efficiency.

In addition, in this embodiment of this application, a relative location relationship between the target media content and a first feature in the preview stream of the target scene satisfies a first preset location relationship. The first feature is a preset image or three-dimensional object included in the preview stream of the target scene. It should be noted that the first feature may be a feature corresponding to the target object in the preview stream of the target scene. For example, if the target object is a logo of a store 1, the first feature may be a logo of the store 1 in the preview stream of the target scene. In this case, the first preset location relationship is the same as the target relative location relationship between the target media content and the target object. In this way, it can be ensured that the pose of the target media content added to the target authorized space is adapted to a space in the real world.

It should be noted that adding the target media content to the target authorized space may refer to adding the media content in a case in which the target authorized space includes no media content, or may refer to adding the target media content additionally in a case in which the target authorized space already includes media content. Alternatively, in some possible scenarios, after obtaining the target media content, the terminal may replace a piece of media content already included in the target authorized space with the target media content.

Optionally, in some other possible scenarios, when displaying the n authorized spaces, the terminal may further display media content included in the n authorized spaces. In this case, after operation 704, the terminal may not perform operation 705 or 706, but directly delete or move, based on a user operation, media content included in the n authorized spaces.

The terminal may delete all media content included in the target authorized space, or delete some elements in the media content included in the target authorized space, and send such an editing manner (that is, a deletion manner) to the server, so that the server uniformly deletes, in the deletion manner, the same media content or elements included in another authorized space corresponding to the first user identifier. The deletion manner may include the media content or elements deleted by the terminal and an identifier of the deletion operation.

Alternatively, the terminal may move the media content included in the target authorized space by preset relative displacement, and send such an editing manner (that is, a movement manner) to the server, so that the server uniformly moves, in the movement manner, the same media content or elements included in another authorized space corresponding to the first user identifier. The movement manner may include the moved media content or elements and a location after the movement.

In this embodiment of this application, the terminal may obtain, based on the first user identifier and the pose of the terminal, an authorized space of a current registered user in the digital map corresponding to the target scene, and then render the authorized space of the registered user in the preview stream of the target scene, so that the registered user can view, in real time, an authorized space corresponding to a current scene. This is more convenient. In addition, because the authorized space is clearly displayed in the preview stream corresponding to the target scene, a registered user can clearly learn of a boundary of an authorized space of the registered user. In this case, when the user adds media content to the authorized space, it can be effectively avoided that the added media content occupies an authorized space of another user. This implements accurate media content addition, and improves addition efficiency.

The foregoing embodiment mainly describes a process of displaying, in the preview stream of the target scene based on the pose of the terminal and the first user identifier, the authorized space corresponding to the first user identifier in the digital map corresponding to the target scene. Optionally, in some possible scenarios, a plurality of authorized spaces corresponding to the first user identifier may exist in digital maps corresponding to a plurality of scenes, and a registered user may need to uniformly update media content in the plurality of authorized spaces. In this case, the terminal and the server may implement synchronization of media content in the plurality of authorized spaces by using the following operations. To be specific, an embodiment of this application further provides an interaction procedure for registering media content in batches. A user searches for a same target object in a plurality of areas in a 3D map, configures AR content relative to a pose of the target object, and performs saving and uploading, to synchronize content in different areas.

Figure 12:
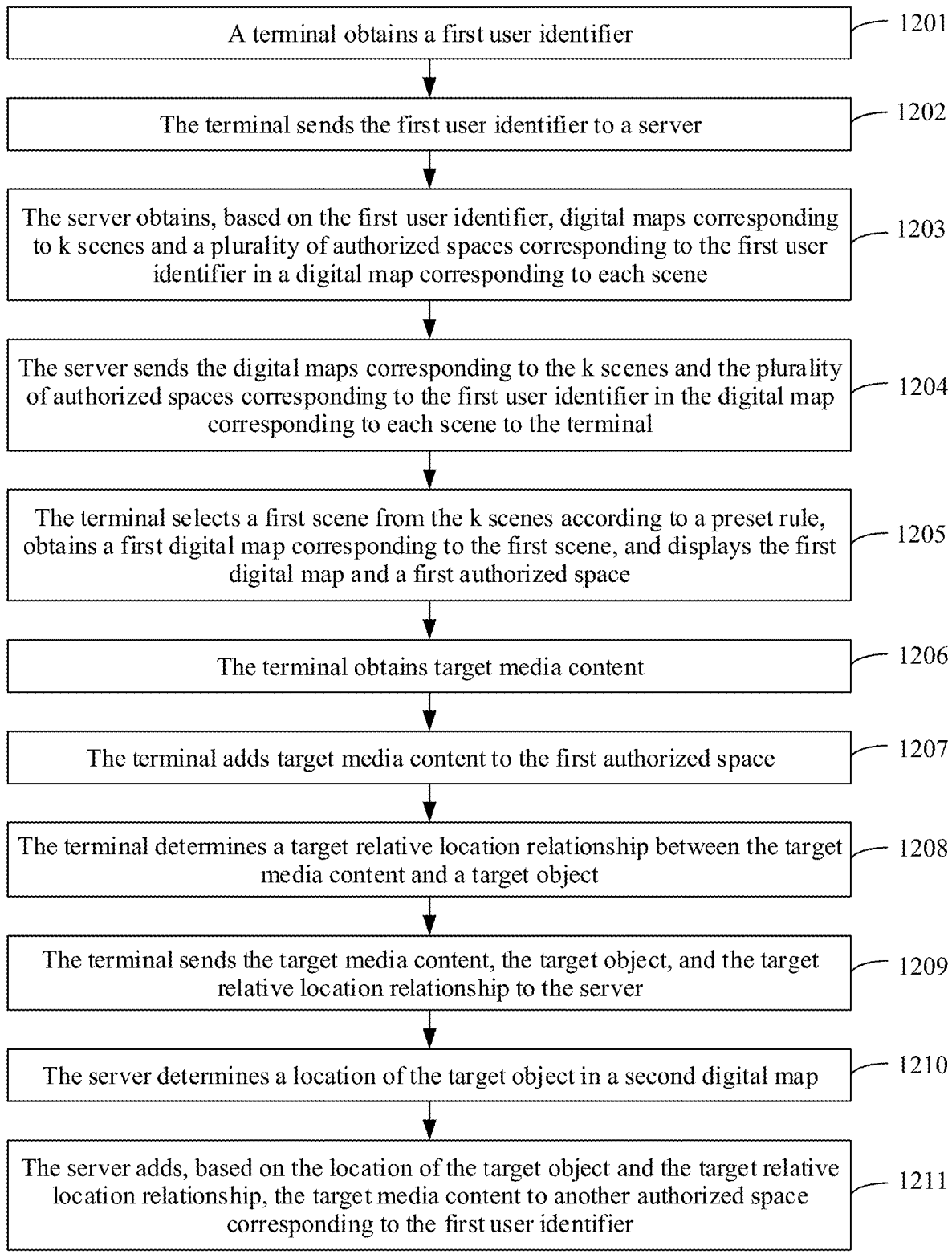
FIG. 12 is a flowchart of a method for synchronizing content in a plurality of authorized spaces based on a digital map according to an embodiment of this application.

FIG. 12 is a flowchart of a method for synchronizing media content in a plurality of authorized spaces according to an embodiment of this application. As shown in FIG. 12, the method includes the following operations.

Operation 1201: A terminal obtains a first user identifier.

In this embodiment of this application, the terminal may use, as the first user identifier, a user account that is currently logged in.

Operation 1202: The terminal sends the first user identifier to a server.

Operation 1203: The server obtains, based on the first user identifier, digital maps corresponding to k scenes and an authorized space corresponding to the first user identifier in a digital map corresponding to each scene.

The server may retrieve an authorized space by using the logged-in user identifier, and if determining that a user has at least one authorized space before this moment, load the authorized space. This loading manner may be a method such as presenting a plurality of area pictures or another method.

For example, the server may store a mapping relationship among a user identifier, an authorized space, and a scene. Based on this, the server may search the mapping relationship for the k scenes corresponding to the first user identifier, and obtain the authorized space corresponding to the first user identifier in each of the k scenes corresponding to the first user identifier. It should be noted that the scene herein may include a store, a specified feature, or the like. For example, a first scene may be a store, that is, a digital map corresponding to the first scene is a digital map corresponding to a store.

Operation 1204: The server sends the digital maps corresponding to the k scenes and the authorized space corresponding to the first user identifier in the digital map corresponding to each scene to the terminal.

Operation 1205: The terminal selects a first scene from the k scenes according to a preset rule, obtains a first digital map corresponding to the first scene, and displays the first digital map and a first authorized space.

After receiving the digital maps corresponding to the k scenes and the authorized space corresponding to the first user identifier in the digital map corresponding to each scene, the terminal may select the first scene from the k scenes according to the preset rule. The preset rule may be "closest to a current location of the terminal", "with a highest priority", or "default". In other words, the terminal may select a scene closest to a location of the terminal from the k scenes as the first scene; or select a scene with a highest priority from the k scenes as the first scene; or select a default scene from the k scenes as the first scene. The foregoing is merely several possible implementations provided in this embodiment of this application, and does not constitute a limitation on this embodiment of this application.

Optionally, in another possible implementation embodiment, the terminal may display, in a cyclic display manner in the digital map corresponding to each scene, the authorized space corresponding to the first user identifier in the digital map, or the terminal may display, in the digital maps based on locations of the k scenes, scene marks corresponding to the k scenes. In a process of displaying the k scenes, a registered user may select a scene. After detecting the selection operation of the user, the terminal may use the scene selected by the registered user as the first scene.

After determining the first scene, the terminal may display, in the first digital map corresponding to the first scene, an authorized space corresponding to the first user identifier in the first digital map. If there is only one authorized space corresponding to the first user identifier in the first digital map, the terminal may directly use the authorized space as the first authorized space. If there are a plurality of authorized spaces corresponding to the first user identifier in the first digital map, after the terminal displays the plurality of authorized spaces, the registered user may select one of the authorized spaces, and the terminal may use the authorized space selected by the user as the first authorized space.

The terminal may highlight the first authorized space selected by the user. For example, the first authorized space may respond in a blinking manner, or a boundary of the first authorized space may be displayed by using a scrolling dashed line.

Figure 13:
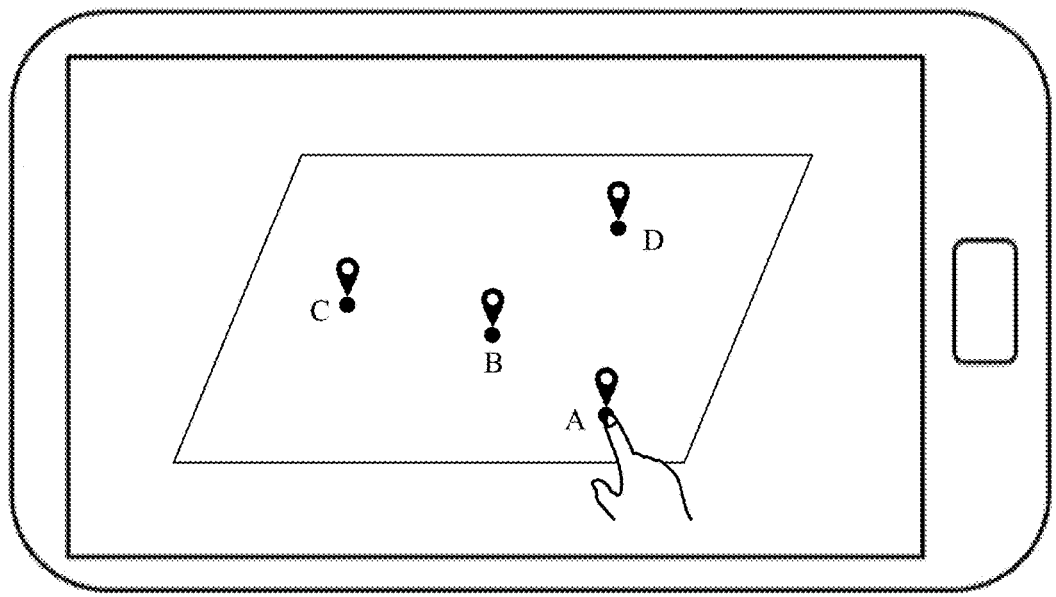
FIG. 13 is a schematic diagram in which a user interacts with a terminal to select a first scene according to an embodiment of this application.
Figure 14:
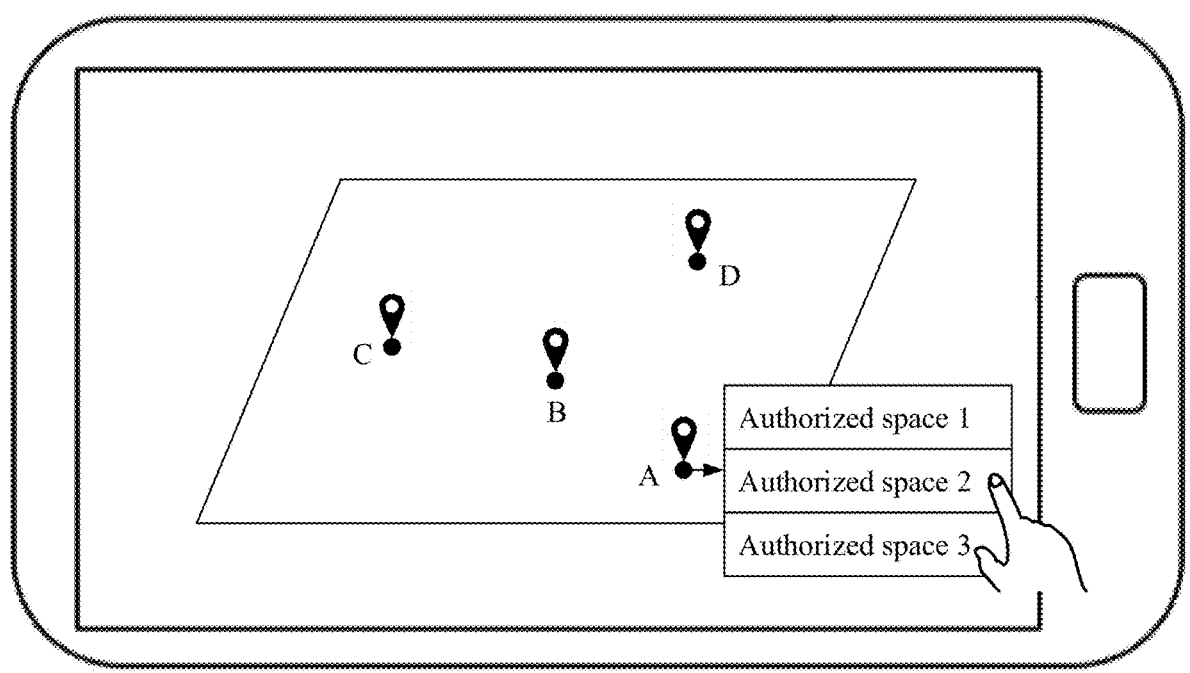
FIG. 14 is a schematic diagram in which a user interacts with a terminal to select a first authorized space according to an embodiment of this application.

FIG. 13 is a schematic diagram in which a user interacts with a terminal to select a first scene according to an embodiment of this application. As shown in FIG. 13, the terminal may display a plurality of scene marks A, B, C, and D in a digital map. If the user selects the scene mark A, the terminal may use a scene identified by the scene mark A as the first scene. If the first digital map corresponding to the first scene includes a plurality of authorized spaces corresponding to the first user identifier, as shown in FIG. 14, the terminal may display space identifiers of the plurality of authorized spaces in a list manner. The user may select an identifier from the space identifiers of the plurality of authorized spaces. In this case, the terminal may use an authorized space identified by the space identifier selected by the user as the first authorized space, and display the first authorized space.

Optionally, in a possible implementation embodiment, the terminal may send a scene requirement when sending the first user identifier to the server, where the scene requirement may be scene information of interest that is specified by the user. After receiving the first user identifier and the scene requirement, the server may first obtain the k scenes corresponding to the first user identifier, and then obtain, from the k scenes, the first scene that satisfies the scene requirement. The scene requirement may be "default", "with a highest priority", "closest to a current location of the terminal", or the like.

Operation 1206: The terminal obtains target media content.

For an embodiment of an implementation of this operation, refer to the related implementation of operation 705 in the foregoing embodiment. Details are not described in this embodiment of this application.

Operation 1207: The terminal adds target media content to the first authorized space.

For an embodiment of an implementation of this operation, refer to the related implementation of operation 706 in the foregoing embodiment. Details are not described in this embodiment of this application.

Operation 1208: The terminal determines a target relative location relationship between the target media content and a target object.

After the target media content is added to the first authorized space, the terminal may determine the target relative location relationship between the target media content and the target object. The target object is a preset image or three-dimensional object included in the digital map corresponding to the first scene. For example, when the first scene is a store, the target object may be a logo of the store. It should be noted that the target object may be located in the first authorized space, or may not be located in the first authorized space, but the target object is included in the digital map corresponding to the first scene.

It should be noted that the target object may be determined by the terminal by using an image recognition algorithm, or may be an object (including but not limited to a picture, a text, or a 3D model) specified by the user in the digital map corresponding to the first scene. To be specific, the user may circle, by using a gesture operation, an area in the digital map corresponding to the first scene, and the terminal may use a feature in the area circled by the user as the target object. Alternatively, the user may select a location in the digital map, and the terminal may use, as the target object, a feature in an area that has a preset radius and that is centered on the location. The foregoing is merely several examples of determining the target object based on a selection operation of the user according to this embodiment of this application.

In addition, the relative location relationship between the target media content and the target object may include information such as a distance and a relative posture between the target media content and the target object.

Operation 1209: The terminal sends the target media content, the target object, and the target relative location relationship to the server.

Operation 1210: The server determines a location of the target object in a second digital map.

After receiving the target media content, the target object, and the target relative location relationship, the server may search a digital map that includes another scene corresponding to the first user identifier, to determine whether the target object is included. If it is found that a digital map corresponding to a scene includes the target object, the server may determine a location of the target object in the digital map. For ease of description, the found scene that includes the target object is referred to as a second scene, and the digital map corresponding to the second scene is the second digital map.

When searching for the target object, the server may perform search near an authorized space corresponding to the first user identifier based on the first user identifier, for example, in a range that is centered on the authorized space and whose radius is 50 meters. In other words, another scene corresponding to the first user identifier may be an area within a preset radius range that is centered on the authorized space of the first user identifier.

Operation 1211: The server adds, based on the location of the target object and the target relative location relationship, the target media content to another authorized space corresponding to the first user identifier.

After the location of the target object is determined in the second digital map, the server may add, based on the target relative location relationship and the location of the target object, the target media content to the authorized space corresponding to the first user identifier in the digital map corresponding to the scene, so that a location relationship between the target media content and the target object satisfies the target relative location relationship.

For example, the terminal may determine, by using a picture detection algorithm, a pose of the target object in the digital map corresponding to the second scene. Then, the terminal may determine a pose of the target media content in a second authorized space in the digital map corresponding to the second scene based on the pose of the target object in the digital map corresponding to the second scene, the pose of the target object in the digital map corresponding to the first scene, and the pose of the target media content in the first authorized space by using the following formulas:

$$\Delta R_t = P_{v1} * P_1^{-1}$$

$$P_{vx} = \Delta R_t * P_x$$

Herein, $P_1$ is a pose matrix corresponding to the pose of the target object in the digital map corresponding to the first scene, $P_{v1}$ is a pose matrix corresponding to the pose of the target media content in the first authorized space, $\Delta R_t$ is a pose change matrix, $P_x$ is a pose matrix corresponding to the pose of the target object in the digital map corresponding to the second scene, and $P_{vx}$ is a pose matrix corresponding to the pose of the target media content in the second authorized space.

After determining the pose of the target media content in the second authorized space, the terminal may add the target media content to the second authorized space based on the pose of the target media content in the second authorized space. If added media content originally exists at a corresponding location in the second authorized space, the target media content may be used to replace the added media content.

For an authorized space corresponding to the first user identifier in a digital map corresponding to another scene, media content in the corresponding authorized space may be updated in the foregoing manner, to implement synchronization of media content in a plurality of authorized spaces. To be specific, the server may set a relative location of AR content based on a posture obtained by retrieving the target object, and apply the relative location to all authorized spaces in batches.

Figure 15:
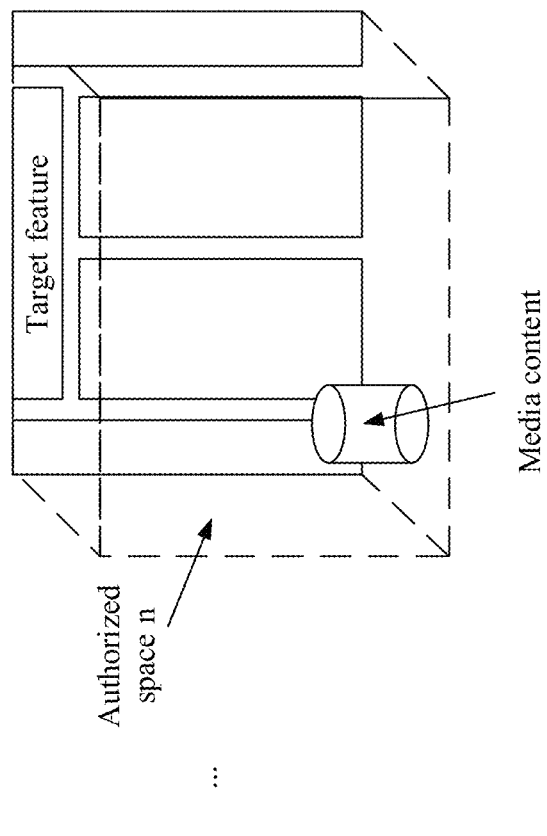
FIG. 15 is a schematic diagram of synchronizing target media content in a plurality of authorized spaces according to an embodiment of this application.
Figure 15:
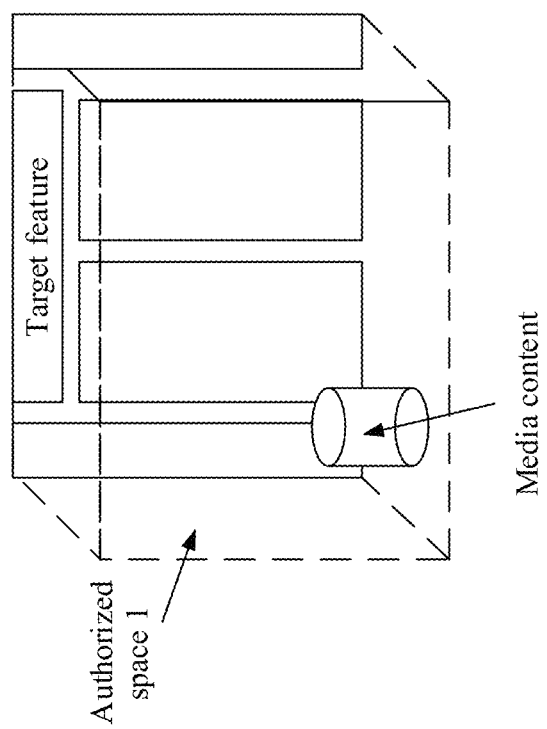

FIG. 15 is a schematic diagram of synchronizing target media content in a plurality of authorized spaces according to an embodiment of this application. As shown in FIG. 15, the target object is determined in the digital map corresponding to the first scene, and a feature that matches the target object is obtained in a digital map corresponding to another scene. The target media content is added to an authorized space 1. In this case, the relative location relationship between the target media content and the target object may be obtained through calculation based on the pose of the target object and a pose of the target media content in the authorized space 1. Then, the server may determine a pose of the target object in a digital map corresponding to another scene, and then determine a pose of the target media content in another authorized space based on the pose of the target object in the digital map corresponding to the another scene and the foregoing determined relative location relationship. Finally, the target media content added to each authorized space based on location information and posture information of the target media content in the another authorized space is shown in FIG. 15.

It should be noted that, in a possible scenario, after the server adds the target media content to the another authorized space, the target media content may be non-adapted to the another authorized space. For example, the target media content falls outside a range of the another authorized space. In this case, the server may automatically adjust the target media content, so that the target media content is adapted to the corresponding authorized space. Alternatively, in a possible implementation embodiment, for the non-adaptation case, for example, for media content that falls outside the authorized space, the server may further mark the media content that falls outside the authorized space. Subsequently, when the corresponding authorized space and the media content in the authorized space are delivered to the terminal, only a part of content that does not fall outside the authorized space may be delivered, or all media content and the mark may be delivered, so that the terminal may display the media content that does not fall outside the authorized space, but does not display the media content that falls outside the authorized space.

In this embodiment of this application, the terminal may simultaneously obtain digital maps corresponding to a plurality of scenes and an authorized space corresponding to the first user identifier in each digital map, then add the target media content to an authorized space, determine a relative location relationship between the target media content and the target object, and send the relative location relationship, the target object, and the target media content to the server. The server may search for a feature matching the target object in a digital map corresponding to another scene, and synchronize, based on the relative location relationship, the target media content to another authorized space corresponding to the first user identifier. In this way, the server can automatically complete adding media content in a plurality of authorized spaces. This improves addition efficiency, ensures effect consistency of the media content in the plurality of authorized spaces, and can ensure addition accuracy.

Figure 16:
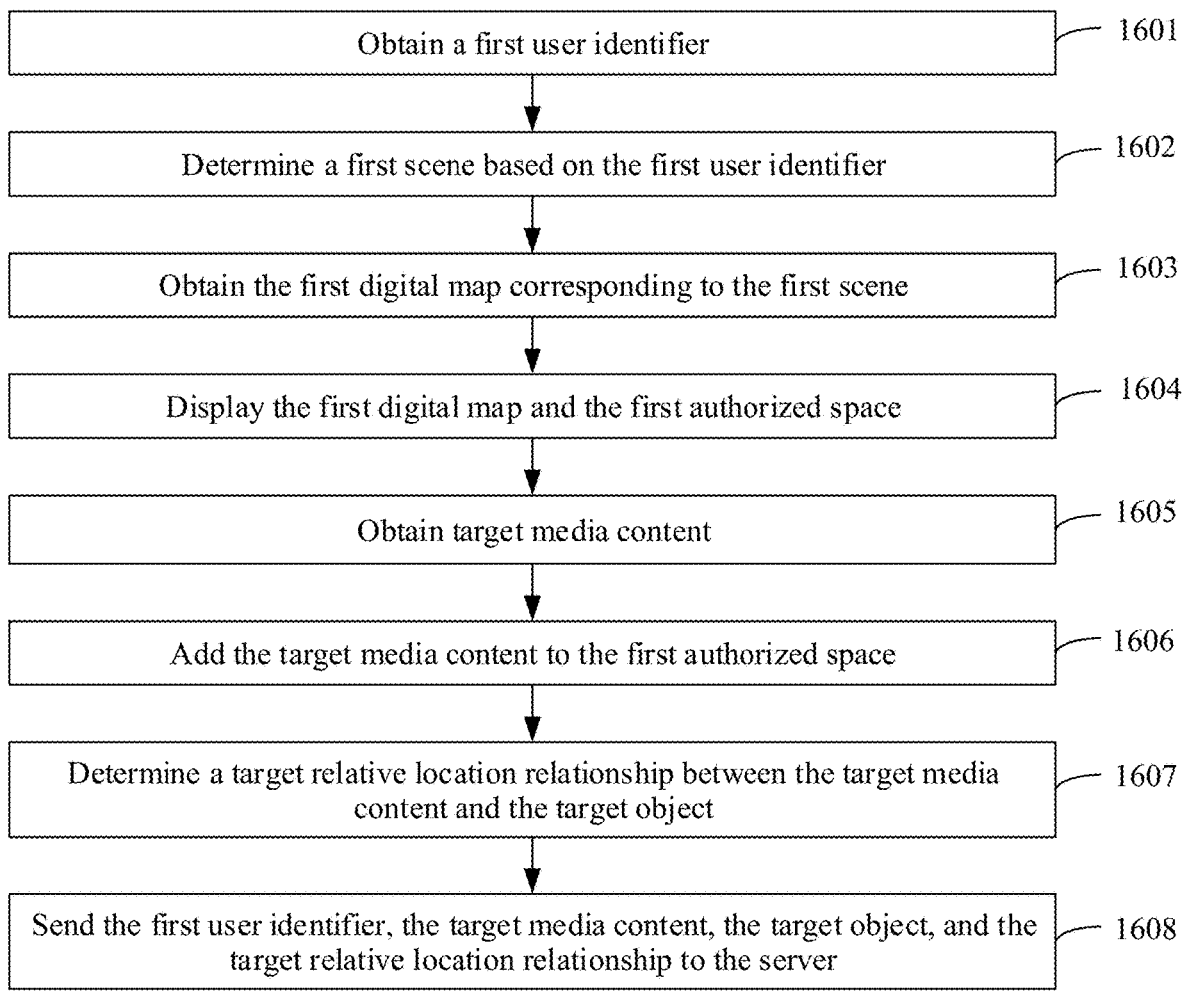
FIG. 16 is a flowchart of another method for synchronizing content in a plurality of authorized spaces based on a digital map according to an embodiment of this application.

The foregoing embodiment describes an embodiment of an implementation process in which the terminal and the server interact with each other to implement synchronization of media content in a plurality of authorized spaces. FIG. 16 is a flowchart of an implementation process of synchronizing content in a plurality of authorized spaces on a terminal side. Referring to FIG. 16, the implementation process includes the following operations.

Operation 1601: Obtain a first user identifier.

For an implementation of this operation, refer to operation 1201 in the foregoing embodiment.

Operation 1602: Determine a first scene based on the first user identifier.

A first digital map includes a first authorized space. The first authorized space is a three-dimensional space corresponding to the first user identifier in the first digital map. The first digital map includes a target object. The target object includes a preset image or three-dimensional object. The first digital map includes a panorama, a point cloud map, or a grid model.

In this operation, a terminal may send the first user identifier to a server, so that the server obtains, based on the first user identifier, digital maps corresponding to k scenes and a plurality of authorized spaces corresponding to the first user identifier in a digital map corresponding to each scene. Then, the terminal receives the digital maps corresponding to the k scenes and the plurality of authorized spaces corresponding to the first user identifier in the digital map corresponding to each scene that are sent by the server, and selects a first scene from the k scenes according to a preset rule.

After receiving the digital maps corresponding to the k scenes and the plurality of authorized spaces corresponding to the first user identifier in the digital map corresponding to each scene that are sent by the server, the terminal may determine the first scene with reference to the implementation in operation 1205 in the foregoing embodiment.

Optionally, in an embodiment of a possible implementation, the terminal may send a scene requirement when sending the first user identifier to the server, where the scene requirement may be scene information of interest that is specified by the user. After receiving the first user identifier and the scene requirement, the server may first obtain the k scenes corresponding to the first user identifier, and then obtain, from the k scenes, the first scene that satisfies the scene requirement. Then, the server may send the obtained first scene, the first digital map corresponding to the first scene, and an authorized space corresponding to the first user identifier in the first scene to the terminal. The scene requirement may be "default", "with a highest priority", "closest to a current location of the terminal", or the like.

Operation 1603: Obtain the first digital map corresponding to the first scene.

After the first scene is determined, the terminal may obtain the first digital map corresponding to the first scene. In addition, the terminal may select the first authorized space from the first digital map according to the related implementation embodiment in operation 1205.

Operation 1604: Display the first digital map and the first authorized space.

Operation 1605: Obtain target media content.

For an implementation of this operation, refer to operation 1206 in the foregoing embodiment. Details are not described again in this embodiment of this application.

Operation 1606: Add the target media content to the first authorized space.

For an implementation embodiment of this operation, refer to operation 1207 in the foregoing embodiment. Details are not described again in this embodiment of this application.

Operation 1607: Determine a target relative location relationship between the target media content and the target object.

For an embodiment of an implementation of this operation, refer to operation 1208 in the foregoing embodiment. Details are not described again in this embodiment of this application.

Operation 1608: Send the first user identifier, the target media content, the target object, and the target relative location relationship to the server, so that the server updates content in another authorized space corresponding to the first user identifier in a preset digital map based on the target media content, the target object, and the target relative location relationship.

The first user identifier may be sent by the terminal to the server when the first scene is determined, or may be sent once when the first scene is obtained, and is sent again in this operation.

In this embodiment of this application, the terminal may simultaneously obtain digital maps corresponding to a plurality of scenes and an authorized space corresponding to the first user identifier in each digital map, then add the target media content to an authorized space, determine a relative location relationship between the target media content and the target object, and send the relative location relationship, the target object, and the target media content to the server. In this way, the server may search for a feature matching the target object in a digital map corresponding to another scene, and synchronize, based on the relative location relationship, the target media content to another authorized space corresponding to the first user identifier. In this way, the server can automatically complete adding media content in a plurality of authorized spaces. This improves addition efficiency, and can ensure addition accuracy.

Figure 17:
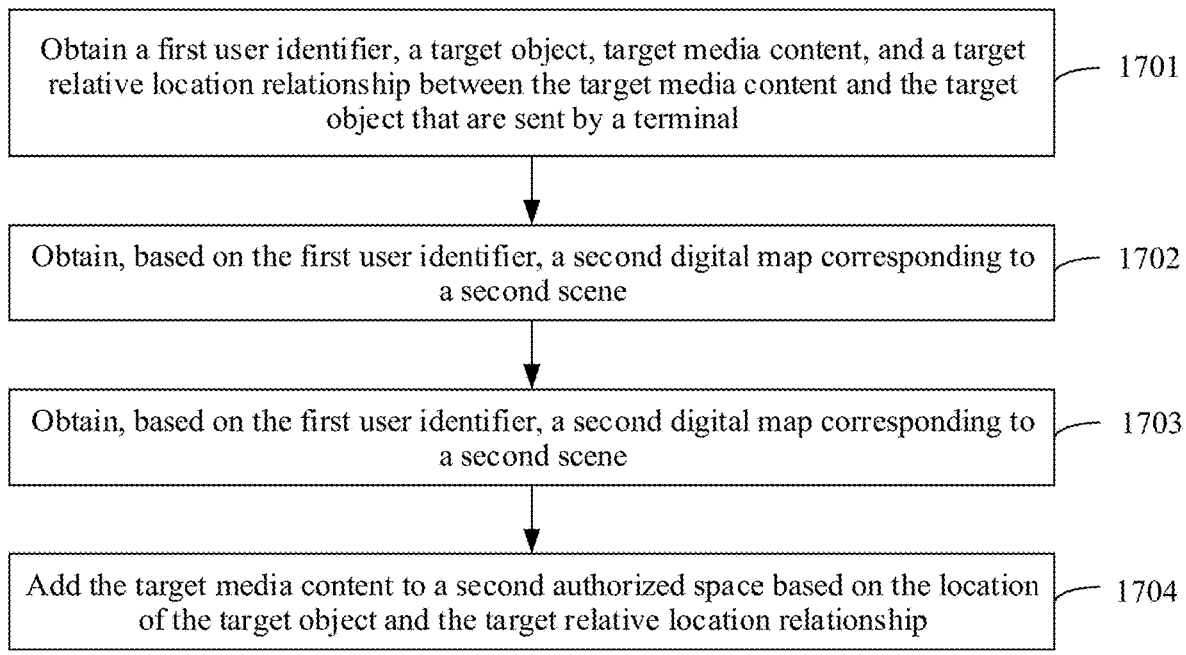
FIG. 17 is a flowchart of still another method for synchronizing content in a plurality of authorized spaces based on a digital map according to an embodiment of this application.

FIG. 17 is a flowchart of an implementation process of synchronizing content in a plurality of authorized spaces on a server side according to an embodiment of this application. Referring to FIG. 17, the implementation process may include the following operations.

Operation 1701: Obtain a first user identifier, a target object, target media content, and a target relative location relationship between the target media content and the target object that are sent by a terminal.

In this embodiment of this application, a server may receive the first user identifier sent by the terminal, and the first user identifier may correspond to a user account logged in to the terminal.

The target media content is media content that is added by the terminal to a first digital map corresponding to a first scene, and the first digital map includes the target object. The server may receive the target object, the target media content, and the target relative location relationship that are sent by the terminal.

Operation 1702: Obtain, based on the first user identifier, a second digital map corresponding to a second scene.

For an embodiment of an implementation of this operation, refer to the implementation process of determining the second scene and obtaining the second digital map corresponding to the second scene in operation 1210 in the foregoing embodiment. The second digital map also includes the foregoing target object.

Operation 1703: Determine a location of the target object in the second digital map.

For an embodiment of an implementation process of this operation, refer to the implementation of operation 1210 in the foregoing embodiment. Details are not described in this embodiment of this application.

Operation 1704: Add the target media content to a second authorized space based on the location of the target object and the target relative location relationship, so that when the terminal renders the second authorized space in the second digital map, the target media content in the second authorized space and the target object in the second digital map satisfy the target relative location relationship.

For an embodiment of an implementation of this operation, refer to the implementation process of synchronizing the target media content to the second authorized space in operation 1211 in the foregoing embodiment. Details are not described in this embodiment of this application.

In this embodiment of this application, after receiving the target object, the target media content, and the relative location relationship between the target object and the target media content, the server may search a digital map corresponding to another scene for a feature that matches the target object, and synchronize, based on the relative location relationship, the target media content to another authorized space corresponding to the first user identifier. In this way, the server may automatically complete adding media content to a plurality of authorized spaces. This improves addition efficiency and can ensure effect consistency of the media content in the plurality of authorized spaces.

Figure 18:
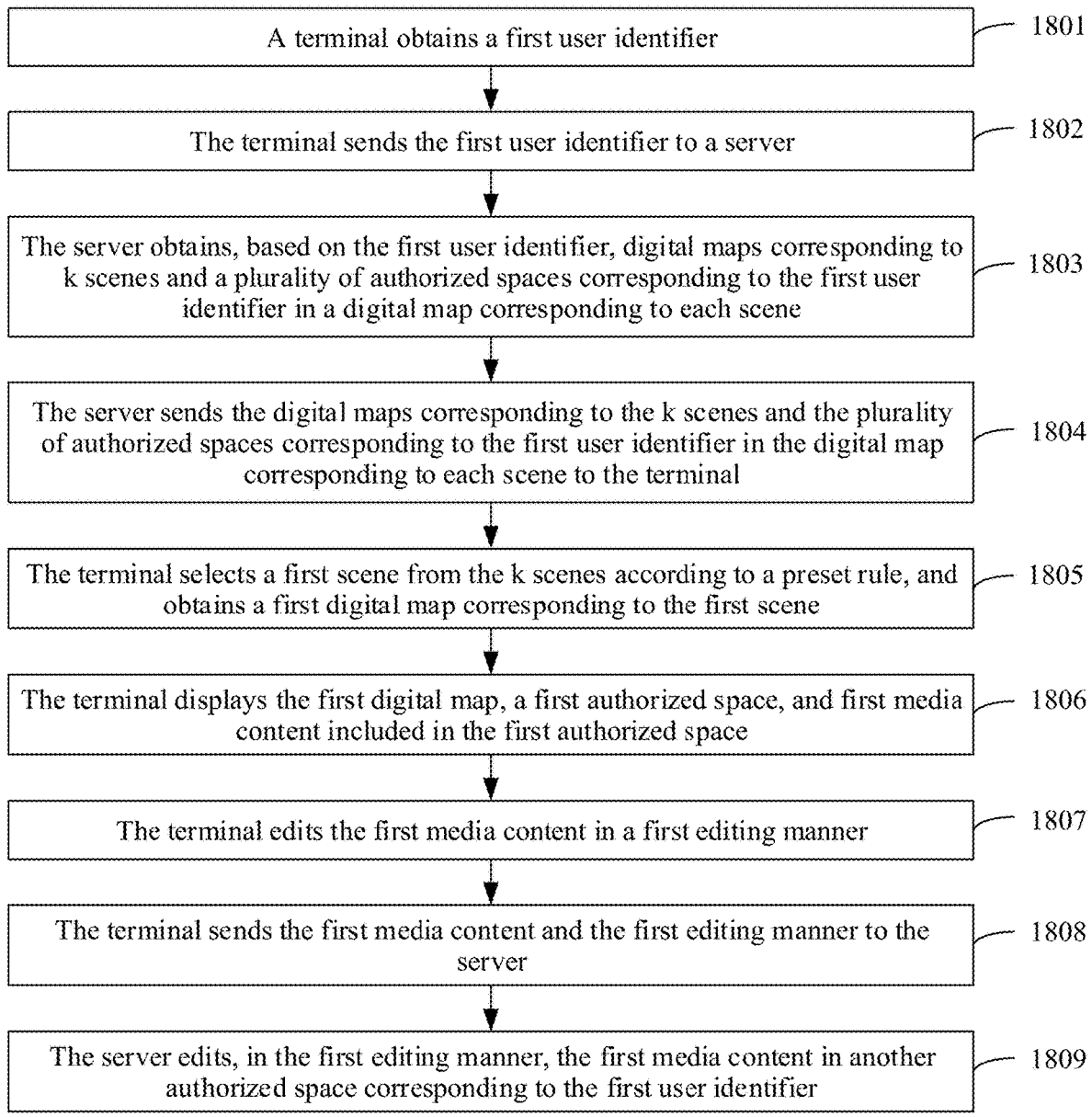
FIG. 18 is a flowchart of another method for synchronizing content in a plurality of authorized spaces based on a digital map according to an embodiment of this application.

The foregoing embodiment mainly describes an embodiment of an implementation of synchronously adding media content to a plurality of authorized spaces. Optionally, in some possible scenarios, synchronous editing may be further performed on media content included in the plurality of authorized spaces. FIG. 18 shows another method for synchronizing content in a plurality of authorized spaces based on a digital map according to an embodiment of this application. The method includes the following operations.

Operation 1801: A terminal obtains a first user identifier.

For an implementation of an implementation of this operation, refer to operation 1201 in the foregoing embodiment.

Operation 1802: The terminal sends the first user identifier to a server.

For an embodiment of an implementation of this step, refer to operation 1202 in the foregoing embodiment.

Operation 1803: The server obtains, based on the first user identifier, digital maps corresponding to k scenes and a plurality of authorized spaces corresponding to the first user identifier in a digital map corresponding to each scene.

For an embodiment of an implementation of this operation, refer to operation 1203 in the foregoing embodiment.

Operation 1804: The server sends the digital maps corresponding to the k scenes and the plurality of authorized spaces corresponding to the first user identifier in the digital map corresponding to each scene to the terminal.

Operation 1805: The terminal selects a first scene from the k scenes according to a preset rule, and obtains a first digital map corresponding to the first scene.

For an embodiment of an implementation of this operation, refer to operation 1204 in the foregoing embodiment.

Operation 1806: The terminal displays the first digital map, a first authorized space, and first media content included in the first authorized space.

In this operation, when the terminal displays the first media content, if all the first media content is in the first authorized space, the terminal may display the entire first media content. Optionally, if a part of the first media content exceeds a boundary of the first authorized space, the terminal may not display the part of content that exceeds the boundary, or may display the part of content differentially from a part that does not exceed the boundary, for example, display the part of content by using a different color or different transparency.

Operation 1807: The terminal edits the first media content in a first editing manner.

After the first media content is displayed, a user may perform an editing operation on the first media content. The terminal may edit the first media content based on the editing operation of the user in the first editing manner corresponding to the editing operation.

Figure 19:
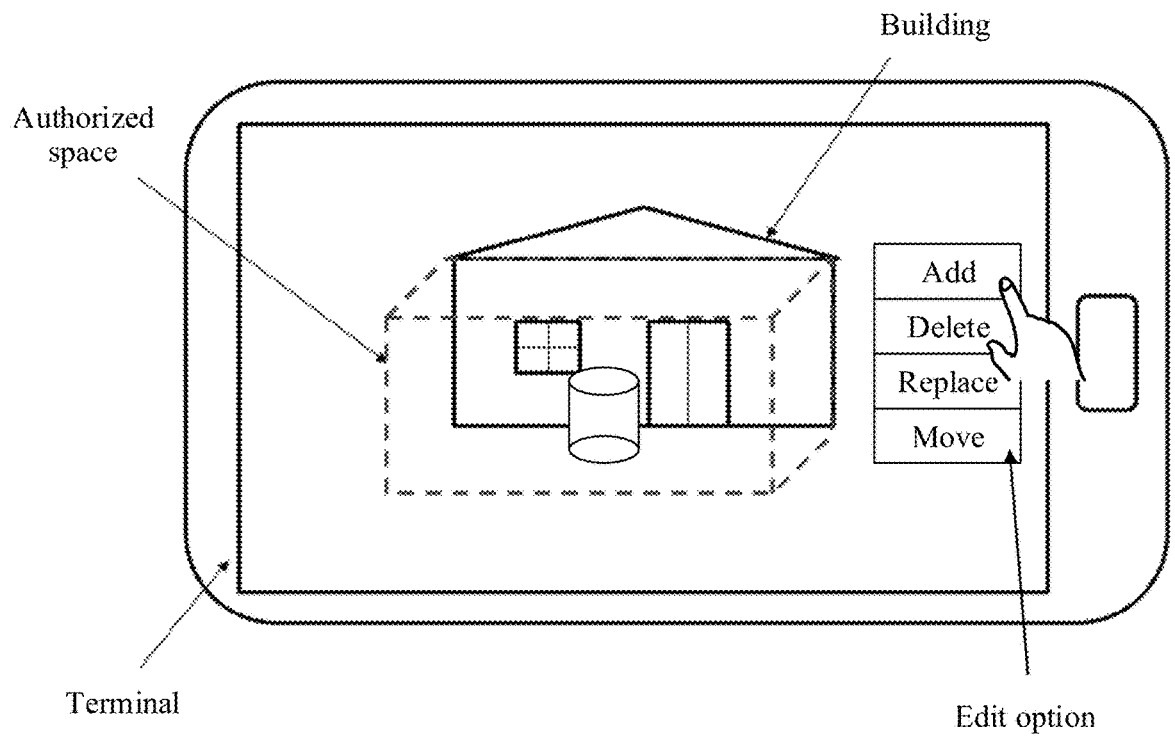
FIG. 19 is a schematic diagram of an editing option according to an embodiment of this application.

In embodiments, the terminal may display an editing option while displaying the first media content. The user may tap the editing option. After detecting a selection operation on the editing option, the terminal may enter an editing state. Then, the user may perform the editing operation on the first media content. The first editing manner may include one or more of an addition manner, a deletion manner, a replacement manner, and a movement manner based on preset relative displacement. Accordingly, the editing option may include an addition option, a deletion option, a replacement option, and a movement option. FIG. 19 is a schematic diagram of an editing option.

The addition manner refers to adding some media content or some elements based on the first media content. The added content or elements may be obtained based on a user operation by the terminal from media content or elements stored in the terminal, or may be obtained from a network. In embodiments, for a process in which the terminal obtains to-be-added content or elements, refer to operation 705 in the foregoing embodiment. Details are not described in this embodiment of this application. In addition, after detecting a selection operation on the addition option and entering the editing state, the terminal may display the media content type option described in the foregoing operation 705. The user may obtain media content by selecting the media content type option, so as to implement media content addition.

The deletion manner refers to deleting the first media content, or deleting some elements in the first media content. In this case, the user may select the deletion option, and the terminal enters an editing state. Then, the user may select a to-be-deleted object and perform a deletion operation to trigger a deletion instruction. After receiving the deletion instruction, the terminal may delete the object selected by the user. After the user selects the to-be-deleted object, the terminal may display an acknowledgment option. In this case, the deletion operation refers to a selection operation performed by the user on the acknowledgment option.

The replacement manner refers to replacing the first media content with target media content or replacing some elements in the first media content with a target element. In this case, the user may select the replacement option, and the terminal enters an editing state. Then, the user may select a to-be-replaced object. After the user selects the first media content or some elements in the first media content, the terminal may display an acknowledgment option. After detecting that the user selects the acknowledgment option, the terminal may delete the object selected by the user, and place the target media content or the target element at a location of the deleted object. The user may adjust the location of the target media content or the target element by dragging the target media content or the target element. For obtaining of the target media content or the target element, refer to operation 705. Details are not described in this embodiment of this application.

The movement manner based on the preset relative displacement refers to moving the first media content based on the preset relative displacement. The preset relative displacement may be obtained through calculation by using an input angle of the user and a distance, or may be determined based on a movement operation of the user. In embodiments, the user may select the movement option, and then select the first media content. Subsequently, the user may drag the first media content to move. The terminal may obtain the preset relative displacement based on a moving track of moving the first media content by the user, and move the first media content from an original location to a target location based on the preset relative displacement.

In addition, the first editing manner may alternatively include modifying a content element included in the first media content, or modifying a size, a display location, a display posture, and the like of the first media content.

It should be noted that the terminal may edit the first media content in any one of the foregoing manners, or may edit the first media content in a combination of the foregoing manners. This is not limited in this embodiment of this application.

Operation 1808: The terminal sends the first media content and the first editing manner to the server.

After the user acknowledges that editing is complete, the terminal may send the first media content and the first editing manner to the server.

It should be noted that the first editing manner may include edited content, an editing parameter, and/or the like. For example, when the first editing manner includes the addition manner, added media content or elements, a relative location relationship between the added media content and the first media content, and the like may be sent to the server. When the first editing manner includes the deletion manner, the first editing manner sent to the server may include a deleted object. When the first editing manner includes the replacement manner, the first editing manner sent to the server may include the target media content or the target element used to replace the first media content, and a posture of the target media content or the target element. When the first editing manner includes the movement manner based on the preset relative displacement, the first editing manner sent to the server may include the preset relative displacement.

Operation 1809: The server edits, in the first editing manner, the first media content in another authorized space corresponding to the first user identifier.

After receiving the first media content and the first editing manner, the server may first search a digital map that includes an authorized space corresponding to the first user identifier, to determine whether the first media content is included. If it is found that an authorized space corresponding to the first user identifier in a digital map corresponding to a scene includes the first media content, the server may use the scene as a second scene, and use the authorized space that corresponds to the first user identifier and that includes the first media content in the second scene as a second authorized space. Then, the server may edit, in the first editing manner, the first media content included in the second authorized space. After marking and editing the first media content, the server may store edited media content, so that the edited media content may be displayed when the terminal subsequently displays the second authorized space.

It should be noted that, that the server performs editing in the first editing manner means that the server performs a same editing operation on same media content in the second authorized space based on content that has been edited in the first authorized space. In this way, same media content in each authorized space can present a same editing effect, and effect consistency of media content in a plurality of authorized spaces is ensured.

In this embodiment of this application, the terminal may simultaneously obtain digital maps corresponding to a plurality of scenes and an authorized space corresponding to the first user identifier in each digital map, then edit media content in an authorized space, and send the media content and an editing manner to the server. The server may search a digital map corresponding to another scene for an authorized space that corresponds to the first user identifier and that also includes the media content, and edit the media content in the corresponding authorized space in the received editing manner. In this way, the server can automatically complete editing same media content in a plurality of authorized spaces. This improves editing efficiency of the media content in the authorized space, and ensures effect consistency of media content in a plurality of authorized spaces.

Figure 20:
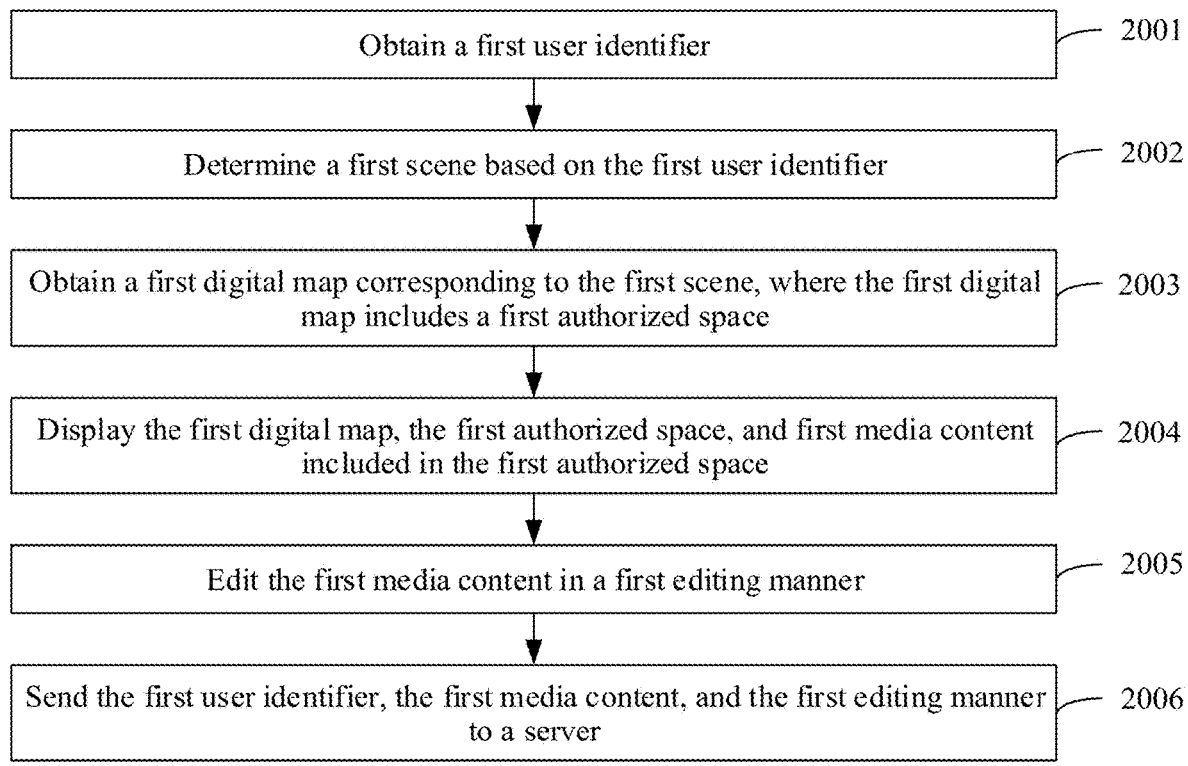
FIG. 20 is a flowchart of another method for synchronizing content in a plurality of authorized spaces based on a digital map according to an embodiment of this application.

The foregoing embodiment describes an embodiment of an implementation process in which the terminal and the server interact with each other to implement synchronization of media content in a plurality of authorized spaces. FIG. 20 is a flowchart of an implementation process of synchronizing content in a plurality of authorized spaces on a terminal side. Referring to FIG. 20, the implementation process includes the following operations.

Operation 2001: Obtain a first user identifier.

For an implementation of this operation, refer to operation 1201 in the foregoing embodiment.

Operation 2002: Determine a first scene based on the first user identifier.

For an embodiment of an implementation of this operation, refer to operation 1602 in the foregoing embodiment.

Operation 2003: Obtain a first digital map corresponding to the first scene, where the first digital map includes a first authorized space.

For an embodiment of an implementation of this operation, refer to operation 1603 in the foregoing embodiment.

Operation 2004: Display the first digital map, the first authorized space, and first media content included in the first authorized space.

For an embodiment of an implementation of this operation, refer to operation 1806 in the foregoing embodiment.

Operation 2005: Edit the first media content in a first editing manner.

For an implementation of this operation, refer to operation 1807 in the foregoing embodiment.

Operation 2006: Send the first user identifier, the first media content, and the first editing manner to a server, so that the server edits, in the first editing manner, the first media content in another authorized space corresponding to the first user identifier in a preset digital map.

In this embodiment of this application, the terminal may simultaneously obtain digital maps corresponding to a plurality of scenes and an authorized space corresponding to the first user identifier in each digital map, then edit media content in an authorized space, and send the media content and an editing manner to the server. The server may search a digital map corresponding to another scene for an authorized space that corresponds to the first user identifier and that also includes the media content, and edit the media content in the corresponding authorized space in the received editing manner. In this way, the server can automatically complete editing same media content in a plurality of authorized spaces. This improves editing efficiency of the media content in the authorized space, and ensures effect consistency of media content in a plurality of authorized spaces.

Figure 21:
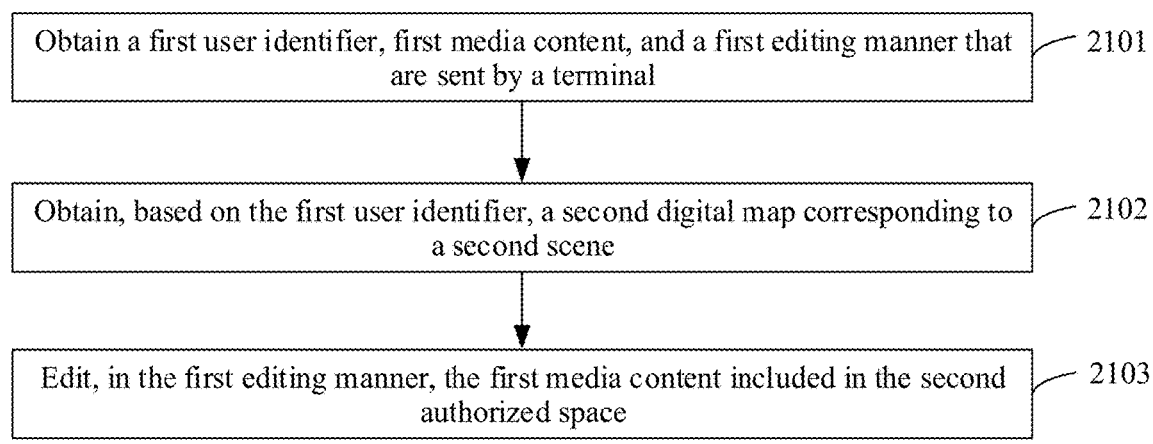
FIG. 21 is a flowchart of another method for synchronizing content in a plurality of authorized spaces based on a digital map according to an embodiment of this application.

FIG. 21 is a flowchart of a method for synchronizing media content in a plurality of authorized spaces on a server side according to an embodiment of this application. Referring to FIG. 21, the method includes the following operations.

Operation 2101: Obtain a first user identifier, first media content, and a first editing manner that are sent by a terminal.

In this embodiment of this application, a server may receive the first user identifier sent by the terminal, and the first user identifier may correspond to a user account logged in to the terminal.

The server may receive the first media content and the first editing manner that are sent by the terminal, and the first media content is media content included in a first authorized space included in a first digital map corresponding to a first scene. The first editing manner may include one or more of an addition manner, a deletion manner, a replacement manner, and a movement manner based on preset relative displacement.

Operation 2102: Obtain, based on the first user identifier, a second digital map corresponding to a second scene.

For an embodiment of an implementation of this operation, refer to the implementation of obtaining the second digital map and the second authorized space in operation 1809 in the foregoing example. Details are not described in this embodiment of this application.

Operation 2103: Edit, in the first editing manner, the first media content included in the second authorized space.

For this operation, refer to the implementation in operation 1809 in the foregoing example. Details are not described in this embodiment of this application.

In this embodiment of this application, after receiving the first media content and the first editing manner, a server may search for the first media content in an authorized space corresponding to the first user identifier in a digital map corresponding to another scene, and edit the found first media content in the first editing manner, to implement synchronous editing of same media content in a plurality of authorized spaces. In this way, the server can automatically complete editing the media content in the plurality of authorized spaces. This improves editing efficiency, and ensures effect consistency of the media content in the plurality of authorized spaces.

Optionally, it can be learned from the foregoing description in operation 703 that after the terminal sends the first user identifier to the server, the server may search the digital map corresponding to the target scene to determine whether there is an authorized space corresponding to the first user identifier. If the server does not find the authorized space corresponding to the first user identifier, it indicates that the registered user has no authorized space in the digital map corresponding to the target scene. In this case, if a three-dimensional space that is not authorized to another registered user exists in the digital map corresponding to the target scene, the server may send prompt information to the terminal. The terminal may display the prompt information, to prompt the registered user that no authorized space corresponding to the registered user exists in the digital map. To be specific, an embodiment of this application further provides a method for applying for an authorized space, and the user may purchase, split, or transfer a virtual authorized space on-site. Next, the terminal and the registered user may apply for the authorized space through interaction.

The user may set one or more virtual spaces with appropriate locations, sizes, and shapes in an interactive manner such as selecting a basic area shape, dragging, zooming in, zooming out, or rotation on the terminal, to apply for an authorized space, submit the application to the server, and properly obtain authorization through payment or in another manner.

For example, the terminal may display an application option in the preview stream of the target scene. When detecting a selection instruction for the application option, the terminal may send a space application request to the server. The space application request is used to request an authorized space from the server, and the space application request carries the first user identifier, the pose of the terminal, and the authorized space requirement.

In an embodiment of an possible implementation, when detecting the selection instruction for the application option, the terminal may display a preset space, to indicate the user to perform a setting operation on the preset space based on the preview stream of the target scene. When a setting instruction for the preset space is detected, a pose and a size of a preset space obtained after setting are determined based on a setting parameter included in the setting instruction, and the pose and the size of the preset space obtained after setting are used as the authorized space requirement.

The terminal may display a preset space with a preset shape and size. The preset shape may be a cube, a sphere, or the like. This is not limited in this embodiment of this application. The user may trigger the setting instruction for the preset space by performing a setting operation on the preset space. The user may first drag the preset space and place the preset space at a location in the preview stream of the target scene. Then, the user may adjust a size of the preset space by dragging a boundary of the preset space. In addition, the user may further adjust a posture of the preset space by rotating the preset space. After the user sets the preset space by using the foregoing series of operations, the terminal may use the space application request to carry the pose and the size of the preset space obtained after setting that are used as the authorized space requirement, and send the space application request to the server.

Optionally, in another possible implementation embodiment, the terminal may display a space option. The space option includes a shape option, a size option, and a quantity option of an authorized space. The user may select shapes, sizes, and a quantity of authorized spaces that the user wants to apply for. The terminal may obtain the shapes, the sizes, and the quantity that are of authorized spaces and that are selected by the user, and use the shapes, the sizes, and the quantity as the authorized space requirement.

Optionally, in another possible implementation embodiment, the terminal may display a space information input box, and the user enters information such as shapes, sizes, and a quantity of authorized spaces that the user wants to apply for. The terminal may obtain the information entered by the user, and use the information as the authorized space requirement.

After receiving the space application request, the server may allocate the n corresponding authorized spaces to the first user identifier based on the information included in the space application request. Then, the server may send an authorization response to the terminal, and the authorization response may carry the n authorized spaces.

For example, the server may obtain the target digital map based on the pose of the terminal. Then, the server may search the target digital map to determine whether there is a space that satisfies the authorized space requirement and that has not been applied for by another user. If the space exists, the server may allocate the space to the registered user identified by the first user identifier, that is, use the space as the authorized space corresponding to the first user identifier, and correspondingly store space information of the space and the first user identifier. Then, the server may return an application success message to the terminal, to notify the terminal that the authorized space application succeeds.

Optionally, if there is no space that satisfies the authorized space requirement in the target digital map, or there is a space that satisfies the authorized space requirement, but the space is an authorized space of another registered user, the server may return an application failure message to the terminal, to prompt the terminal that the authorized space application fails.

Figure 22:
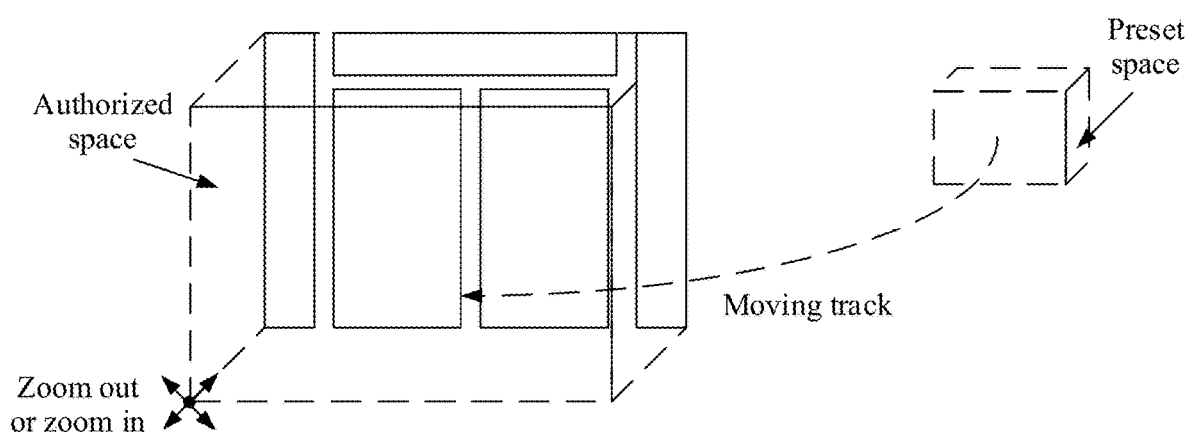
FIG. 22 is a schematic diagram of displaying a preset space and setting the preset space according to an embodiment of this application.

FIG. 22 is a schematic diagram of displaying a preset space in a user interface and setting the preset space according to an embodiment of this application. As shown in FIG. 22, the user may move the preset space to a specified location by dragging the preset space, and then may scale down or scale up the preset space by dragging a corner of the preset space.

Optionally, in a possible implementation embodiment, when detecting the selection instruction for the application option, the terminal may first obtain, from the server based on the pose of the terminal, the digital map corresponding to the target scene, and then the terminal may display, in the preview stream of the target scene, a pre-segmented space block in the digital map corresponding to the target scene. The user may select one or more space blocks. The terminal may use the one or more space blocks selected by the user as a space for which the user wants to apply, use the space application request to carry a pose and a size of the space that are used as the authorized space requirement, and send the space application request to the server, so that the server determines, based on the authorized space requirement, whether to use the space as the authorized space corresponding to the first user identifier.

Figure 23:
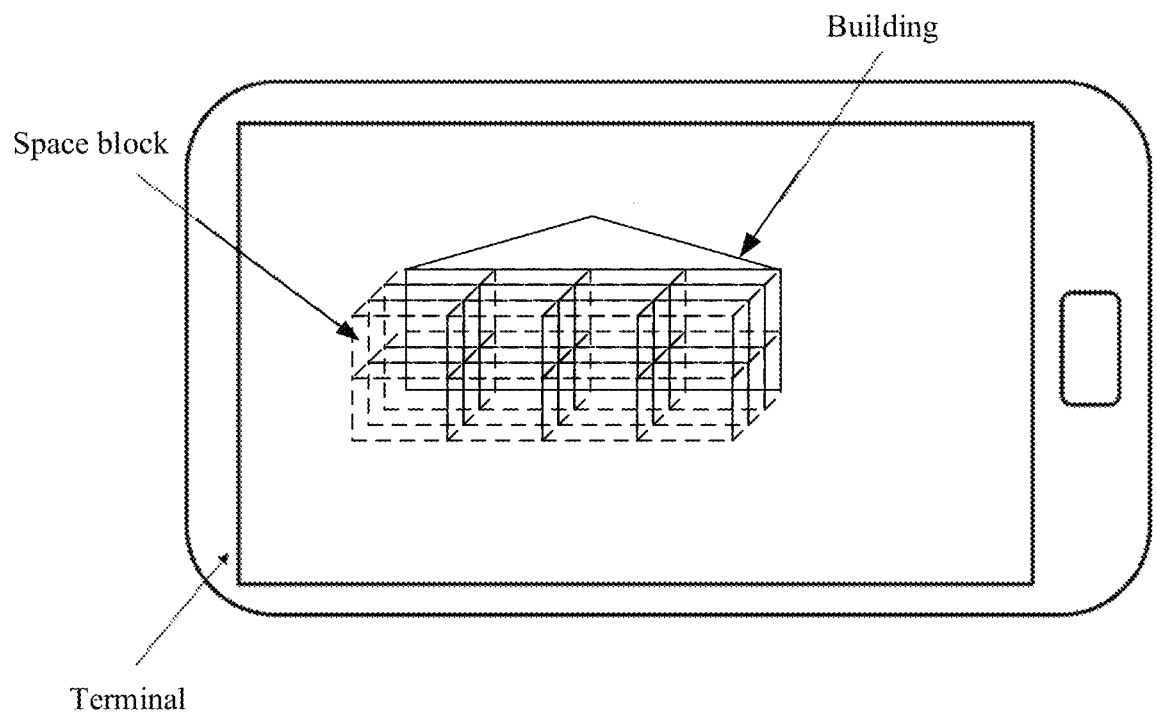
FIG. 23 is a schematic diagram of displaying a pre-segmented space block in a preview stream of a target scene according to an embodiment of this application.

FIG. 23 shows a pre-segmented space block displayed in a preview stream of a target scene according to an embodiment of this application. As shown in FIG. 23, a space in front of a building may be divided into a plurality of space blocks, and the user may select one or more of the plurality of space blocks as a space to be applied for.

It should be noted that, in this embodiment of this application, for a building, spaces in different directions of the building may be applied for as authorized spaces by different registered users. In this case, space occupation area division is performed on each location during construction of a digital map. For example, if a building exists in a three-dimensional space, when a digital map is constructed, a surrounding box of the building is used for calibration. In this way, when the registered user applies for a space on a side of the building, the authorized space applied for by the user may be bound to a space occupied by the building. In this way, for a building, when spaces in different directions of the building are applied for by different registered users, the authorized spaces applied for by the users are all bound to a space occupied by the building.

Figure 24:
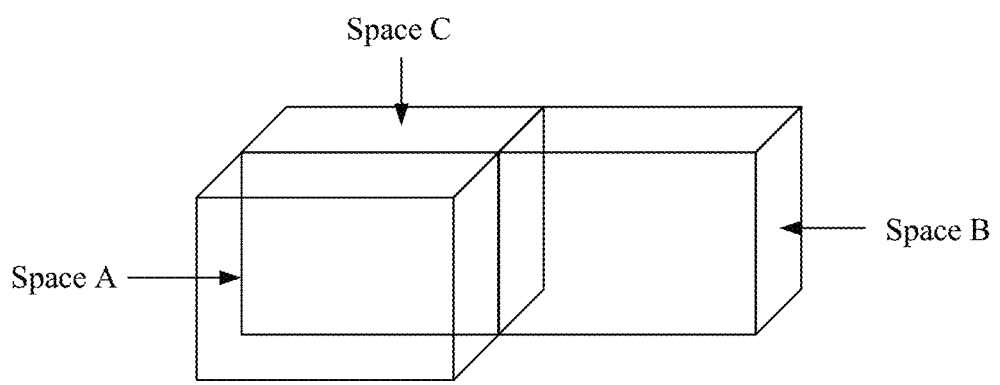
FIG. 24 is a schematic diagram in which a user authorized space is bound to an authorized space in which a building is located according to an embodiment of this application.

For example, as shown in FIG. 24, a first user applies for an authorized space A, a second user applies for an authorized space B, and a space occupied by a building is C. In this case, for the first user, the space A and the space C may be bound, and for the second user, the space B and the space C may be bound. In this way, after subsequently obtaining a user identifier, the server may determine a corresponding scene based on the user identifier. The scene includes an authorized space corresponding to the user identifier and a space bound to the authorized space.

In this embodiment of this application, the user may implement authorized space application based on the preview stream of the target scene and the current pose of the terminal by interacting with the terminal. In this way, the user may apply for an authorized space in real time based on the view of the user, that is, "what you see is what you get" for a space is implemented. This improves convenience of authorized space application, and improves application efficiency.

Figure 25:
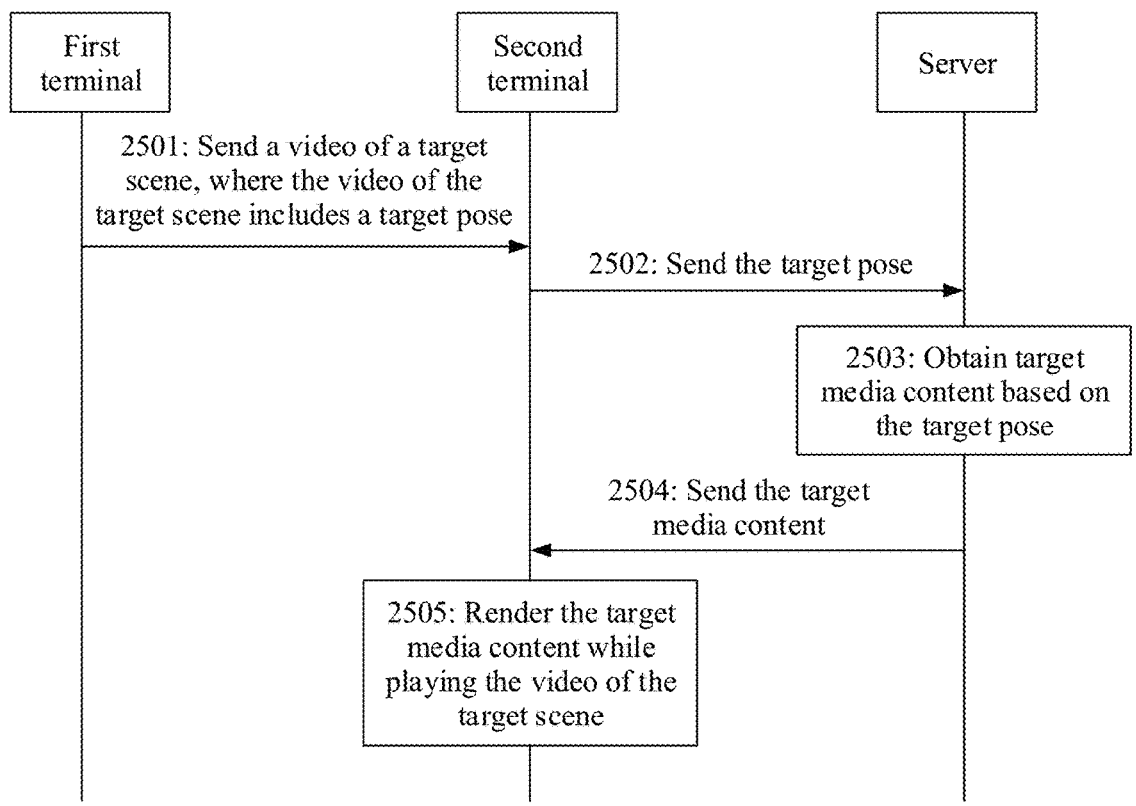
FIG. 25 is a flowchart of a method for sharing media content based on a digital map according to an embodiment of this application.

After media content is added to the authorized space by using the foregoing method, subsequently, for a consumer, when a first consumer collects a video of the target scene by using a first terminal, the media content added to the authorized space included in the target scene may be extracted from the server based on a pose of the first terminal for display. In addition, the first terminal may further send the video of the target scene to a second terminal, so that the second terminal obtains, based on the video of the target scene, the media content added to the authorized space included in the target scene for display, to share the media content in the digital map. The following describes a method for sharing media content based on a digital map according to an embodiment of this application. As shown in FIG. 25, the method includes the following operations.

Operation 2501: A first terminal sends a video of a target scene to a second terminal.

The first terminal may collect the video of the target scene by using a camera component configured on the first terminal. The video of the target scene includes a target pose of the first terminal at which the first terminal shoots the video. After collecting the video, the first terminal may send the target pose to a server, and the server may obtain, from stored media content based on the target pose, media content that matches the target pose. The obtained media content is sent to the first terminal, and the first terminal may render the received media content in the video of the target scene.

In addition, the first terminal may further display a content sharing option. When the first terminal detects a selection operation performed by a first user on the content sharing option, the first terminal may learn of a second user selected by the first user, and send the video of the target scene to the second terminal corresponding to the second user.

Operation 2502: The second terminal sends the target pose to the server.

After receiving the video of the target scene, the second terminal may detect that the video of the target scene includes the target pose. In this case, the second terminal may obtain the target pose, and send the target pose to the server.

Optionally, in a possible implementation embodiment, after obtaining the video of the target scene, the second terminal may play the video. In a play process of the video, the user may select a specified area on a played video picture. The second terminal may extract a target object from the specified area, and send the target object, a pose of the target object, and the target pose to the server.

It should be noted that, when playing the video, the second terminal may display a media content display switch option. The user may trigger a media content display switch-on instruction by activating the option, or may trigger a media content display switch-off instruction by disabling the option. After receiving the switch-on instruction, the second terminal may start to perform operations 2503 to 2505, to obtain target media content from the server for display. When receiving the switch-off instruction, the second terminal may stop displaying the target media content.

Figure 26:
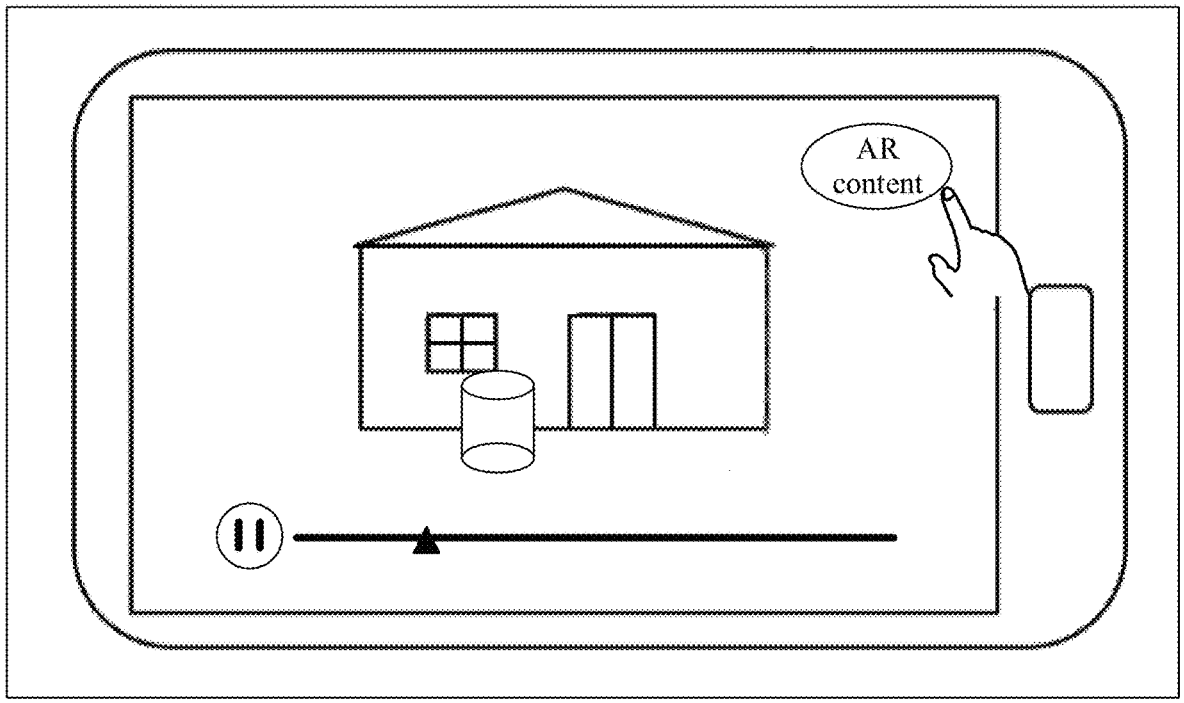
FIG. 26 is a schematic diagram of displaying a media content display switch option on a video play page according to an embodiment of this application.

FIG. 26 is a schematic diagram of displaying a media content display switch option on a video page. As shown in FIG. 26, the media content switch option may be an AR content option shown in FIG. 26. An initial state of the AR content option may be an activated state by default. In this state, an instruction that can be detected by the second terminal is a switch-on instruction. The user may trigger a switch-off instruction by tapping the AR content option, to stop displaying the target media content. The user may trigger a switch-on instruction by tapping the AR content option again. The second terminal may perform subsequent operations again according to the switch-on instruction.

Operation 2503: The server obtains the target media content based on the target pose.

It can be learned from the description in the foregoing embodiment that, when adding media content, the terminal sends the media content added to an authorized space and a pose of the media content to the server. The server stores the media content and the pose. Based on this, in this operation, the server may search the stored media content for the target media content that matches the target pose.

Optionally, if the second terminal not only sends the target pose, but also sends the target object and the pose of the target object, the server may obtain, based on the received target pose, a digital map corresponding to the target scene, and then search the digital map corresponding to the target scene for a feature that matches the target object. Then, the server may obtain added media content related to the target object, and send the obtained media content to the terminal as the target media content. The media content related to the target object may be media content whose pose satisfies a preset pose relationship with the pose of the target object, media content closest to the target object, media content included in an area of a specific range centered on the target object, or the like. For example, the media content related to the target object is registered content in an area that is centered on the target object and whose radius is 50 meters.

Operation 2504: The server sends the target media content to the second terminal.

The server may not only send the target media content to the second terminal, but also send a pose of the target media content to the second terminal.

Operation 2505: The second terminal renders the target media content when playing the video of the target scene.

In this embodiment of this application, the second terminal may receive the video of the target scene that is shared by the first terminal, obtain, from the server based on the target pose included in the video, media content added at a corresponding location, and display the media content. In this way, terminals can share, by using a video sharing method, media content added to a digital map. This facilitates media content propagation.

Figure 27:
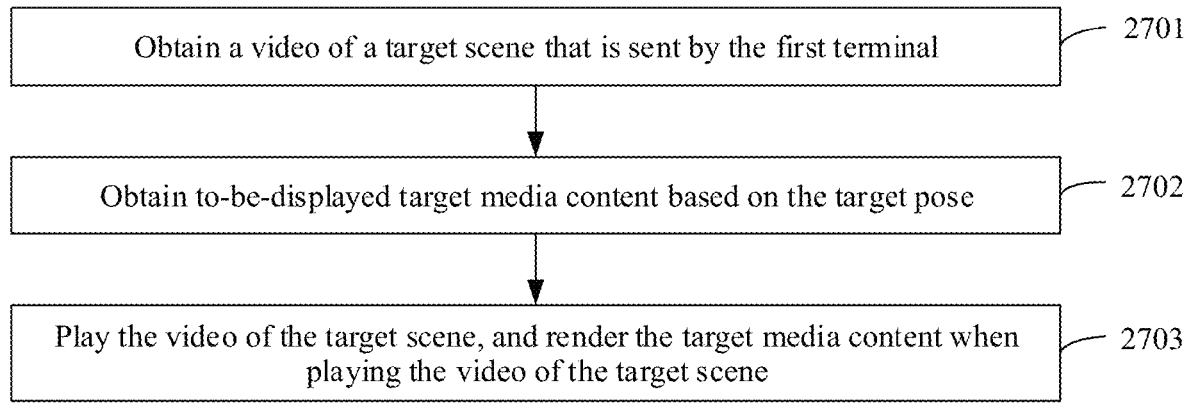
FIG. 27 is a flowchart of another method for sharing media content based on a digital map according to an embodiment of this application.

The foregoing embodiment mainly describes an embodiment of an implementation process in which the first terminal, the second terminal, and the server share media content through interaction. Next, FIG. 27 is a flowchart of a method for obtaining media content on a second terminal side based on a video shared by a first terminal. Referring to FIG. 27, the method includes the following operations.

Operation 2701: Obtain a video of a target scene that is sent by the first terminal.

The video of the target scene carries a target pose of the first terminal at which the first terminal shoots the video of the target scene.

Operation 2702: Obtain to-be-displayed target media content based on the target pose.

In this operation, a second terminal may send the target pose carried in the video of the target scene to a server, and the server may obtain the target media content based on the target pose in the implementation in operation 2503 in the foregoing embodiment, and then send the media content to the second terminal. Correspondingly, the second terminal may receive the target media content sent by the server.

Operation 2703: Play the video of the target scene, and render the target media content when playing the video of the target scene.

After obtaining the target media content, the second terminal may render the target media content when playing the video of the target scene.

In this embodiment of this application, the second terminal may receive the video of the target scene that is shared by the first terminal, obtain, from the server based on the target pose included in the video, media content added at a corresponding location, and display the media content. In this way, terminals can share, by using a video sharing method, media content added to a digital map. This facilitates media content propagation.

It should be noted that, in the foregoing method embodiments, an execution sequence of operations is not limited by operation numbers, that is, there is no specific sequence between some operations in the foregoing embodiments. In addition, without violating a natural rule, operations in the foregoing embodiments may be randomly combined. This is not limited in embodiments of this application.

Figure 28:
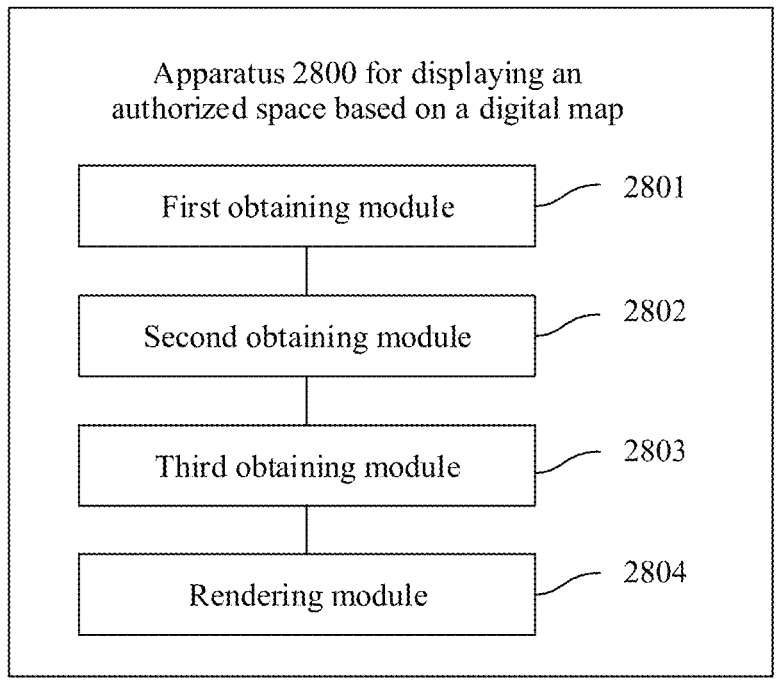
FIG. 28 is a schematic diagram of a structure of an apparatus for displaying an authorized space based on a digital map according to an embodiment of this application.

Referring to FIG. 28, an embodiment of this application provides an apparatus 2800 for displaying an authorized space based on a digital map. The apparatus includes:

a first obtaining module 2801, configured to perform operation 701 in the foregoing embodiment;
a second obtaining module 2802, configured to perform operation 702 in the foregoing embodiment;
a third obtaining module 2803, configured to perform operation 703 in the foregoing embodiment; and
a rendering module 2804, configured to perform operation 704 in the foregoing embodiment.

Optionally, the apparatus further includes:
a fourth obtaining module, configured to obtain target media content, where the target media content includes one or more of a text, a picture, audio, a video, and a model; and
an addition module, configured to add the target media content to a target authorized space, where the target authorized space is any one of the n authorized spaces.

Optionally, the addition module is configured to:
when detecting a drag instruction for the target media content, add the target media content at a drag end location indicated by the drag instruction, where a display manner of media content that is in the target media content and that is inside the target authorized space is different from that of media content that is in the target media content and that is outside the target authorized space, or media content that is in the target media content and that is inside the target authorized space is visible and media content that is in the target media content and that is outside the target authorized space is invisible.

Optionally, the apparatus further includes:
a determining module, configured to determine a target relative location relationship between the target media content and a target object, where the target object is a preset image or three-dimensional object included in the digital map corresponding to the target scene; and
a sending module, configured to send the target media content, the target object, and the target relative location relationship to a server, so that the server updates content in another authorized space corresponding to the first user identifier in a preset digital map based on the target media content, the target object, and the target relative location relationship.

Optionally, a relative location relationship between the target media content and a first feature satisfies a first preset location relationship, and the first feature is a preset image or three-dimensional object included in the preview stream of the target scene.

Optionally, the third obtaining module 2803 is configured to:
send the first user identifier and the pose to the server, so that the server obtains the n authorized spaces based on the first user identifier and the pose; and
receive the n authorized spaces sent by the server.

Optionally, the third obtaining module 2803 is configured to:
send the first user identifier, the pose, and a space screening condition to the server, so that the server obtains m authorized spaces based on the first user identifier and the pose, and obtains the n authorized spaces satisfying the space screening condition from the m authorized spaces; and
receive the n authorized spaces sent by the server.

Optionally, the third obtaining module 2803 is configured to:
send the first user identifier and the pose to the server, so that the server obtains m authorized spaces based on the first user identifier and the pose;
receive the m authorized spaces sent by the server; and
obtain the n authorized spaces satisfying a space screening condition from the m authorized spaces.

Optionally, the third obtaining module 2803 is configured to:
- send a space application request to the server, where the space application request is used to apply for an authorized space from the server, and the space application request carries the first user identifier, the pose, and an authorized space requirement, so that the server allocates the n corresponding authorized spaces to the first user identifier based on the pose and the authorized space requirement; and
- receive an authorization response sent by the server, where the authorization response carries the n authorized spaces.

Optionally, the rendering module 2804 is configured to:
- render the n authorized spaces in the preview stream of the target scene in a preset display form based on the pose, where the preset display form includes one or more of a preset color, preset transparency, a cubic space, and a spherical space.

Optionally, the apparatus further includes an adjustment module and a sending module.

The adjustment module is configured to: if poses of the n authorized spaces do not match poses in the preview stream of the target scene, adjust the poses of the n authorized spaces in the digital map, so that the poses of the n authorized spaces match the poses in the preview stream of the target scene.

The sending module is configured to send adjusted poses of the n authorized spaces to the server, so that the server updates the poses of the n authorized spaces in the digital map.

Optionally, a relative location relationship between each of the n authorized spaces rendered in the preview stream of the target scene and a second feature satisfies a second preset location relationship, and the second feature is a preset image or three-dimensional object included in the preview stream of the target scene.

In conclusion, in this embodiment of this application, the terminal may obtain, based on the first user identifier and the pose of the terminal, an authorized space of a current registered user in the digital map corresponding to the target scene, and then render the authorized space of the registered user in the preview stream of the target scene, so that the registered user can view, in real time, an authorized space corresponding to a current scene. This is more convenient. In addition, because the authorized space is clearly displayed in the preview stream corresponding to the target scene, a registered user can clearly learn of a boundary of an authorized space of the registered user. In this case, when the user adds media content to the authorized space, it can be effectively avoided that the added media content occupies an authorized space of another user. This implements accurate media content addition, and improves addition efficiency.

Figure 29:
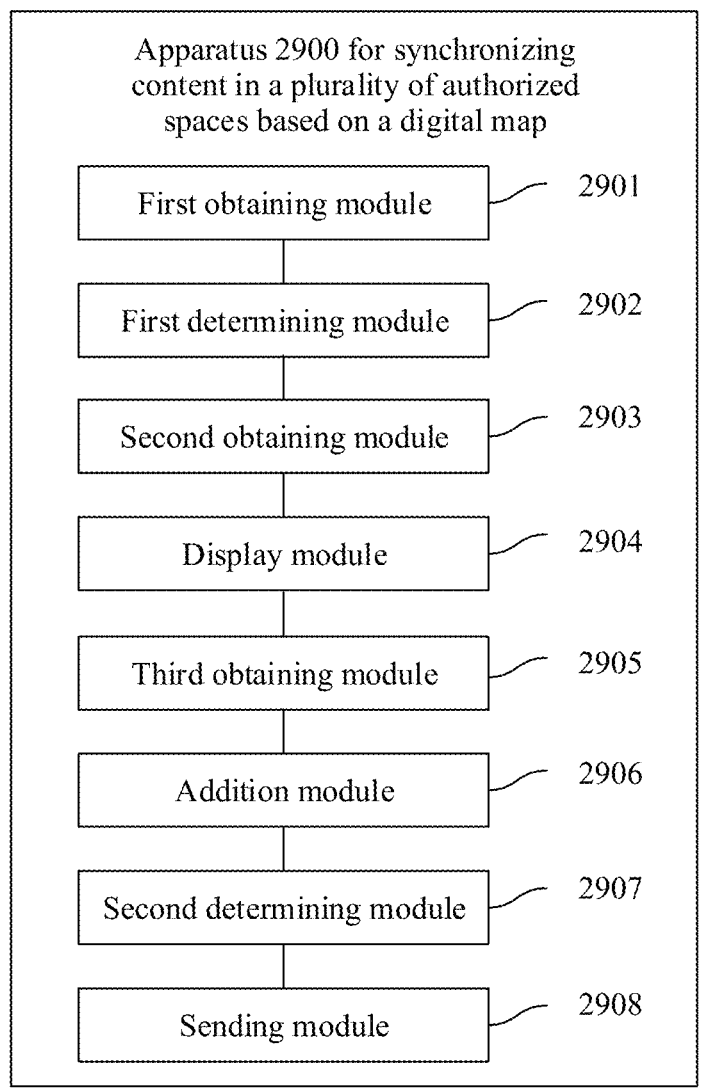
FIG. 29 is a schematic diagram of a structure of an apparatus for synchronizing content in a plurality of authorized spaces based on a digital map according to an embodiment of this application.

FIG. 29 is a schematic diagram of a structure of an apparatus 2900 for synchronizing content in a plurality of authorized spaces based on a digital map according to an embodiment of this application. Referring to FIG. 29, the apparatus 2900 includes:
- a first obtaining module 2901, configured to perform operation 1601 in the foregoing embodiment;
- a first determining module 2902, configured to perform operation 1602 in the foregoing embodiment;
- a second obtaining module 2903, configured to perform operation 1603 in the foregoing embodiment;
- a display module 2904, configured to perform operation 1604 in the foregoing embodiment;
- a third obtaining module 2905, configured to perform operation 1605 in the foregoing embodiment;
- an addition module 2906, configured to perform operation 1606 in the foregoing embodiment;
- a second determining module 2907, configured to perform operation 1607 in the foregoing embodiment; and
- a sending module 2908, configured to perform operation 1608 in the foregoing embodiment.

Optionally, the first determining module 2902 includes:
- a sending submodule, configured to send a first user identifier to a server, so that the server obtains k scenes based on the first user identifier;
- a receiving submodule, configured to receive the k scenes sent by the server; and
- a selection submodule, configured to select a first scene from the k scenes according to a preset rule.

Optionally, the selection submodule is configured to:
- select a scene closest to a location of the terminal from the k scenes as the first scene; or
- select a scene with a highest priority from the k scenes as the first scene; or
- select a default scene from the k scenes as the first scene.

Optionally, the first determining module 2902 is configured to:
- send a first user identifier and a scene requirement to a server, so that the server obtains, based on the first user identifier, k scenes corresponding to the first user identifier, and obtains, from the k scenes, a first scene that satisfies the scene requirement; and
- receive the first scene sent by the server.

Optionally, in a digital map, different user identifiers correspond to different authorized spaces.

In this embodiment of this application, the terminal may simultaneously obtain digital maps corresponding to a plurality of scenes and an authorized space corresponding to the first user identifier in each digital map, then add the target media content to an authorized space, determine a relative location relationship between the target media content and the target object, and send the relative location relationship, the target object, and the target media content to the server. The server may search for a feature matching the target object in a digital map corresponding to another scene, and synchronize, based on the relative location relationship, the target media content to another authorized space corresponding to the first user identifier. In this way, the server can automatically complete adding media content in a plurality of authorized spaces. This improves addition efficiency, and can ensure addition accuracy.

Figure 30:
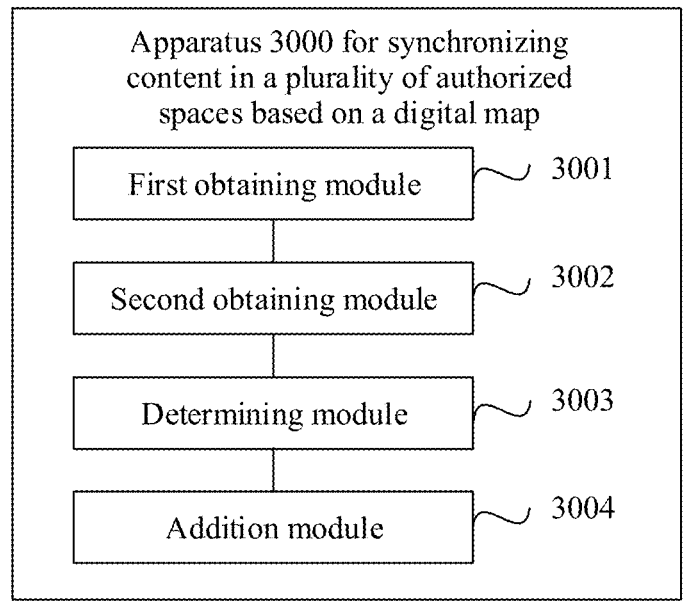
FIG. 30 is a schematic diagram of a structure of another apparatus for synchronizing content in a plurality of authorized spaces based on a digital map according to an embodiment of this application.

FIG. 30 is a schematic diagram of a structure of an apparatus 3000 for synchronizing content in a plurality of authorized spaces based on a digital map according to an embodiment of this application. Referring to FIG. 30, the apparatus 3000 includes:
- a first obtaining module 3001, configured to perform operation 1701 in the foregoing embodiment;
- a second obtaining module 3002, configured to perform operation 1702 in the foregoing embodiment;
- a determining module 3003, configured to perform operation 1703 in the foregoing embodiment; and
- an addition module 3004, configured to perform operation 1704 in the foregoing embodiment.

Optionally, the apparatus further includes:
- an adjustment module, configured to: if the target media content does not match the second authorized space, adjust the target media content, so that adjusted target media content matches the second authorized space.

Optionally, in a digital map, different user identifiers correspond to different authorized spaces.

In this embodiment of this application, a server may obtain the target object, the target media content, and the relative location relationship between the target media content and the target object that are sent by the terminal, and then add the target media content to the second authorized space based on the target object and the target relative location relationship, so that media content in authorized spaces corresponding to the user identifier is automatically updated in a centralized manner, and update efficiency is high.

Figure 31:
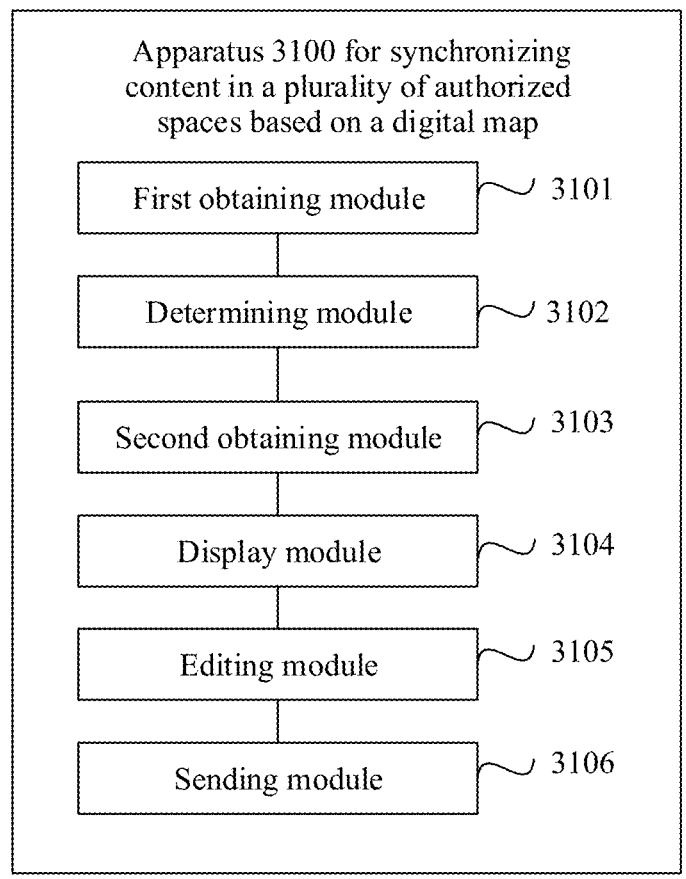
FIG. 31 is a schematic diagram of a structure of another apparatus for synchronizing content in a plurality of authorized spaces based on a digital map according to an embodiment of this application.

FIG. 31 is a schematic diagram of a structure of an apparatus 3100 for synchronizing content in a plurality of authorized spaces based on a digital map according to an embodiment of this application. Referring to FIG. 31, the apparatus 3100 includes:

a first obtaining module 3101, configured to perform operation 2001 in the foregoing embodiment;
a determining module 3102, configured to perform operation 2002 in the foregoing embodiment;
a second obtaining module 3103, configured to perform operation 2003 in the foregoing embodiment;
a display module 3104, configured to perform operation 2004 in the foregoing embodiment;
an editing module 3105, configured to perform operation 2005 in the foregoing embodiment; and
a sending module 3106, configured to perform operation 2006 in the foregoing embodiment.

Optionally, the second obtaining module includes:
a sending submodule, configured to send a first user identifier to a server, so that the server obtains, based on the first user identifier, digital maps corresponding to k scenes and a plurality of authorized spaces corresponding to the first user identifier in a digital map corresponding to each scene;
a receiving submodule, configured to receive the digital maps corresponding to the k scenes and the plurality of authorized spaces corresponding to the first user identifier in the digital map corresponding to each scene that are sent by the server; and
a selection submodule, configured to select a first scene from the k scenes according to a preset rule, and obtain a first digital map corresponding to the first scene.

Optionally, the selection submodule is configured to:
select a scene closest to a location of the terminal from the k scenes as the first scene; or
select a scene with a highest priority from the k scenes as the first scene; or
select a default scene from the k scenes as the first scene.

Optionally, the determining module is configured to:
send a first user identifier and a scene requirement to a server, so that the server obtains, based on the first user identifier, k scenes corresponding to the first user identifier, and obtains, from the k scenes, a first scene that satisfies the scene requirement; and
receive the first scene sent by the server.

Optionally, the first editing manner includes one or more of an addition manner, a deletion manner, a replacement manner, and a movement manner based on preset relative displacement.

Optionally, in a digital map, different user identifiers correspond to different authorized spaces.

Figure 32:
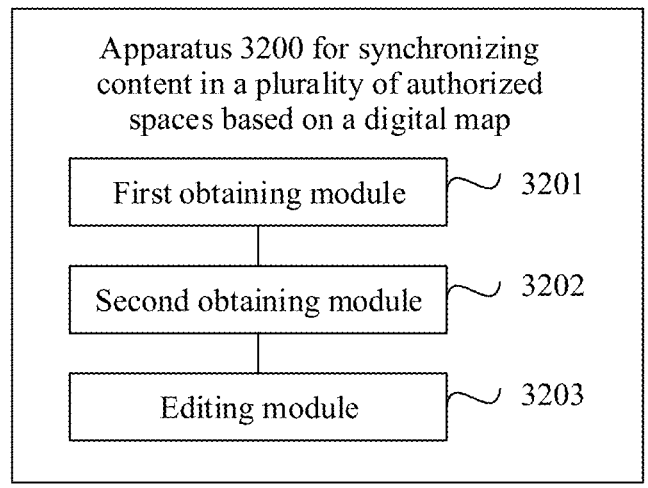
FIG. 32 is a schematic diagram of a structure of another apparatus for synchronizing content in a plurality of authorized spaces based on a digital map according to an embodiment of this application.

FIG. 32 is a schematic diagram of a structure of an apparatus 3200 for synchronizing content in a plurality of authorized spaces based on a digital map according to an embodiment of this application. Referring to FIG. 32, the apparatus 3200 includes:

a first obtaining module 3201, configured to perform operation 2101 in the foregoing embodiment;
a second obtaining module 3202, configured to perform operation 2102 in the foregoing embodiment; and
an editing module 3203, configured to perform operation 2103 in the foregoing embodiment.

Optionally, the apparatus further includes:
an adjustment module, configured to: if edited media content does not match the second authorized space, adjust the edited media content, so that adjusted media content matches the second authorized space.

Optionally, the first editing manner includes one or more of an addition manner, a deletion manner, a replacement manner, and a movement manner based on preset relative displacement.

Optionally, in a digital map, different user identifiers correspond to different authorized spaces.

Figure 33:
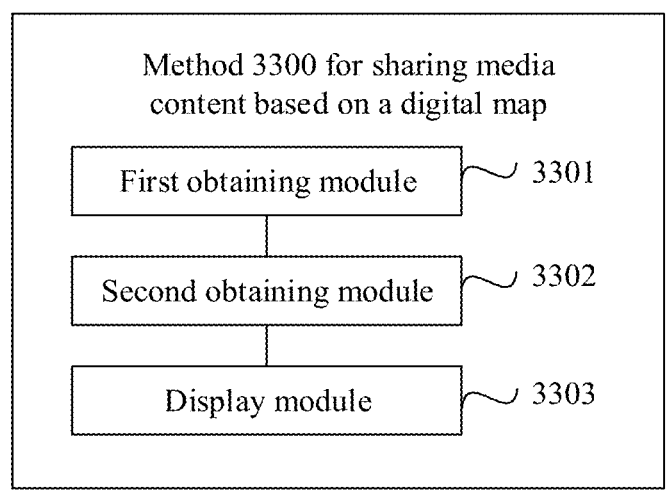
FIG. 33 is a schematic diagram of a structure of an apparatus for sharing media content based on a digital map according to an embodiment of this application.

FIG. 33 shows an apparatus 3300 for sharing media content based on a digital map according to an embodiment of this application. The apparatus is used in a second terminal, and the apparatus includes:

a first obtaining module 3301, configured to perform operation 2401 in the foregoing embodiment;
a second obtaining module 3302, configured to perform operation 2402 in the foregoing embodiment; and
a display module 3303, configured to perform operation 2403 in the foregoing embodiment.

Optionally, the second obtaining module 3302 is configured to:
send a target pose to a server, so that the server obtains target media content based on the target pose; and
receive the target media content sent by the server.

In this embodiment of this application, the second terminal may receive the video of the target scene that is shared by the first terminal, obtain, from a server based on the target pose included in the video, media content added at a corresponding location, and display the media content. In this way, terminals can share, by using a video sharing method, media content added to a digital map. This facilitates media content propagation.

AR&VR digital space (also referred to as virtual space) and digital content (also referred to as virtual content) management is a core technology that supports large-scale commercial application of AR&VR, and has very important strategic value. With widespread application of AR&VR, more users, such as content developers, need to produce, create, and set digital content in a digital space. How to make common users produce digital content in a digital space conveniently and quickly, and how to manage and maintain various types of digital content generated by a large quantity of users in a digital space are urgent problems to be solved. The solutions provided in the present disclosure enable common users (such as developers) to create and edit digital content in a "what you see is what you get digital space", and provide a method for performing permission management on digital content of a large quantity of users in time and space, to ensure that digital space resources are provided for different users efficiently in order, and implement optimal utilization of a digital space. In content operation of the entire AR&VR, there may be at least three main roles: a developer, a content server, and a consumer. The developer mainly augments or renders content, and is a "designer" of the content. A terminal used by the developer may also be referred to as a developer terminal. The consumer mainly experiences content, and is a "viewer" of the content. For example, virtual content is rendered on a terminal based on the real world by using software such as AR&VR, to achieve an objective such as augmented reality. A terminal used by the consumer may also be referred to as a consumer terminal. The content server manages media content and a digital space, is a middle link between the developer terminal and the consumer terminal, and can save and update content designed by the developer. In addition, when responding to a related requirement of the consumer terminal, the content server can deliver the content to the consumer terminal, so that content presented by the consumer terminal is just in a form of the content developed by the developer. The developer terminal, the content server, and the consumer terminal may establish information communication and implement reference and mapping of a coordinate system by using related software.

With reference to the optional implementations of the foregoing embodiments, this application describes some optional application examples with reference to some application scenarios.

Example 1

Figure 34:
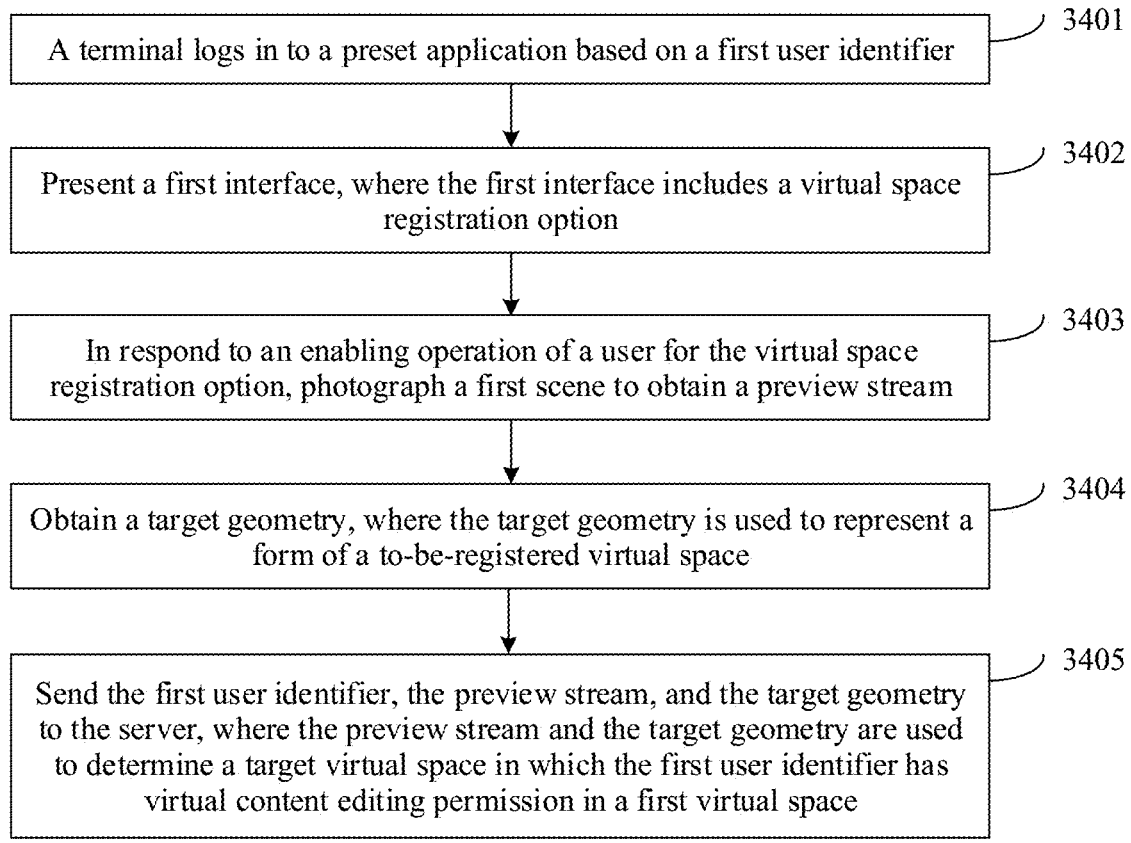
FIG. 34 is a flowchart of a virtual space registration method according to an embodiment of this application.

This example describes a virtual space registration method. As shown in FIG. 34, the method includes the following operations.

Operation 3401: A terminal logs in to a preset application based on a first user identifier.

The preset application may be an app, or may be an app including an AR&VR functional module. The app may be used to register, for a current login account on a server based on a scene currently photographed by the terminal, a virtual space with virtual object editing permission. For example, a user starts a specific app or a jump interface, an applet, or a jump web page in an operation-type app. The first user identifier may represent information about the current login account.

Figure 35:
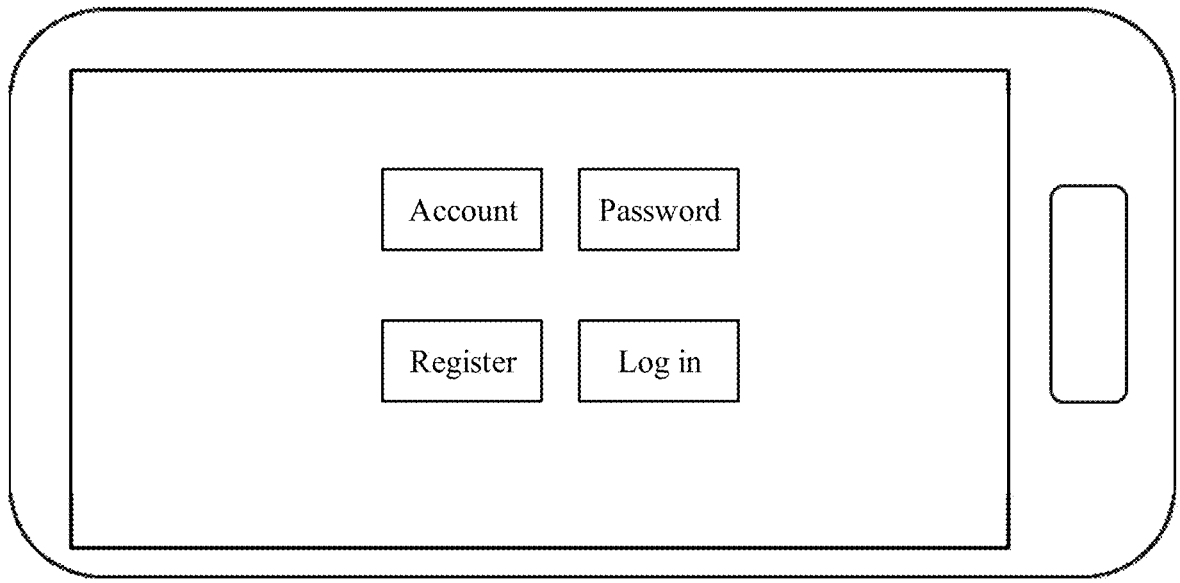
FIGS. 35, 36, . . . , and 48 each are a diagram of an interface in a possible virtual space registration process according to an embodiment of this application.

An embodiment of an operation interface may be shown in FIG. 35. When the user starts the app, the user may register a new account, or use an existing account for login. The account may be used for but is not limited to representing a user identity of a developer. The account may be operated and maintained by a content operation company, and each account has a right to develop virtual content. However, for a same location or object, different account bodies should not have overlapping virtual content at the same time. In this case, when a consumer terminal is used to view a rendering effect at the location or object, a sense of beauty is lost due to virtual content overlapping, resulting in a sense of chaotic overlapping and reduction of consumer experience. Therefore, for different accounts, it is necessary to scientifically manage respective virtual content without interfering with virtual content of another account. To better resolve this problem, the present disclosure proposes to register different virtual spaces for different accounts, and each account may be used to freely edit virtual content in a virtual space in which permission is obtained through application.

Operation 3402: Present a first interface, where the first interface includes a virtual space registration option.

After the user logs in to the app, a function option such as "target virtual space (preset authorized space) registration" or "registered target virtual space (authorized space) management" may be displayed, that is, one option is for registering a new virtual space, and the other option is for managing a registered virtual space. It should be understood that the options in FIG. 36 are merely an example, and constitute no limitation.

Operation 3403: In respond to an enabling operation of a user for the virtual space registration option, photograph a first scene to obtain a preview stream.

Figure 36:
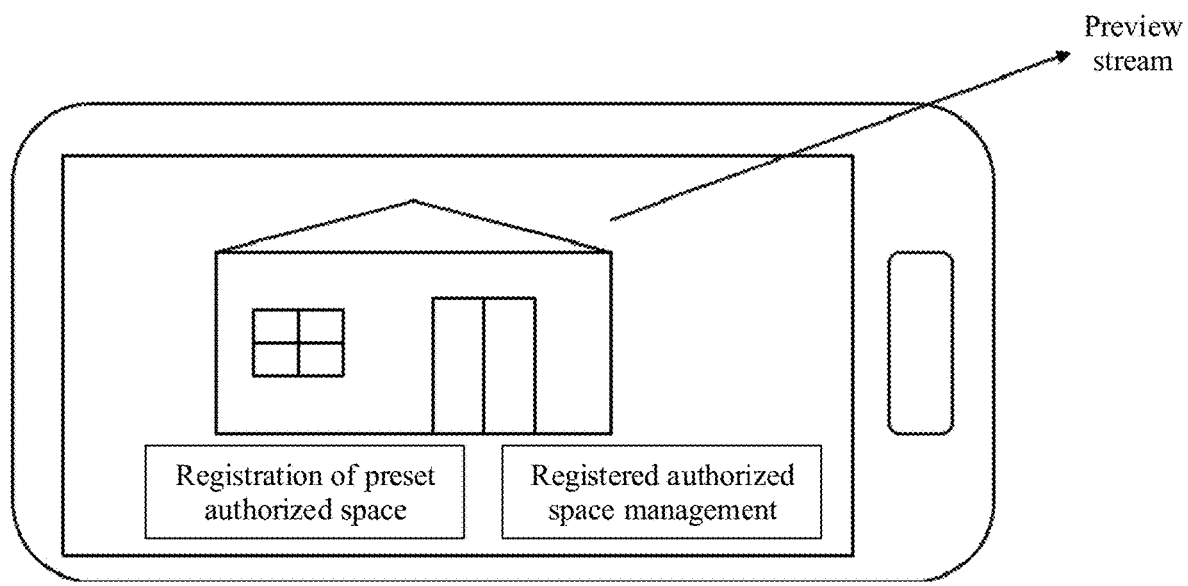
Figure 37:
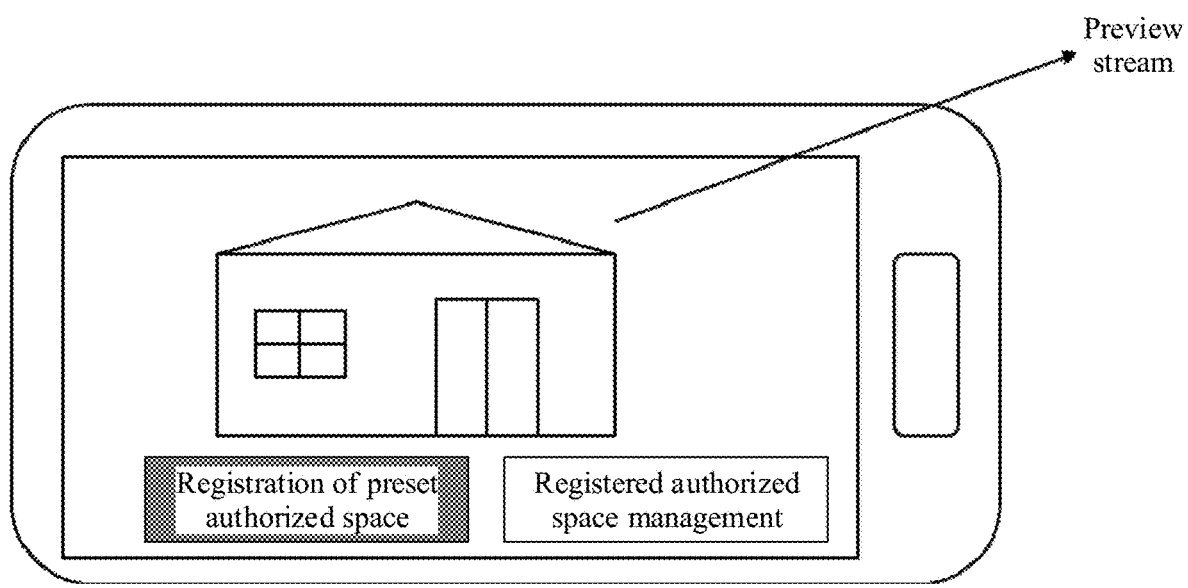

Optionally, after the user logs in to the app, a camera may be started to photograph a current scene, as shown in FIG. 36. Alternatively, after the user logs in to the app and a space registration operation is responded to, a camera is started to photograph a current scene, as shown in FIG. 37. This is not limited in the present disclosure.

Operation 3404: Obtain a target geometry, where the target geometry is used to represent a form of a virtual space that the user expects to register, and includes a size, a location, and/or a posture orientation of the virtual space.

Figure 38:
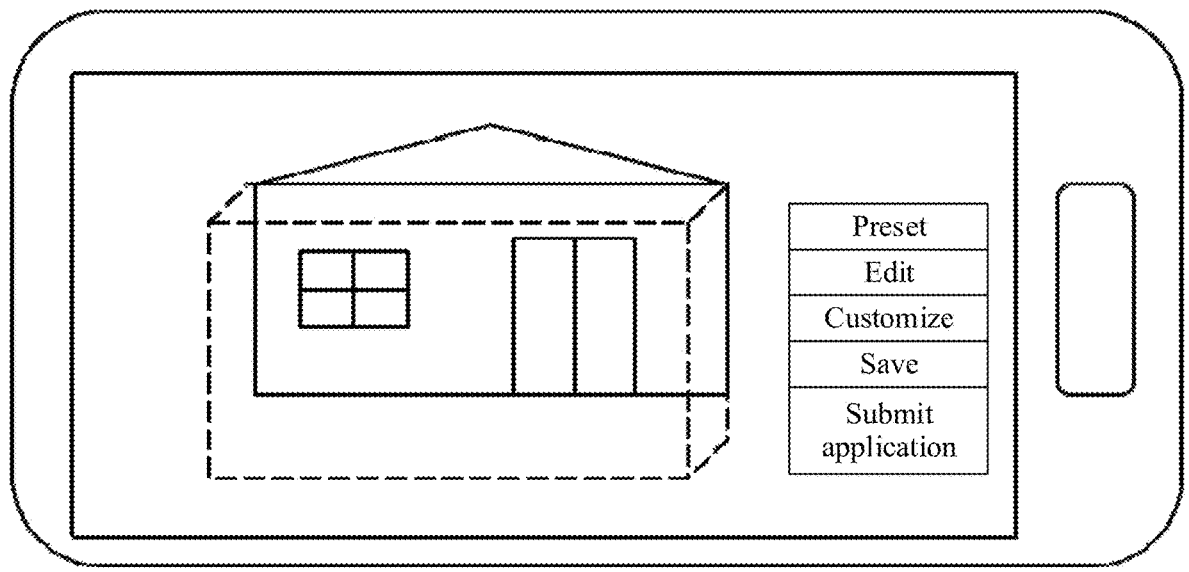
Figure 39:
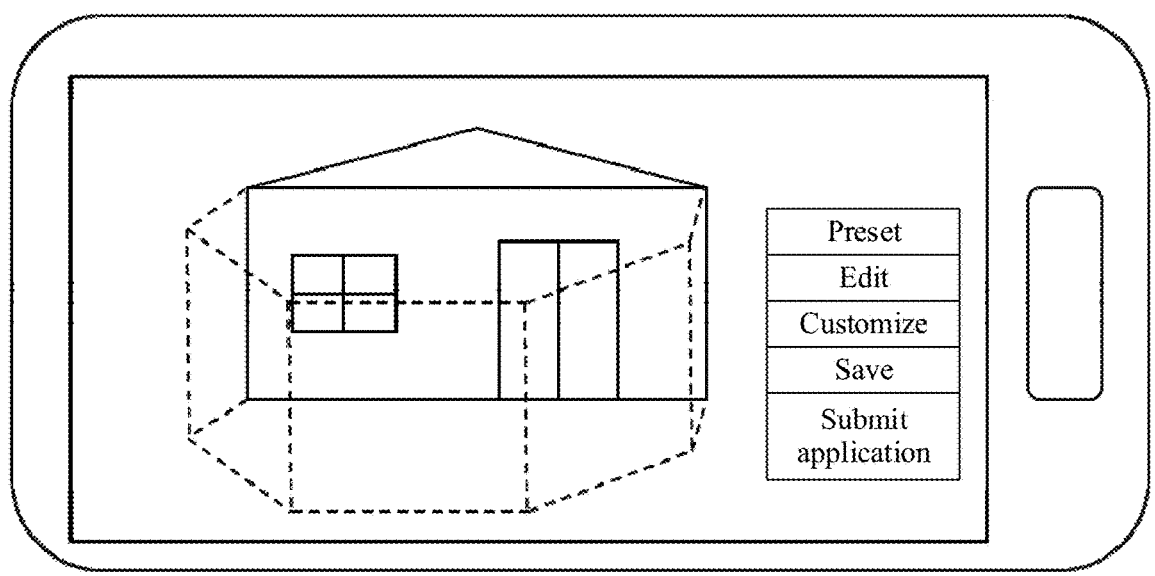

As shown in FIG. 38 and FIG. 39, the target geometry (as shown by a dashed-line cube in FIG. 38 and FIG. 39) may be rendered or displayed in the preview stream. In a process in which the user determines a space shape, the target geometry may be displayed in real time.

Optionally, in an editing process of the user, a jitter occurs on the terminal. In the editing process, the target geometry may be immovable relative to an interface, and a feeling of a "still" state is given to the user. Optionally, the target geometry may alternatively be movable relative to an interface.

Optionally, a manner of obtaining the target geometry may include but is not limited to any one of the following manners.

Manner 1: Obtain a default geometry in the preset application, and use the default geometry as the target geometry. For example, the target geometry is a cylinder or cube stored in the terminal locally or in the application, such as a cube in FIG. 38.

Manner 2: Obtain a user-defined geometry as the target geometry. For example, the user may tap a preset button, and a shape, such as a cuboid, a cube, or a cylinder, of a space is displayed in an interface. The user selects a geometry with a shape desired by the user, places the geometry at an exact location in the preview stream, and further adjusts a size, a location, and an orientation of the geometry by using an editing control, until a user expectation is satisfied. As shown in FIG. 39, the user taps a "customize" button, and the user may tap a plane to form a closed curve and set a height based on an expected space size and location, to obtain a user-defined geometry. Then, the size, the location, and an orientation of the geometry can be further adjusted by using the editing button. After completion, the geometry may be saved and released.

Manner 3: Obtain, based on a selection instruction of the user in a geometry material library, a geometry selected by the user as the target geometry.

For example, when the user invokes the material library, a plurality of classic materials that have been designed are presented in an interface, and locations, sizes, and orientations of the materials are designed based on empirical values. The user may select, by using the selection instruction, a geometry that satisfies a requirement.

Manner 4: Obtain the target geometry adapted to the first scene. Optionally, the terminal may perform analysis and recognition based on picture content in the first scene, and perform adaptation based on a scene type, a main building and a main object in the picture, or features such as shapes, sizes, and postures thereof, to obtain the geometry adapted to the current scene. Optionally, the terminal may send at least one image in the preview stream to the server, so that the server performs related adaptation in a manner similar to the foregoing manner, to obtain the geometry adapted to the current scene, and returns the geometry to the terminal.

It should be understood that in a process in which the user designs, edits, or selects the geometry, the terminal may obtain geometric information of the geometry in real time. The geometric information of the geometry includes at least one of a shape, an orientation, a posture, and coordinates of the geometry. To be specific, the terminal may obtain mathematical parameters of the geometry through calculation based on a preset coordinate matching relationship.

After obtaining the target geometry, the user may save and release the target geometry, and perform operation 3405.

Operation 3405: Send the first user identifier, the preview stream, and the target geometry to the server, where the preview stream and the target geometry are used to determine a target virtual space in which a user with the first user identifier has virtual content editing permission in a first virtual space, and the first virtual space is a virtual space or a digital space corresponding to a real world including the first scene.

The first virtual space may be corresponding to one or more data packets. When the consumer terminal renders the virtual content through AR&VR, conversion and alignment are performed on the target virtual space, the first virtual space, and coordinates in the real world. It should be understood that the target virtual space and the first virtual space may be one data packet or may be different data packets.

Optionally, to obtain more accurate pose information, the terminal may further perform more accurate calculation by using information such as geographic location information (GPS) and inertial sensor information (IMU), or send the information to the server, and the server performs related calculation.

Operation 3406: Receive a feedback instruction sent by the server, where the feedback instruction indicates that the terminal successfully registers the target virtual space based on the target geometry, or cannot successfully register the target virtual space based on the target geometry.

Figure 40:
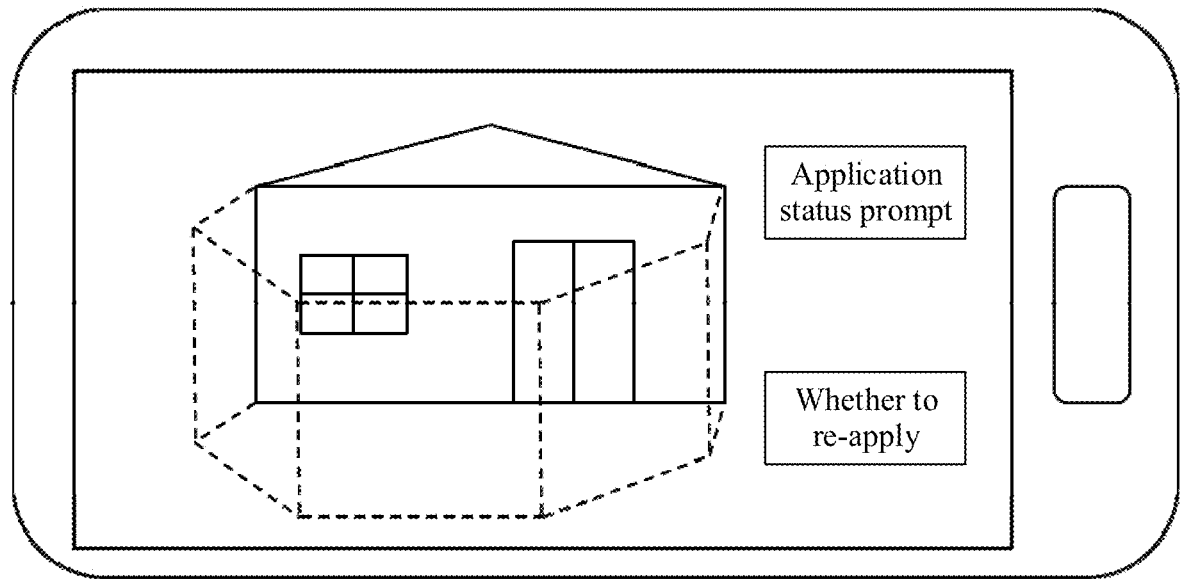

Optionally, the server may determine, according to some rules, whether the target virtual space applied for by using the account is valid. If the target virtual space is valid, the server may return a registration success prompt to the terminal; or if the target virtual space is invalid, the server may return a registration failure prompt to the terminal. As shown in FIG. 40, an "application status prompt" may represent the feedback instruction, and may be a registration success prompt, that is, "authorized", or may be a registration failure prompt, that is, "unauthorized".

Optionally, when the feedback instruction indicates that the terminal cannot successfully register the target virtual space based on the target geometry, the user may be prompted, in a current display interface, that a shape of the target geometry needs to be updated; or the user may be prompted, in a current display interface, with a valid area or a parameter range in which a virtual space can be successfully registered; or the user may be prompted, in a current display interface, to re-apply for a virtual space. For example, a "whether to re-apply" prompt in FIG. 40 may be displayed.

Optionally, when the feedback instruction indicates that the terminal can successfully register the target virtual space based on the target geometry, the user may be prompted with a validity period of the target virtual space for the account, where the validity period indicates that a user with the first user identifier has the virtual content editing permission in the target virtual space within the validity period. For example, an entire time period may be valid. Alternatively, the virtual space owned by the account and a virtual space owned by another account overlap in terms of space data, but are not valid within a same time period.

Optionally, after the feedback instruction indicates that the terminal can successfully register the target virtual space based on the target geometry, the target virtual space may be further displayed or rendered in the preview stream of the first scene. In this case, a relative location relationship between the target virtual space and the first scene remains unchanged in the preview stream. This may be understood as that a relative location relationship between the target virtual space and a specific building or object remains unchanged. Therefore, when a picture changes in the preview stream, the target virtual space changes with the picture. This provides visual synchronization for the user.

Operation 3407: The target virtual space may enable the user to design or edit virtual content in a "what you see is what you get" manner. Further, the user may obtain the target virtual content, and may edit some media content by invoking a material or in a customized manner. That the user renders or displays the target virtual space in the interface is setting the target virtual content in the target geometry. In this case, the terminal may synchronously obtain a pose of the placed target virtual content. The terminal may send the obtained target virtual content and the pose of the terminal to the server, and the server may update the virtual space based on the target virtual content and the pose of the terminal, so that when scanning the first scene, the consumer terminal can render the virtual content based on a posture originally designed by using a developer account. The terminal renders or displays the target virtual space in the preview stream interface, so that the developer can freely design the virtual content in the space with permission, and the virtual content does not exceed a boundary of the target space.

Operation 3408: Optionally, after the user has a registered virtual space, the user may further manage and edit virtual content in the virtual space. Editing may be performed on an occasion of setting a target virtual object in operation 3407. Alternatively, after the user taps the "registered authorized space management" (as shown in FIG. 37) option in the app, the terminal presents a management interface of the target virtual space, so that the user designs and edits the virtual content. An editable design interface may be shown in FIG. 41, and includes but is not limited to one or more options such as add, delete, edit, replace, change a pose, or the like, for user-defined editing of the user.

Figure 42:
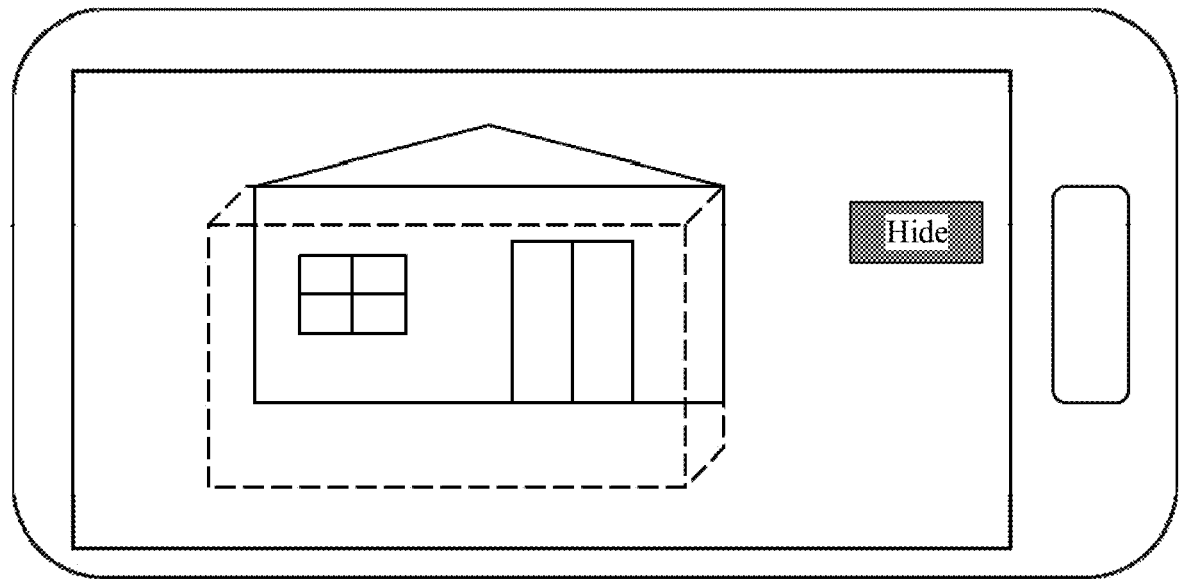
Figure 43:
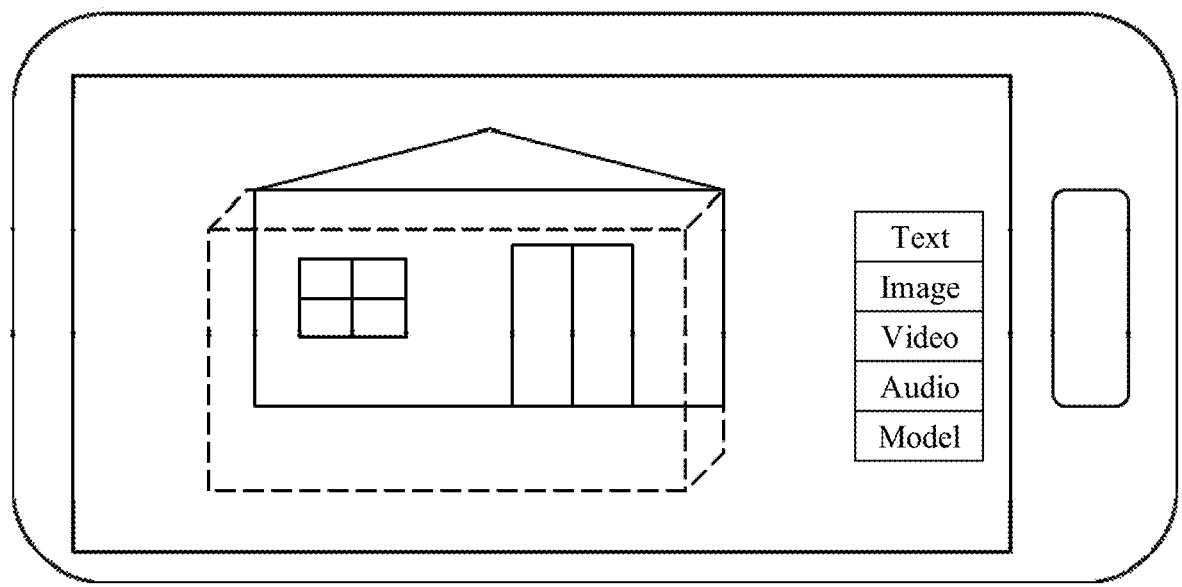
Figure 44:
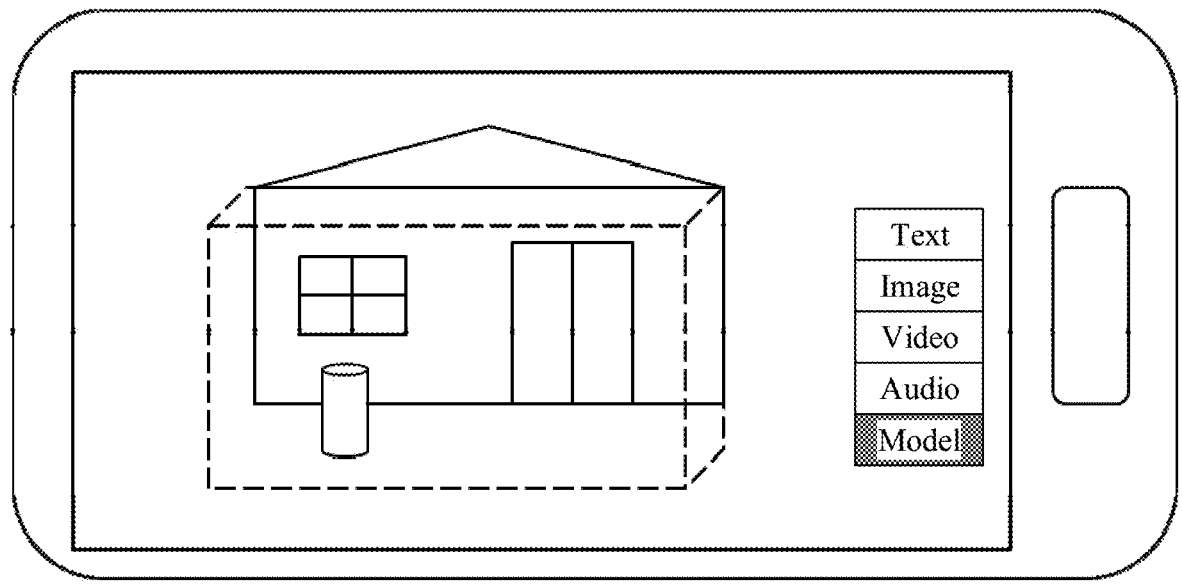
Figure 45:
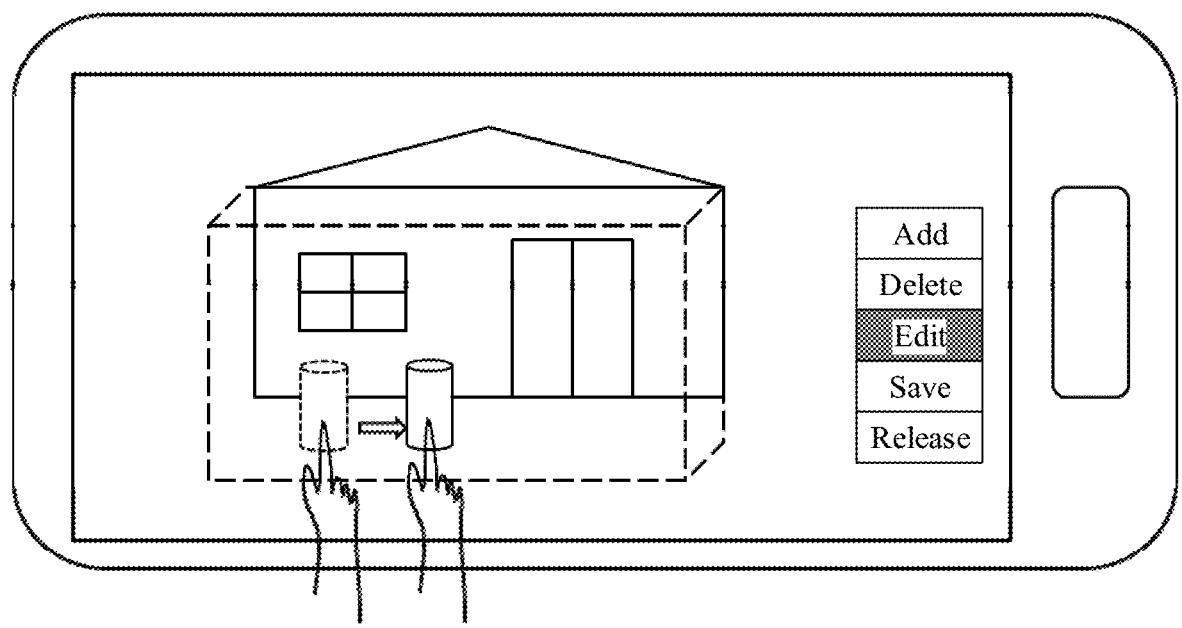
Figure 46:
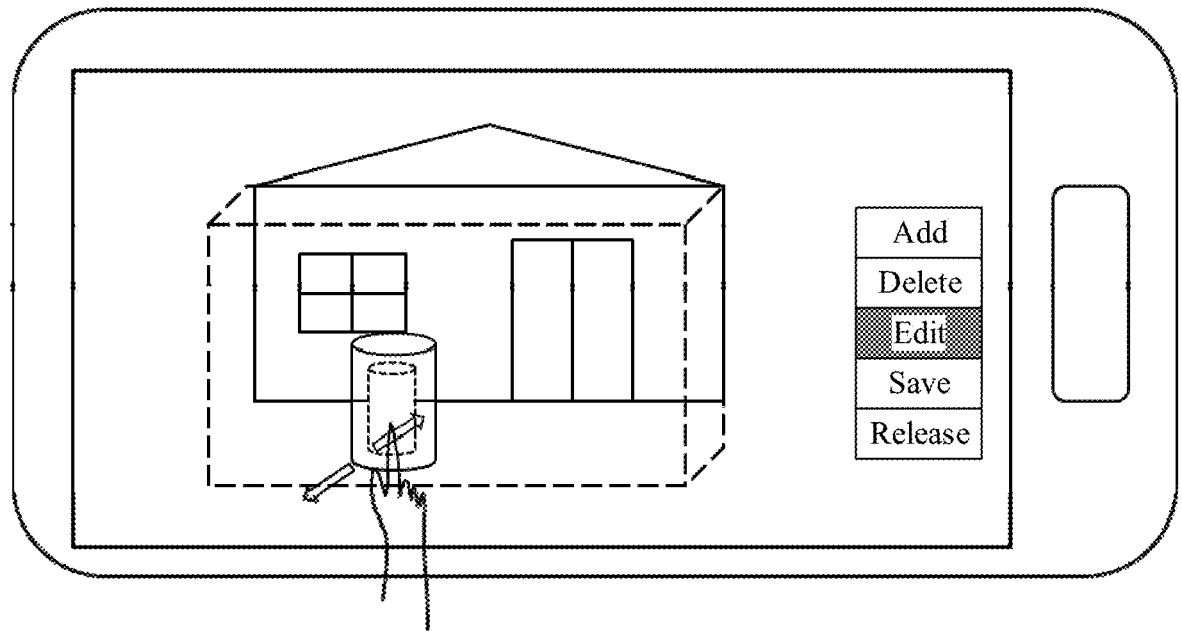
Figure 47:
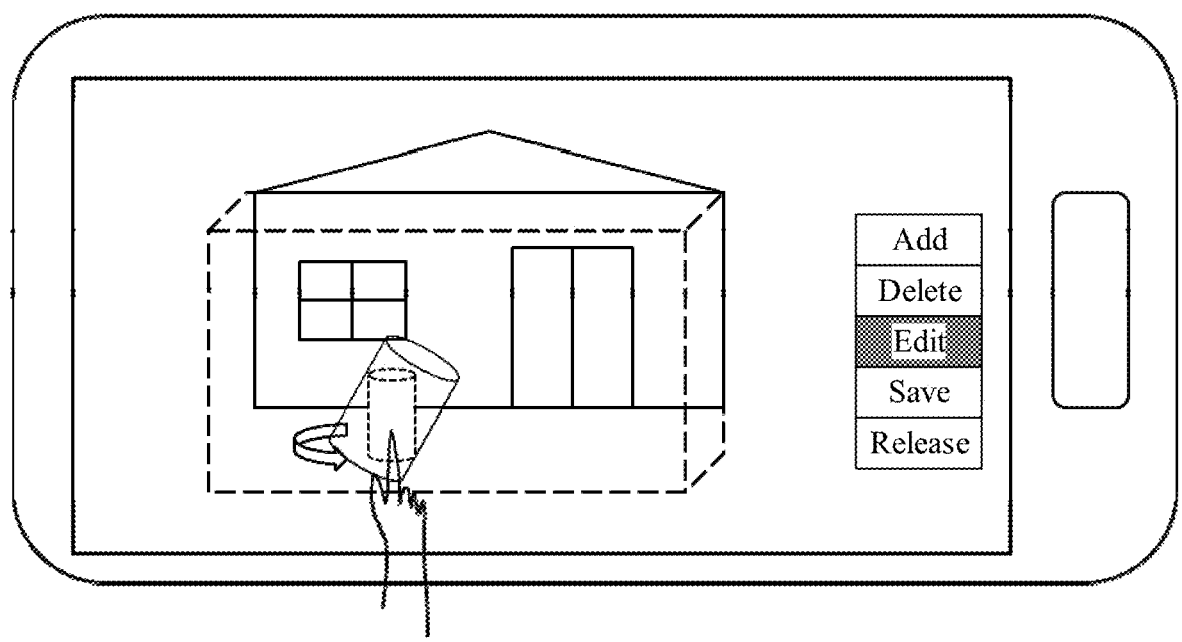

In an editing process, the terminal may further display interfaces of the following instances. As shown in FIG. 42, there may be a hide option in the interface to display or hide an authorized space (a virtual space) in the preview stream. As shown in FIG. 43, the interface may include media content of various possible types, such as a text, a picture, audio, a video, a model, and a web page, or may be a shopping link/commodity, a menu, a product, a text, a mini game, or the like. These can be materials of virtual content. An example in which a model is added as virtual content is used for description. As shown in FIG. 44, the user selects or adds a cylinder model to a virtual space authorized by the server. The user may perform a translation operation on the model, as shown in FIG. 45; or may perform a scaling operation, as shown in FIG. 46; or may perform a rotation operation, as shown in FIG. 47. It should be understood that, in a process of an editing operation of the user, the terminal may obtain a pose of a virtual object through calculation in real time, so as to update a digital space with a same viewing effect as a developer.

Figure 48:
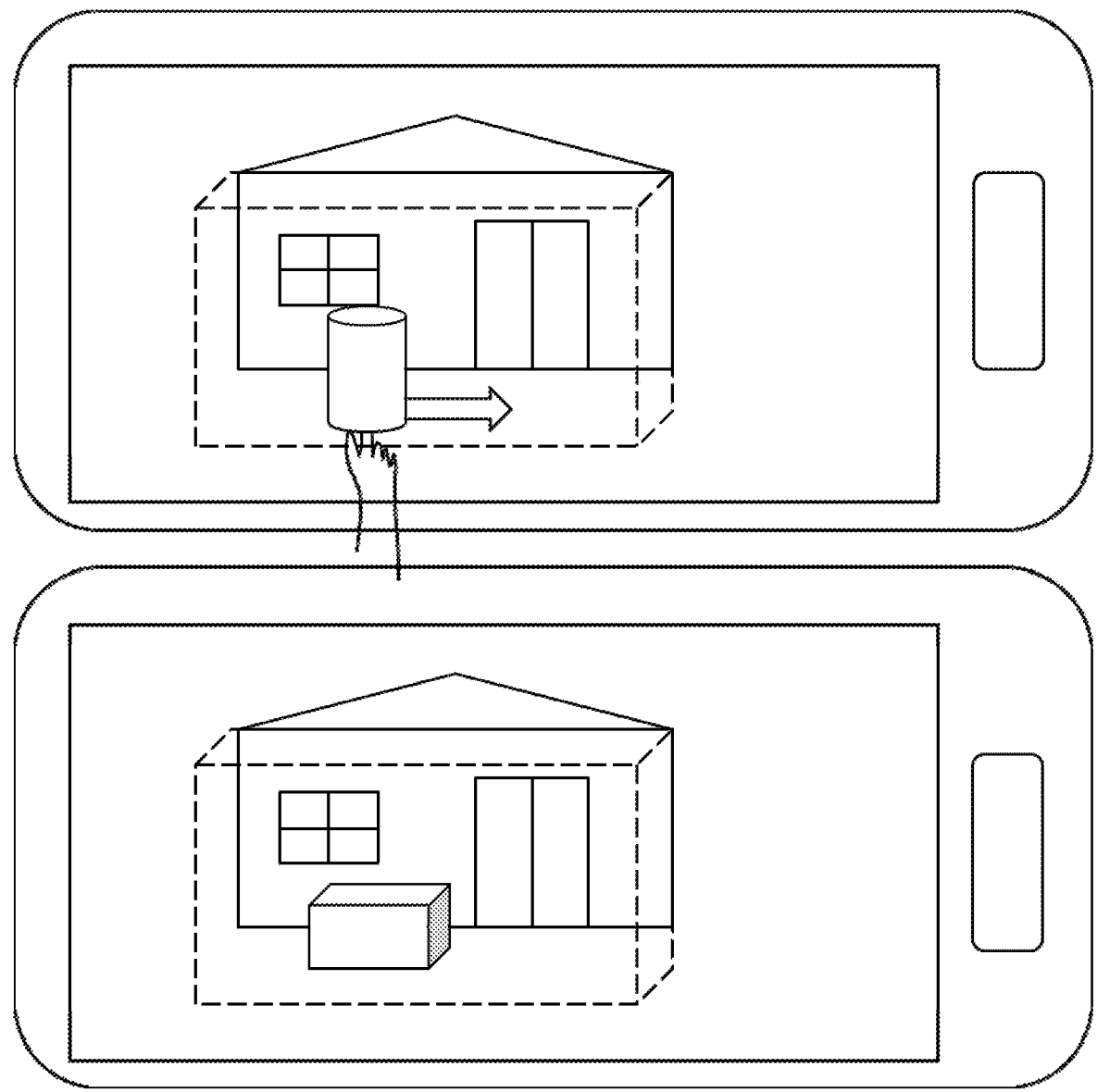

In another optional manner, the developer may further edit a plurality of sets of virtual content in a same target virtual space for a same scene. For example, as shown in FIG. 48, the user may edit a set of virtual content that includes a "cube", or may edit a set of virtual content that includes a "cylinder". The developer terminal may send the plurality of sets of content to the server, so that the server updates the digital space. In embodiments, the developer terminal may further prioritize the plurality of sets of content. When the consumer terminal scans the scene, virtual content with a highest priority may be delivered by default for rendering, and options of the plurality of sets of content are provided for the consumer, so that the consumer views more different rendered content based on a selection of the consumer.

Example 2

Figure 49:
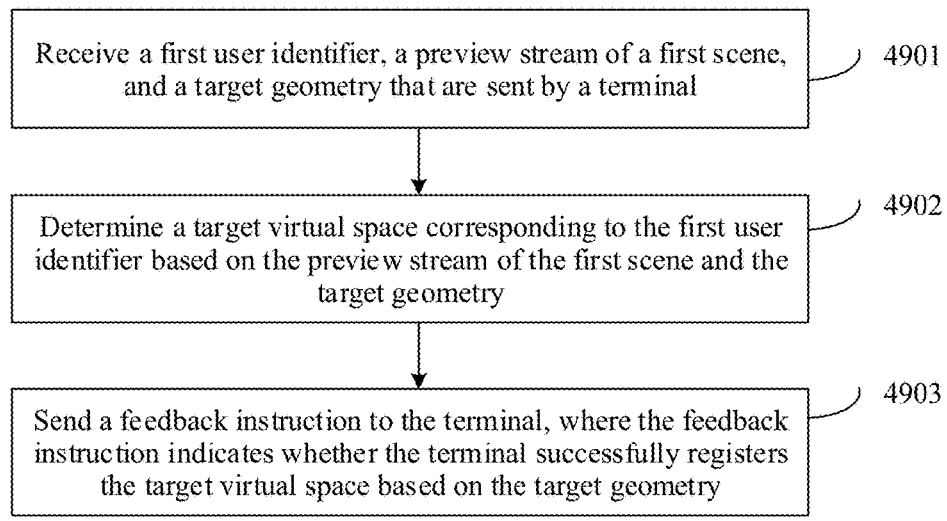
FIG. 49 is a flowchart of another virtual space registration method according to an embodiment of this application.
Figure 50:
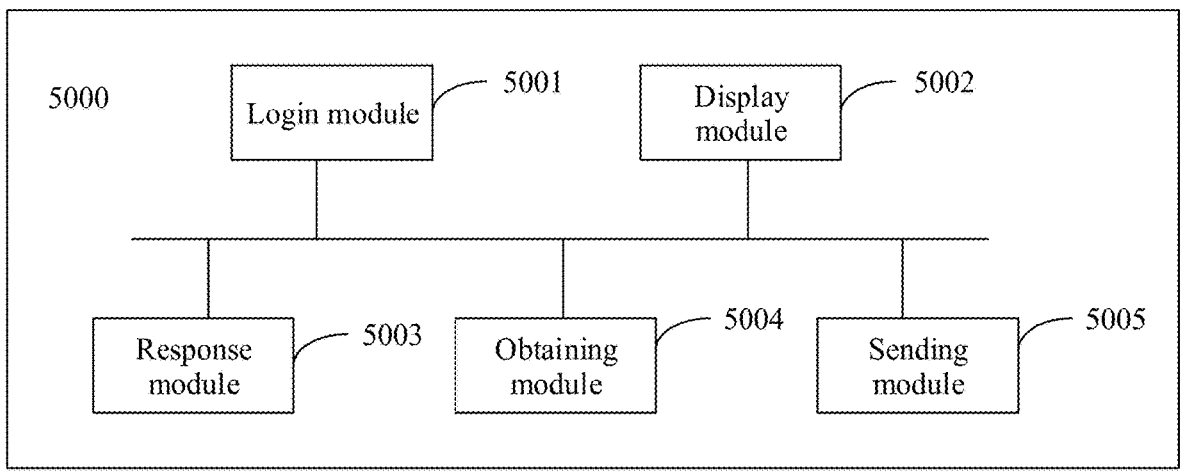
FIG. 50 is a schematic diagram of a structure of a virtual space registration apparatus according to an embodiment of this application.
Figure 51:
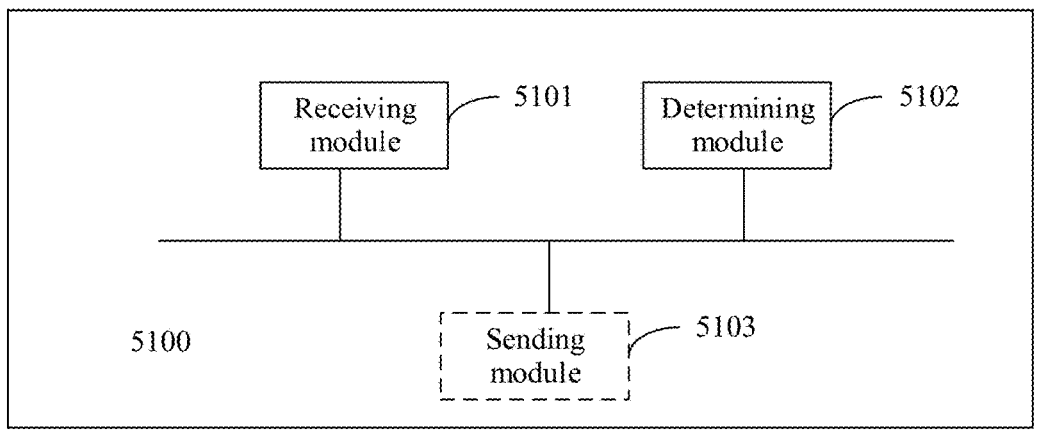
FIG. 51 is a schematic diagram of a structure of another virtual space registration apparatus according to an embodiment of this application.

This example describes a virtual space registration method. As shown in FIG. 49, the method includes the following operations.

Operation 4901: Receive a first user identifier, a preview stream of a first scene, and a target geometry that are sent by a terminal, where the preview stream of the first scene is obtained by the terminal by photographing the first scene.

In embodiments, for a manner of obtaining the first user identifier, the preview stream of the first scene, and the target geometry by the terminal, refer to the foregoing embodiments. Details are not described herein again.

Figure 41:
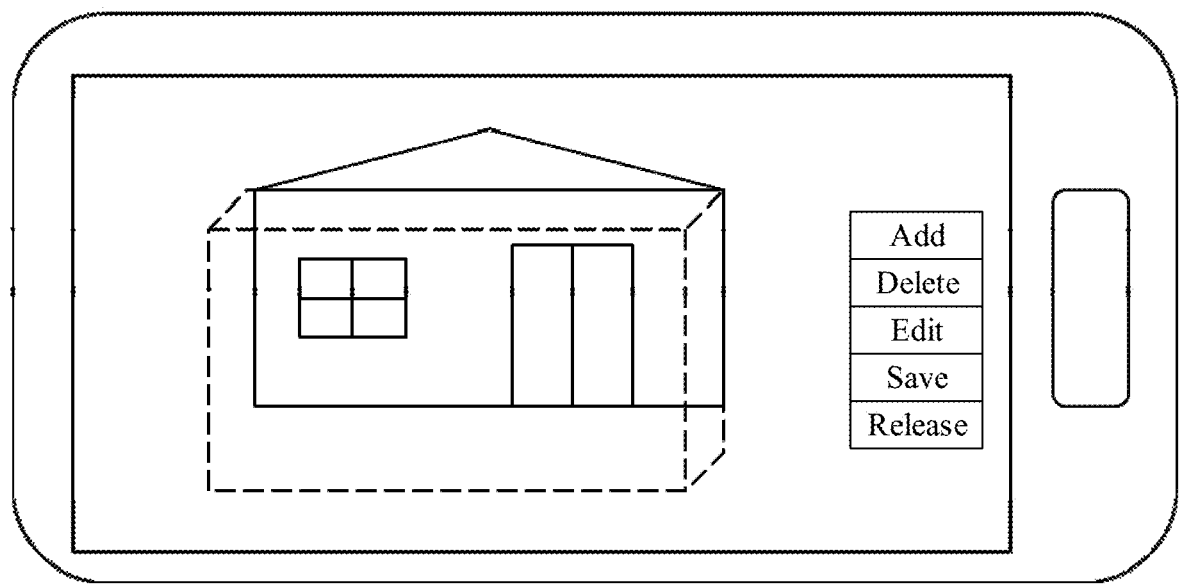

When a user taps "release" in FIG. 41 in an app on a developer terminal, that is, submits a registration application to a server, the foregoing information can be sent to the server.

Operation 4902: Determine a target virtual space corresponding to the first user identifier based on the preview stream of the first scene and the target geometry, where the target geometry is used to determine a form of the target virtual space, the target virtual space indicates a space range for a user with the first user identifier to place virtual content in a first virtual space, the first virtual space is a virtual space corresponding to a real world including the first scene, and the virtual content is used to render the first scene.

In embodiments, the server may obtain first pose information of the terminal in the first virtual space based on the preview stream of the first scene and the first virtual space; obtain second pose information of the target geometry in the first virtual space based on the target geometry and the first virtual space; and determine the target virtual space based on the first pose information, the second pose information, and the target geometry.

In embodiments, the first virtual space is locally stored in the terminal or stored in the server. The first pose information is obtained by the server through calculation, or is obtained by the terminal through calculation. The second pose information is obtained by the server through calculation, or is obtained by the terminal through calculation.

Optionally, the obtaining first pose information of the terminal in the first virtual space based on the preview stream of the first scene includes: sending the preview stream of the first scene or at least one image of the preview stream to the server; and obtaining, by the server, the first pose information based on the preview stream of the first scene or the at least one image of the preview stream by performing corresponding calculation in the first virtual space.

Optionally, the obtaining second pose information of the target geometry in the first virtual space includes: determining depth information in the first scene by using the preview stream of the first scene; and obtaining the second pose information based on the depth information in the first scene and geometric information of the target geometry; or obtaining the second pose information based on the first virtual space and geometric information of the target geometry; or obtaining a setting parameter entered by the user, where the setting parameter is used to describe geometric information of the target geometry; and calculating the second pose information based on the setting parameter; or obtaining a default initial pose of the target geometry; obtaining a change amount of geometric information of the target geometry; and obtaining the second pose information based on the default initial pose of the target geometry and the change amount of the geometric information.

Optionally, the terminal determines the second pose information based on shape information of the target geometry. The depth information in the first scene may be determined by using a plurality of frames, and then a second pose is calculated by using a built-in algorithm or coordinates of a three-dimensional geometry designed by the user. A 3D map corresponding to the first scene may further be downloaded, and then a second pose is calculated. The second pose may be alternatively calculated by using the setting parameter of the user. Alternatively, coordinates of a target three-dimensional geometry are determined based on an initial pose of a three-dimensional geometry and a user editing process, to calculate the second pose. The terminal sends the shape information of the target geometry and the second pose information to the server. The server determines an available area of the account in a virtual space of the first scene based on the first pose information, the second pose information, and the shape information of the target geometry. A space conversion relationship exists between the 3D map and the virtual space of the first scene. The 3D map and the virtual space of the first scene are different data packets, or may be a same data packet.

Operation 4903: Send a feedback instruction to the terminal, where the feedback instruction indicates whether the terminal successfully registers the target virtual space based on the target geometry.

It should be understood that the server may determine, according to a preset management rule, whether a virtual space registration request of the terminal conforms to a specification, and then determine whether to perform authorization. In an example, the preset management rule includes but is not limited to: Space ranges for users with different user identifiers to place virtual content in the first virtual space do not overlap within a same time period. To be specific, different developer accounts cannot be valid within a same time period for an augmented rendered virtual space or content to be developed in a same real scene, to avoid overlapping of different content when consumer terminals performs rendering in a same real scene.

When the target virtual space satisfies the preset management rule, a feedback instruction is sent to the terminal, where the feedback instruction indicates that the terminal successfully registers the target virtual space based on the target geometry. When the target virtual space does not satisfy the preset management rule, a feedback instruction is sent to the terminal, where the feedback instruction indicates that the terminal cannot register the target virtual space based on the target geometry. Prompt information may be further sent to prompt the user that a shape of the target geometry needs to be updated, prompt the user with a valid area or a parameter range in which a virtual space can be successfully registered, or prompt the user to re-apply for a virtual space.

Optionally, the foregoing method may further include operation 4904: Obtain target virtual content; obtain a pose of the target virtual content; and set the target virtual content in the target virtual space based on the pose of the target virtual content, where the target virtual content does not exceed a boundary of the target virtual space. To be specific, according to a form developed by the developer on the terminal side in the foregoing embodiment, the target virtual content is updated to the virtual space, so that when a consumer terminal performs augmented rendering for the first scene subsequently, seen image content is in a form that is almost the same as the content form originally developed by the developer. The target virtual content or the pose of the target virtual content is determined by the terminal or the server. Further, optionally, the server may determine whether the virtual content is secure, healthy, and legal. If the virtual content is illegal, the virtual space may not be updated. In addition, risk prompt information is returned to the user.

According to the solutions provided in embodiments of the present disclosure, a developer may apply for a virtual space in a "what you see is what you get" manner, especially a "legal" and "authorizable" virtual space, and edit virtual content in a virtual space with editing permission, so that a server performs synchronization based on a design of the developer on a terminal. In this way, a content effect expected by the developer can be achieved when a consumer terminal augments or renders a scanned real scene.

Further, the present disclosure provides a virtual space registration apparatus 5000, and the apparatus includes:
- a login module 5001, configured to log in to a preset application based on a first user identifier, where the preset application is used to register, for the first user identifier on a server based on a scene photographed by a terminal, a virtual space with virtual object editing permission, where the login module may be configured to perform the method in the foregoing operation 3401 and an equivalent method;
- a display module 5002, configured to present a first interface, where the first interface includes a virtual space registration option, where the display module may be specifially configured to perform the method in the foregoing operation 3402 and an equivalent method;
- a response module 5003, configured to: in response to an enabling operation of a user for the virtual space registration option, photograph a first scene to obtain a preview stream, where the response module may be configured to perform the method in the foregoing operation 3403 and an equivalent method;
- an obtaining module 5004, configured to obtain a target geometry, where the obtaining module may be configured to perform the method in the foregoing operation 3404 and an equivalent method; and
- a sending module 5005, configured to send the first user identifier, the preview stream, and the target geometry to the server, where the preview stream and the target geometry are used to determine a target virtual space in which a user with the first user identifier has virtual content editing permission in a first virtual space, the first virtual space is a virtual space corresponding to a real world including the first scene, and the target geometry is used to represent a form of the target virtual space, where the sending module may be configured to perform the method in the foregoing operation 3405 and an equivalent method.

Optionally, the apparatus may further include a receiving module 5006 (not shown in the figure), configured to receive a feedback instruction sent by the server, where the feedback instruction indicates that the terminal successfully registers the target virtual space based on the target geometry, or cannot successfully register the target virtual space based on the target geometry. In embodiments, the receiving module may be configured to perform the method in the foregoing operation 3406 and an equivalent method. In embodiments, when the feedback instruction indicates that the terminal cannot successfully register the target virtual space based on the target geometry, the display module is further configured to: prompt, in a current display interface, the user that a shape of the target geometry needs to be updated; or prompt, in a current display interface, the user with a valid area or a parameter range in which a virtual space can be successfully registered; or prompt, in a current display interface, the user to re-apply for a virtual space. After the feedback instruction indicates that the terminal successfully registers the target virtual space based on the target geometry, the display module is further configured to: prompt the user with a validity period of the target virtual space for the first user identifier, where the validity period indicates that a user with the first user identifier has the virtual content editing permission in the target virtual space within the validity period. The display module may be further configured to display or render the target virtual space in the preview stream of the first scene, where a relative location relationship between the target virtual space and the first scene remains unchanged in the preview stream.

Optionally, the apparatus may further include a setting module 5007 (not shown in the figure), configured to set target virtual content in the target virtual space, where the target virtual content does not exceed a boundary of the target virtual space. The sending module is further configured to send the target virtual content and a pose of the terminal to the server, where the target virtual content and the pose of the terminal are used to render the first scene.

Further, the present disclosure provides a virtual space registration apparatus 5100, and the apparatus includes:
- a receiving module 5101, configured to receive a first user identifier, a preview stream of a first scene, and a target geometry that are sent by a terminal, where the preview stream of the first scene is obtained by the terminal by photographing the first scene, where the receiving module may be configured to perform the method in the foregoing operation 4901 and an equivalent method; and
- a determining module 5102, configured to determine a target virtual space corresponding to the first user identifier based on the preview stream of the first scene and the target geometry, where the target geometry is used to determine a form of the target virtual space, the target virtual space indicates a space range for a user with the first user identifier to place virtual content in the first virtual space, the first virtual space is a virtual space corresponding to a real world including the first scene, and the virtual content is used to render the first scene, where the determining module may be configured to perform the method in the foregoing operation 4902 and an equivalent method.

Optionally, the apparatus further includes a sending module 5103, configured to send a feedback instruction to the terminal when the target virtual space satisfies a preset management rule, where the feedback instruction indicates that the terminal successfully registers the target virtual space based on the target geometry; or configured to send a feedback instruction to the terminal when the target virtual space does not satisfy a preset management rule, where the feedback instruction indicates that the terminal cannot successfully register the target virtual space based on the target geometry. The preset management rule includes: Space ranges for users with different user identifiers to place virtual content in the first virtual space do not overlap within a same time period. The sending module is further configured to send prompt information to the terminal, where the prompt information prompts a user that a shape of the target geometry needs to be updated, prompts a user with a valid area or a parameter range in which a virtual space can be successfully registered, or prompts a user to re-apply for a virtual space.

Optionally, the apparatus further includes a setting module 5104, configured to: obtain target virtual content; obtain a pose of the target virtual content; and
set the target virtual content in the target virtual space based on the pose of the target virtual content, where the target virtual content does not exceed a boundary of the target virtual space.

It should be understood that variability and combination of the examples, term explanations, and solutions in all the foregoing possible method embodiments are also applicable to an apparatus side, and details are not described herein. It should be understood that, based on the idea of the present disclosure, overall technical solutions are very complex, embodiments are diverse, and communication operations are numerous, and consequently, not all possible implementations can be enumerated one by one in this application document. Therefore, without violating a natural rule, a person skilled in the art may understand that descriptions of same or similar terms, technical features, and application scenarios in the present disclosure may be mutually referenced, different technical operations or implementations in different instances may be freely combined, and all the operations or implementations shall fall within the protection scope of the present disclosure.

It should be noted that, when the apparatus provided in the foregoing embodiments implements the functions of the apparatus, division of the foregoing functional modules is merely used as an example for description. In practical application, the foregoing functions may be allocated to different functional modules for implementation according to a requirement, that is, an internal structure of a device is divided into different functional modules, so as to implement all or some of the functions described above. In addition, the apparatuses provided in the foregoing embodiments belong to a same concept as the corresponding method embodiments in the foregoing embodiments. For a specific implementation process, refer to the method embodiments. Details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person of ordinary skill in the art may understand that all or some of the operations of the embodiments may be implemented by hardware or a program instructing related hardware. The program may be stored in a computer-readable storage medium. The storage medium may include a read-only memory, a magnetic disk, an optical disc, or the like.

The foregoing descriptions are merely embodiments of this application, but are not intended to limit this application. Any modification, equivalent replacement, or improvement made without departing from the principle of this application should fall within the protection scope of this application.

What is claimed is:

1. A virtual space registration method, comprising:
logging in, by a terminal, to a preset application based on a first user identifier, wherein the preset application registers, for the first user identifier on a server based on a scene photographed by the terminal, a virtual space with virtual object editing permission;
presenting a first interface that comprises a virtual space registration option;
in response to an enabling operation of a user for the virtual space registration option, photographing a first scene to obtain a preview stream, the first scene being a view of a real world location in which the terminal is located, and the preview stream being a real time stream of digital image data of the real world location;
obtaining a target geometry of a virtual space that represents a form of the virtual space for which the user is performing virtual space registration, the target geometry comprising a size of the virtual space, a location of the virtual space relative to the real world location, and a posture orientation of the virtual space when rendered over the digital image data of the real world location, wherein the virtual space is partitioned by a pre-segmented space block, the pre-segmented space block divided by a plurality of space blocks, and obtaining the target geometry comprises: obtaining a user-selected shape of a geometry of the virtual space as the target geometry, or obtaining, according to a selection instruction of the user in a geometry material library, a geometry selected by the user as the target geometry, wherein the target geometry includes one or more of the plurality of space blocks of the pre-segmented space block selected by the user, and wherein different selections of the plurality of space blocks of the pre-segmented space block in the virtual space have a different render form or a different display form;

rendering or displaying, by the terminal in real time, the form of the virtual space having the target geometry corresponding to the plurality of space blocks of the pre-segmented space block selected by the user in the preview stream over the digital image data of the real world location; and sending the first user identifier, the preview stream, and the target geometry to the server, where the preview stream and the target geometry determine a target virtual space in which the user with the first user identifier has virtual content editing permission in a first virtual space corresponding to a real world space comprising the first scene.

2. The method according to claim 1, wherein after the sending the first user identifier, the preview stream, and the target geometry to the server, the method further comprises:

receiving a feedback instruction sent by the server that indicates that the terminal: successfully registers the target virtual space based on the target geometry, or cannot successfully register the target virtual space based on the target geometry.

3. The method according to claim 2, wherein when the feedback instruction indicates that the terminal cannot successfully register the target virtual space based on the target geometry, the method further comprises:

prompting, in a current display interface, the user to update a shape of the target geometry; or prompting, in a current display interface, the user with a valid area or a parameter range in which a virtual space can be successfully registered; or prompting, in a current display interface, the user to re-apply for a virtual space.

4. The method according to claim 2, wherein when the feedback instruction indicates that the terminal successfully registers the target virtual space based on the target geometry, the method further comprises:

prompting the user with a validity period of the target virtual space for the first user identifier, wherein the validity period indicates that the user with the first user identifier has the virtual content editing permission in the target virtual space within the validity period.

5. The method according to claim 2, wherein after the feedback instruction indicates that the terminal successfully registers the target virtual space based on the target geometry, the method further comprises:

displaying or rendering the target virtual space in the preview stream of the first scene, wherein a relative location relationship between the target virtual space and the first scene remains unchanged in the preview stream.

6. The method according to claim 5, wherein the method further comprises:

setting target virtual content in the target virtual space, wherein the target virtual content does not exceed a boundary of the target virtual space.

7. The method according to claim 6, wherein the method further comprises:

sending the target virtual content and a pose of the terminal to the server to render the first scene.

8. A virtual space registration apparatus, comprising:
at least one processor; and
one or more memories coupled to the at least one processor and storing programming instructions for execution by the at least one processor to cause the apparatus to:

log in to a preset application based on a first user identifier, wherein the preset application registers, for the first user identifier on a server based on a scene photographed by a terminal, a virtual space with virtual object editing permission, present a first interface that comprises a virtual space registration option, in response to an enabling operation of a user for the virtual space registration option, photograph a first scene to obtain a preview stream, the first scene being a view of a real world location in which the terminal is located, and the preview stream being a real time stream of digital image data of the real world location, obtain a target geometry of a virtual space that represents a form of the virtual space for which the user is performing virtual space registration, the target geometry comprising a size of the virtual space, a location of the virtual space relative to the real world location, and a posture orientation of the virtual space when rendered over the digital image data of the real world location, the virtual space is partitioned by a pre-segmented space block that is divided by a plurality of space blocks, and the apparatus to obtain the target geometry comprises the apparatus to: obtain a user-selected shape of a geometry of the virtual space as the target geometry, or obtaining, according to a selection instruction of the user in a geometry material library, a geometry selected by the user as the target geometry, wherein the target geometry includes one or more of the plurality of space blocks of the pre-segmented space block selected by the user, and wherein different selections of the plurality of space blocks of the pre-segmented space block in the virtual space have a different render form or a different display form, render or display, by the terminal in real time, the form of the virtual space having the target geometry corresponding to the plurality of space blocks of the pre-segmented space block selected by the user in the preview stream over the digital image data of the real world location, and send the first user identifier, the preview stream, and the target geometry to the server, wherein the preview stream and the target geometry determine a target virtual space in which the user with the first user identifier has virtual content editing permission in a first virtual space corresponding to a real world space comprising the first scene, and the target geometry represents a form of the target virtual space.

9. The apparatus according to claim 8, wherein the programming instructions for execution by the at least one processor to cause the apparatus further to:

receive a feedback instruction sent by the server that indicates that the terminal: successfully registers the target virtual space based on the target geometry, or cannot successfully register the target virtual space based on the target geometry.

10. The apparatus according to claim 9, wherein the programming instructions for execution by the at least one processor to cause the apparatus further to:

when the feedback instruction indicates that the terminal cannot successfully register the target virtual space based on the target geometry, prompt, in a current display interface, the user to update a shape of the target geometry; or prompt, in a current display interface, the user with a valid area or a parameter range in which a virtual space can be successfully registered; or prompt, in a current display interface, the user to re-apply for a virtual space.

11. The apparatus according to claim 9, wherein the programming instructions for execution by the at least one processor to cause the apparatus further to:

when the feedback instruction indicates that the terminal successfully registers the target virtual space based on the target geometry, prompt the user with a validity period of the target virtual space for the first user identifier, wherein the validity period indicates that the user with the first user identifier has the virtual content editing permission in the target virtual space within the validity period.

12. The apparatus according to claim 9, wherein the programming instructions for execution by the at least one processor to cause the apparatus further to:

when the feedback instruction indicates that the terminal successfully registers the target virtual space based on the target geometry, display or render the target virtual space in the preview stream of the first scene, wherein a relative location relationship between the target virtual space and the first scene remains unchanged in the preview stream.

13. The apparatus according to claim 12, wherein the programming instructions for execution by the at least one processor to cause the apparatus further to:

set target virtual content in the target virtual space, wherein the target virtual content does not exceed a boundary of the target virtual space.

14. The apparatus according to claim 13, wherein the programming instructions for execution by the at least one processor to cause the apparatus further to:

send the target virtual content and a pose of the terminal to the server to render the first scene.

15. A non-transitory computer-readable storage medium storing computer instructions, that when executed by one or more processors, cause the one or more processors to perform the operations of:

logging in to a preset application based on a first user identifier, wherein the preset application registers, for the first user identifier on a server based on a scene photographed by a terminal, a virtual space with virtual object editing permission;

presenting a first interface that comprises a virtual space registration option;

in response to an enabling operation of a user for the virtual space registration option, photographing a first scene to obtain a preview stream, the first scene being a view of a real world location in which the terminal is located, and the preview stream being a real time stream of digital image data of the real world location;

obtaining a target geometry of a virtual space that represents a form of the virtual space for which the user is performing virtual space registration, the target geometry comprising a size of the virtual space, a location of the virtual space relative to the real world location, and a posture orientation of the virtual space when rendered over the digital image data of the real world location, the virtual space is partitioned by a pre-segmented space block that is divided by a plurality of space blocks and obtaining the target geometry comprises: obtaining a user-selected shape of a geometry of the virtual space as the target geometry, or obtaining, according to a selection instruction of the user in a geometry material library, a geometry selected by the user as the target geometry, wherein the target geometry includes one or more of the plurality of space blocks of the pre-segmented space block selected by the user, and wherein different selections of the plurality of space blocks of the pre-segmented space block in the virtual space have a different render form or a different display form;

rendering or displaying, by the terminal in real time, the form of the virtual space having the target geometry corresponding to the plurality of space blocks of the pre-segmented space block selected by the user in the preview stream over the digital image data of the real world location; and sending the first user identifier, the preview stream, and the target geometry to the server, where the preview stream and the target geometry determine a target virtual space in which the user with the first user identifier has virtual content editing permission in a first virtual space corresponding to a real space world comprising the first scene, and the target geometry represents a form of the target virtual space.

\* \* \* \* \*